(12) United States Patent
Deets et al.

(10) Patent No.: US 11,657,614 B2
(45) Date of Patent: May 23, 2023

(54) CAMERA AND VISITOR USER INTERFACES

(71) Applicant: Apple Inc., Cupertino, CA (US)

(72) Inventors: Charles D. Deets, Palo Alto, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/028,176

(22) Filed: Sep. 22, 2020

(65) Prior Publication Data

US 2021/0383130 A1    Dec. 9, 2021

Related U.S. Application Data

(60) Provisional application No. 63/034,313, filed on Jun. 3, 2020.

(51) Int. Cl.
| | | |
|---|---|---|
| *G06V 20/52* | (2022.01) | |
| *G06V 40/10* | (2022.01) | |
| *G08B 13/196* | (2006.01) | |
| *G06V 40/16* | (2022.01) | |

(52) U.S. Cl.
CPC .............. *G06V 20/52* (2022.01); *G06V 40/10* (2022.01); *G06V 40/172* (2022.01); *G08B 13/19682* (2013.01)

(58) Field of Classification Search
None
See application file for complete search history.

(56) References Cited

U.S. PATENT DOCUMENTS

| | | |
|---|---|---|
| 5,974,235 A | 10/1999 | Nunally et al. |
| 6,483,986 B1 | 11/2002 | Krapf |
| 6,931,594 B1 | 8/2005 | Jun |
| 7,293,280 B1 | 11/2007 | Gupta et al. |
| 7,401,351 B2 | 7/2008 | Boreczky et al. |
| 7,859,571 B1 | 12/2010 | Brown et al. |
| 7,904,814 B2 | 3/2011 | Errico et al. |
| 8,031,230 B2 | 10/2011 | Takada |
| 8,253,704 B2 | 8/2012 | Jang |
| 8,516,374 B2 | 8/2013 | Fleischman et al. |
| 8,745,500 B1 | 6/2014 | Kostello et al. |
| 8,762,844 B2 | 6/2014 | Kim et al. |
| 8,954,889 B2 | 2/2015 | Fujibayashi |
| 8,990,861 B2 | 3/2015 | Nishikawa et al. |
| 9,021,526 B1 | 4/2015 | Baron et al. |
| 9,082,018 B1 | 7/2015 | Laska et al. |

(Continued)

FOREIGN PATENT DOCUMENTS

| | | |
|---|---|---|
| CN | 103970814 A | 8/2014 |
| CN | 104469512 A | 3/2015 |

(Continued)

OTHER PUBLICATIONS

Invitation to Pay Search Fees received for European Patent Application No. 19728558.8, dated Apr. 20, 2021, 4 pages.

(Continued)

*Primary Examiner* — Samuel D Fereja
(74) *Attorney, Agent, or Firm* — DLA Piper LLP (US)

(57) ABSTRACT

The present disclosure generally relates to camera and visitor user interfaces. In some examples, the present disclosure relates to displaying indications of visitors detected by an accessory device of the home automation system.

57 Claims, 49 Drawing Sheets

(56) References Cited

U.S. PATENT DOCUMENTS

| | | | |
|---|---|---|---|
| 9,158,974 B1 | 10/2015 | Laska et al. | |
| 9,170,707 B1 | 10/2015 | Laska et al. | |
| 9,313,556 B1 | 4/2016 | Borel et al. | |
| 9,361,011 B1 | 6/2016 | Burns et al. | |
| 9,728,230 B2 | 8/2017 | Cudak et al. | |
| 10,068,364 B2 | 9/2018 | Cui | |
| 10,120,536 B2 | 11/2018 | Cha et al. | |
| 10,219,026 B2 | 2/2019 | Eim et al. | |
| 10,282,068 B2 | 5/2019 | Dubin et al. | |
| 10,298,643 B1 | 5/2019 | Toal et al. | |
| 10,474,349 B2 | 11/2019 | Jang et al. | |
| 11,062,156 B1 * | 7/2021 | Vallance | G06N 20/00 |
| 2002/0012526 A1 | 1/2002 | Sai et al. | |
| 2002/0063737 A1 | 5/2002 | Feig et al. | |
| 2002/0154888 A1 | 10/2002 | Allen et al. | |
| 2002/0180774 A1 | 12/2002 | Errico et al. | |
| 2003/0063130 A1 | 4/2003 | Barbieri et al. | |
| 2003/0093790 A1 | 5/2003 | Logan et al. | |
| 2003/0110511 A1 | 6/2003 | Schutte et al. | |
| 2004/0131254 A1 | 7/2004 | Liang et al. | |
| 2005/0163345 A1 | 7/2005 | Van et al. | |
| 2006/0013554 A1 | 1/2006 | Poslinski et al. | |
| 2006/0034586 A1 | 2/2006 | Millar et al. | |
| 2006/0171453 A1 | 8/2006 | Rohlfing et al. | |
| 2006/0221184 A1 | 10/2006 | Vallone et al. | |
| 2006/0279628 A1 | 12/2006 | Fleming | |
| 2007/0033632 A1 | 2/2007 | Baynger et al. | |
| 2007/0174774 A1 | 7/2007 | Lerman et al. | |
| 2007/0198111 A1 | 8/2007 | Oetzel et al. | |
| 2008/0080743 A1 | 4/2008 | Schneiderman et al. | |
| 2009/0199119 A1 | 8/2009 | Park et al. | |
| 2009/0220206 A1 | 9/2009 | Kisliakov | |
| 2009/0282362 A1 | 11/2009 | Matsumoto | |
| 2009/0299810 A1 | 12/2009 | Jardine et al. | |
| 2010/0201815 A1 | 8/2010 | Anderson et al. | |
| 2010/0267370 A1 | 10/2010 | Lee | |
| 2011/0040754 A1 | 2/2011 | Peto et al. | |
| 2011/0040760 A1 | 2/2011 | Fleischman et al. | |
| 2011/0145745 A1 | 6/2011 | Hyeon et al. | |
| 2011/0228084 A1 | 9/2011 | Colciago | |
| 2011/0249861 A1 | 10/2011 | Tokutake | |
| 2012/0070129 A1 | 3/2012 | Lin et al. | |
| 2012/0079507 A1 | 3/2012 | Agarwal et al. | |
| 2012/0177339 A1 | 7/2012 | Chang et al. | |
| 2012/0291068 A1 | 11/2012 | Khushoo et al. | |
| 2013/0124997 A1 | 5/2013 | Speir et al. | |
| 2013/0227414 A1 | 8/2013 | Hwang et al. | |
| 2013/0298021 A1 | 11/2013 | Park et al. | |
| 2014/0013243 A1 | 1/2014 | Flynn et al. | |
| 2014/0068439 A1 | 3/2014 | Lacaze et al. | |
| 2014/0150029 A1 | 5/2014 | Avedissian et al. | |
| 2014/0215564 A1 | 7/2014 | Banatwala et al. | |
| 2014/0237419 A1 | 8/2014 | Ryu | |
| 2014/0258854 A1 | 9/2014 | Li | |
| 2014/0267549 A1 | 9/2014 | Pinter et al. | |
| 2014/0293046 A1 | 10/2014 | Ni | |
| 2014/0313032 A1 | 10/2014 | Sager et al. | |
| 2014/0365980 A1 | 12/2014 | Morrison et al. | |
| 2014/0375819 A1 | 12/2014 | Larsen et al. | |
| 2015/0058780 A1 | 2/2015 | Malik et al. | |
| 2015/0071601 A1 | 3/2015 | Dabous et al. | |
| 2015/0092009 A1 | 4/2015 | Deluca et al. | |
| 2015/0095937 A1 | 4/2015 | Tobin | |
| 2015/0106721 A1 | 4/2015 | Cha et al. | |
| 2015/0120768 A1 | 4/2015 | Wellen et al. | |
| 2015/0135068 A1 | 5/2015 | Chiu | |
| 2015/0142587 A1 | 5/2015 | Salgar et al. | |
| 2015/0180922 A1 | 6/2015 | Draznin et al. | |
| 2015/0193127 A1 | 7/2015 | Chai et al. | |
| 2016/0005281 A1 | 1/2016 | Laska et al. | |
| 2016/0037140 A1 | 2/2016 | Lindsey et al. | |
| 2016/0085412 A1 | 3/2016 | Meganathan et al. | |
| 2016/0093180 A1 | 3/2016 | Fitzgibbon et al. | |
| 2016/0093338 A1 | 3/2016 | Laska et al. | |
| 2016/0103830 A1 | 4/2016 | Cheong et al. | |
| 2016/0133297 A1 | 5/2016 | Thornton et al. | |
| 2016/0139752 A1 | 5/2016 | Shim et al. | |
| 2016/0191992 A1 | 6/2016 | Kwon | |
| 2016/0224233 A1 | 8/2016 | Phang et al. | |
| 2016/0320849 A1 | 11/2016 | Koo | |
| 2016/0364123 A1 | 12/2016 | Burns et al. | |
| 2016/0364129 A1 | 12/2016 | Mclean et al. | |
| 2017/0053008 A1 | 2/2017 | Frenkel et al. | |
| 2017/0070775 A1 | 3/2017 | Taxier et al. | |
| 2017/0078767 A1 | 3/2017 | Borel et al. | |
| 2017/0084132 A1 | 3/2017 | Scalisi | |
| 2017/0185277 A1 | 6/2017 | Sundermeyer et al. | |
| 2017/0318322 A1 | 11/2017 | Lamb et al. | |
| 2017/0337791 A1 | 11/2017 | Gordon-carroll | |
| 2017/0352380 A1 | 12/2017 | Doumbouya et al. | |
| 2017/0357434 A1 | 12/2017 | Coffman et al. | |
| 2018/0014043 A1 | 1/2018 | Zhang et al. | |
| 2018/0014077 A1 | 1/2018 | Hou et al. | |
| 2018/0018081 A1 | 1/2018 | Dattilo-green et al. | |
| 2018/0019889 A1 | 1/2018 | Burns et al. | |
| 2018/0088795 A1 * | 3/2018 | van Os | G06F 1/3206 |
| 2018/0109754 A1 | 4/2018 | Kwon | |
| 2018/0113577 A1 | 4/2018 | Burns et al. | |
| 2018/0115788 A1 | 4/2018 | Burns et al. | |
| 2018/0199080 A1 | 7/2018 | Jackson et al. | |
| 2018/0232592 A1 | 8/2018 | Stewart et al. | |
| 2018/0232705 A1 | 8/2018 | Baker et al. | |
| 2018/0249113 A1 | 8/2018 | Faulkner | |
| 2018/0349707 A1 | 12/2018 | Bataller et al. | |
| 2018/0349736 A1 * | 12/2018 | Bapat | G08B 13/19645 |
| 2019/0075105 A1 | 3/2019 | Rajakumar | |
| 2019/0089934 A1 * | 3/2019 | Goulden | G05B 15/02 |
| 2019/0090014 A1 | 3/2019 | Shoop | |
| 2019/0130185 A1 | 5/2019 | Delaney et al. | |
| 2019/0208282 A1 | 7/2019 | Singh et al. | |
| 2019/0286651 A1 | 9/2019 | Lee et al. | |
| 2019/0294889 A1 | 9/2019 | Sriram et al. | |
| 2019/0295393 A1 | 9/2019 | Lee et al. | |
| 2019/0325229 A1 | 10/2019 | Koyama et al. | |
| 2019/0342621 A1 | 11/2019 | Carrigan et al. | |
| 2019/0342622 A1 | 11/2019 | Carrigan et al. | |
| 2020/0042775 A1 | 2/2020 | Lim | |
| 2020/0301575 A1 | 9/2020 | Lindholm et al. | |
| 2021/0092491 A1 | 3/2021 | Carrigan et al. | |
| 2021/0385417 A1 | 12/2021 | Park et al. | |

FOREIGN PATENT DOCUMENTS

| | | |
|---|---|---|
| CN | 104581043 A | 4/2015 |
| CN | 107613235 A | 1/2018 |
| EP | 3460770 A1 | 3/2019 |
| JP | 2009-201127 A | 9/2009 |
| JP | 2012-123460 A | 6/2012 |
| JP | 2015-125671 A | 7/2015 |
| JP | 2016-119600 A | 6/2016 |
| JP | 2017-158202 A | 9/2017 |
| JP | 2018-63826 A | 4/2018 |
| KR | 10-2011-0093040 A | 8/2011 |
| KR | 10-2014-0075932 A | 6/2014 |
| KR | 10-2015-0043146 A | 4/2015 |
| KR | 10-1522311 B1 | 5/2015 |
| KR | 10-2018-0027707 A | 3/2018 |
| WO | 2019/090653 A1 | 5/2019 |
| WO | 2019/217341 A1 | 11/2019 |

OTHER PUBLICATIONS

Notice of Allowance received for Korean Patent Application No. 10-2020-7031700, dated Apr. 21, 2021, 4 pages (2 pages of English Translation and 2 pages of Official Copy).
CCTV Camera Pros, "View HD Security Cameras on iDVR-PRO iPhone App", Online Available at: https://www.youtube.com/watch?v=LAsZdfys2GM, Apr. 12, 2017, 3 pages.
Ring, "Using the Motion Detection Control to Completely Disable Recording", Online available at: https://support.ring.com/hc/en-us/articles/360021797252-Using-the-Motion-Detection-Control-to-Completely-Disable-Recording, Retrieved on May 2021, 4 pages.

(56) References Cited

OTHER PUBLICATIONS

Steve Does, "Arlo's NEW App with new FEATURE + (GIVE-AWAY)", Available online at https://www.youtube.com/watch?v=jiyWEYCH1BA, Sep. 5, 2019, 5 pages.
Advisory Action received for U.S. Appl. No. 16/404,605, dated Apr. 15, 2020, 10 pages.
Applicant Initiated Interview Summary received for U.S. Appl. No. 16/404,605, dated Nov. 13, 2019, 3 pages.
Certificate of Examination received for Australian Patent Application No. 2019100487, dated Jan. 7, 2020, 2 pages.
Certificate of Examination received for Australian Patent Application No. 2020100303, dated Apr. 17, 2020, 2 pages.
Final Office Action received for U.S. Appl. No. 16/404,605, dated Feb. 10, 2020, 21 pages.
International Search Report and Written Opinion received for PCT Patent Application No. PCT/US2019/030963, dated Oct. 17, 2019, 21 pages.
Invitation to Pay Additional Fees received for PCT Patent Application No. PCT/US2019/030963, dated Aug. 22, 2019, 12 pages.
Non-Final Office Action received for U.S. Appl. No. 16/404,605, dated Jun. 24, 2020, 18 pages.
Non-Final Office Action received for U.S. Appl. No. 16/404,605, dated Aug. 1, 2019, 19 Pages.
Non-Final Office Action received for U.S. Appl. No. 16/404,612, dated Feb. 28, 2020, 13 pages.
Notice of Allowance received for U.S. Appl. No. 16/404,605, dated Sep. 18, 2020, 5 pages.
Notice of Allowance received for U.S. Appl. No. 16/404,612, dated Jul. 13, 2020, 6 pages.
Notice of Allowance received for U.S. Appl. No. 16/404,612. dated Aug. 7, 2019, 9 pages.
Office Action received for Australian Patent Application No. 2019100487, dated Aug. 16, 2019, 5 pages.
Office Action received for Australian Patent Application No. 2019100523, dated Jan. 23, 2020, 3 pages.
Office Action received for Australian Patent Application No. 2019100523, dated Mar. 2, 2020, 3 pages.
Office Action received for Australian Patent Application No. 2019100523, dated Sep. 2, 2019, 3 pages.
Office Action received for Australian Patent Application No. 2020100886, dated Aug. 5, 2020, 6 pages.
Bluejeans, "Video Conferencing Software | Blue Jeans", Online Available at:—https://www.bluejeans.com/features/video-conferences, 6 pages.
IDB,"HomeCam is the Best Way to View Multiple HomeKit Cameras on iPhone & Apple TV", Available online at: https://www.youtube.com/watch?v=6x2oCHgSVUU, Feb. 20, 2018, 3 pages.
Spectrum, "Using the Picture-in-Picture (PIP) Feature _ Spectrum Support", Online available at:—https://www.spectrum.net/support/tv/dvr-picture-picture/, 2 pages.
Non-Final Office Action received for U.S. Appl. No. 17/116,938, dated Jul. 30, 2021, 19 pages.
Office Action received for Japanese Patent Application No. 2021-051415, dated Jul. 19, 2021, 4 pages (2 pages of English Translation and 2 pages of Official Copy).
Office Action received for Australian Patent Application No. 2019267527, dated Jun. 24, 2021, 8 pages.
Office Action received for European Patent Application No. 19728558. 8, dated Jun. 21, 2021, 9 pages.
International Preliminary Report on Patentability received for PCT Patent Application No. PCT/US2019/030963, dated Nov. 19, 2020, 12 pages.
Extended Search Report received for European Patent Application No. 21161005.0, dated Jun. 14, 2021, 12 pages.
"Multi-camera View on Alexa", Online available at: https://forums.wyzecam.com/t/multi-camera-view-on-alexa/24290, Retrieved on May 12, 2021, 8 pages.
Office Action received for Australian Patent Application No. 2021100721, dated Jun. 4, 2021, 7 pages.

Office Action received for Chinese Patent Application No. 202011336156.9, dated May 20, 2021, 13 pages (7 pages of English Translation and 6 pages of Official Copy).
Office Action received for Japanese Patent Application No. 2020-560927, dated Jun. 10, 2021, 5 pages (2 pages of English Translation and 3 pages of Official Copy).
Certificate of Examination received for Australian Patent Application No. 2020100886, dated Dec. 22, 2020, 2 pages.
Search Report and Opinion received for Danish Patent Application No. PA202070627, dated Jan. 26, 2021, 9 pages.
Corrected Notice of Allowance received for U.S. Appl. No. 16/404,605, dated Dec. 23, 2020, 3 pages.
Office Action received for Korean Patent Application No. 10-2020-7031700, dated Dec. 15, 2020, 6 pages (2 pages of English Translation and 4 pages of official Copy).
Summons to Attend Oral Proceedings received for European Patent Application No. 19728558.8, mailed on Jan. 18, 2022, 9 pages.
Decision to Grant received for Japanese Patent Application No. 2021-051415, dated Jan. 6, 2022, 3 pages (1 page of English Translation and 2 pages of Official Copy).
Intention to Grant received for Danish Patent Application No. PA202070627, dated Jan. 4, 2022, 2 pages.
Notice of Allowance received for Chinese Patent Application No. 202011336156.9, dated Jan. 6, 2022, 3 pages (2 pages of English Translation and 1 pages of Official Copy).
Applicant-Initiated Interview Summary received for U.S. Appl. No. 17/116,938, dated Dec. 13, 2021, 3 pages.
Certificate of Examination received for Australian Patent Application No. 2021100721, dated Dec. 16, 2021, 2 pages.
Office Action received for Australian Patent Application No. 2019267527, dated Dec. 2, 2021, 4 pages.
Office Action received for Japanese Patent Application No. 2020-560927, dated Dec. 1, 2021, 3 pages (1 page of English Translation and 2 pages of Official Copy).
International Search Report and Written Opinion received for PCT Patent Application No. PCT/US2021/035715, dated Nov. 15, 2021, 19 pages.
Notice of Allowance received for Korean Patent Application No. 10-2021-7022610, dated Oct. 13, 2021, 3 pages (1 page of English Translation and 2 pages of Official Copy).
Office Action received for Australian Patent Application No. 2021100721, dated Oct. 18, 2021, 4 pages.
Office Action received for Chinese Patent Application No. 202110248576.X, dated Sep. 15, 2021, 28 pages (16 pages of English Translation and 12 pages of Official Copy).
Office Action received for Danish Patent Appiication No. PA202070627, dated Oct. 19, 2021, 3 pages.
Invitation to Pay Additional Fees and Partial International Search Report received for PCT Patent Application No. PCT/US2021/035715, dated Sep. 21, 2021, 15 pages.
Decision to Grant received for Danish Patent Application No. PA202070627, dated May 11, 2022, 2 pages.
Final Office Action received for U.S. Appl. No. 17/116,938, dated Mar. 1, 2022, 27 pages.
Notice of Allowance received for Chinese Patent Application No. 202110248576.X, dated Mar. 21, 2022, 2 pages (1 page of English Translation and 1 page of Official Copy).
Office Action received for Australian Patent Application No. 2019267527, dated Mar. 3, 2022, 3 pages.
Office Action received for European Patent Application No. 21161005. 0, dated Apr. 22, 2022, 11 pages.
Office Action received for Indian Patent Application No. 202118046028, dated Apr. 6, 2022, 6 pages.
Notice of Allowance received for Japanese Patent Application No. 2020-560927, dated May 30, 2022, 3 pages (1 page of English Translation and 2 pages of Official Copy).
Search Report and Opinion received for Danish Patent Application No. PA202270086, dated Apr. 7, 2022, 11 pages.
Applicant-Initiated Interview Summary received for U.S. Appl. No. 17/337,110, dated Sep. 21, 2022, 2 pages.
Brief Communication Regarding Oral Proceedings received for European Patent Application No. 19728558.8, mailed on Jul. 5, 2022, 1 page.

(56) References Cited

OTHER PUBLICATIONS

Result of Consultation received for European Patent Application No. 19728558.8, mailed on Jun. 28, 2022, 4 pages.
Extended European Search Report received for European Patent Application No. 22191264.5, dated Nov. 11, 2022, 8 pages.
Notice of Allowance received for Korean Patent Application No. 10-2022-7014651, dated Aug. 18, 2022, 5 pages (2 pages of English Translation and 3 pages of Official Copy).
Non-Final Office Action received for U.S. Appl. No. 17/116,938, dated Aug. 1, 2022, 15 pages.
Applicant-Initiated Interview Summary received for U.S. Appl. No. 17/116,938, dated Oct. 13, 2022, 3 pages.
Notice of Allowance received for U.S. Appl. No. 17/337,110, dated Oct. 11, 2022, 11 pages.
Applicant-Initiated Interview Summary received for U.S. Appl. No. 17/116,938, dated Jun. 14, 2022, 2 pages.
Non-Final Office Action received for U.S. Appl. No. 17/337,110, dated Jun. 20, 2022, 30 pages.
Office Action received for Australian Patent Application No. 2019267527, dated Jun. 15, 2022, 3 pages.
International Preliminary Report on Patentability received for PCT Patent Application No. PCT/US2021/035715, dated Dec. 15, 2022, 14 pages.
Notice of Allowance received for Korean Patent Application No. 10-2022-7014651, dated Nov. 25, 2022, 7 pages (2 pages of English Translation and 5 pages of Official Copy).
Office Action received for Chinese Patent Application No. 202210646482.2, dated Dec. 28, 2022, 17 pages (9 pages of English Translation and 8 pages of Official Copy).

\* cited by examiner

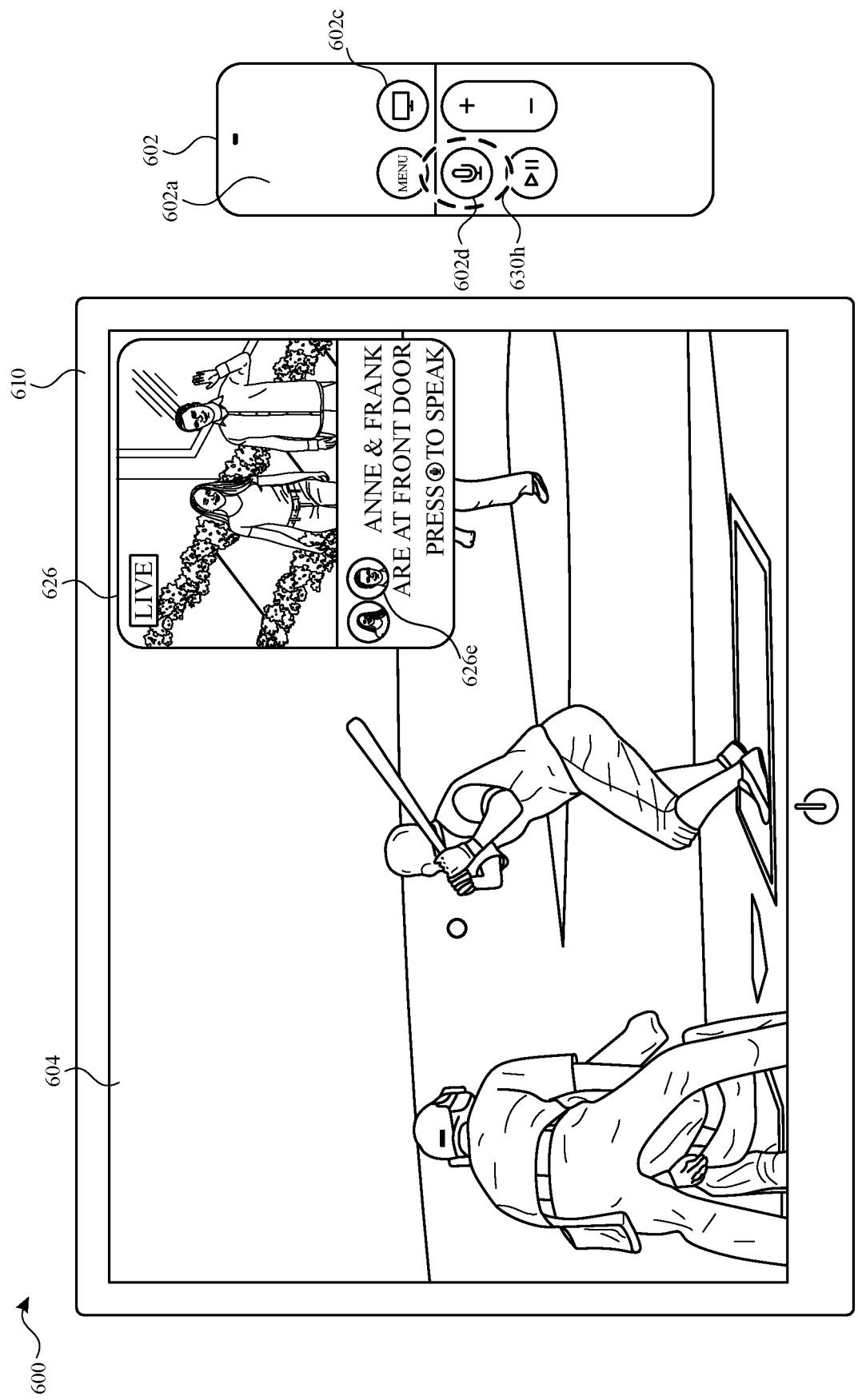

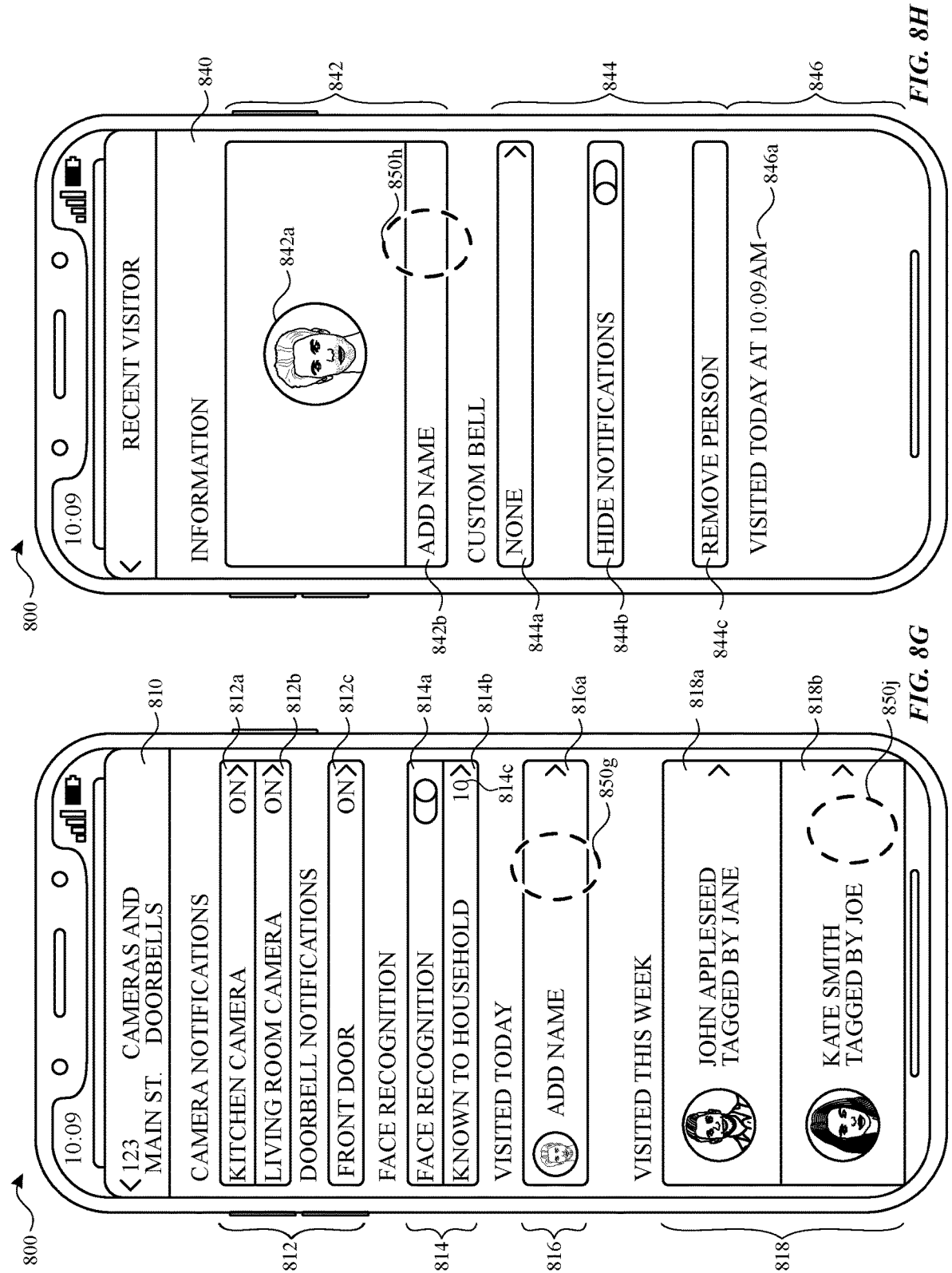

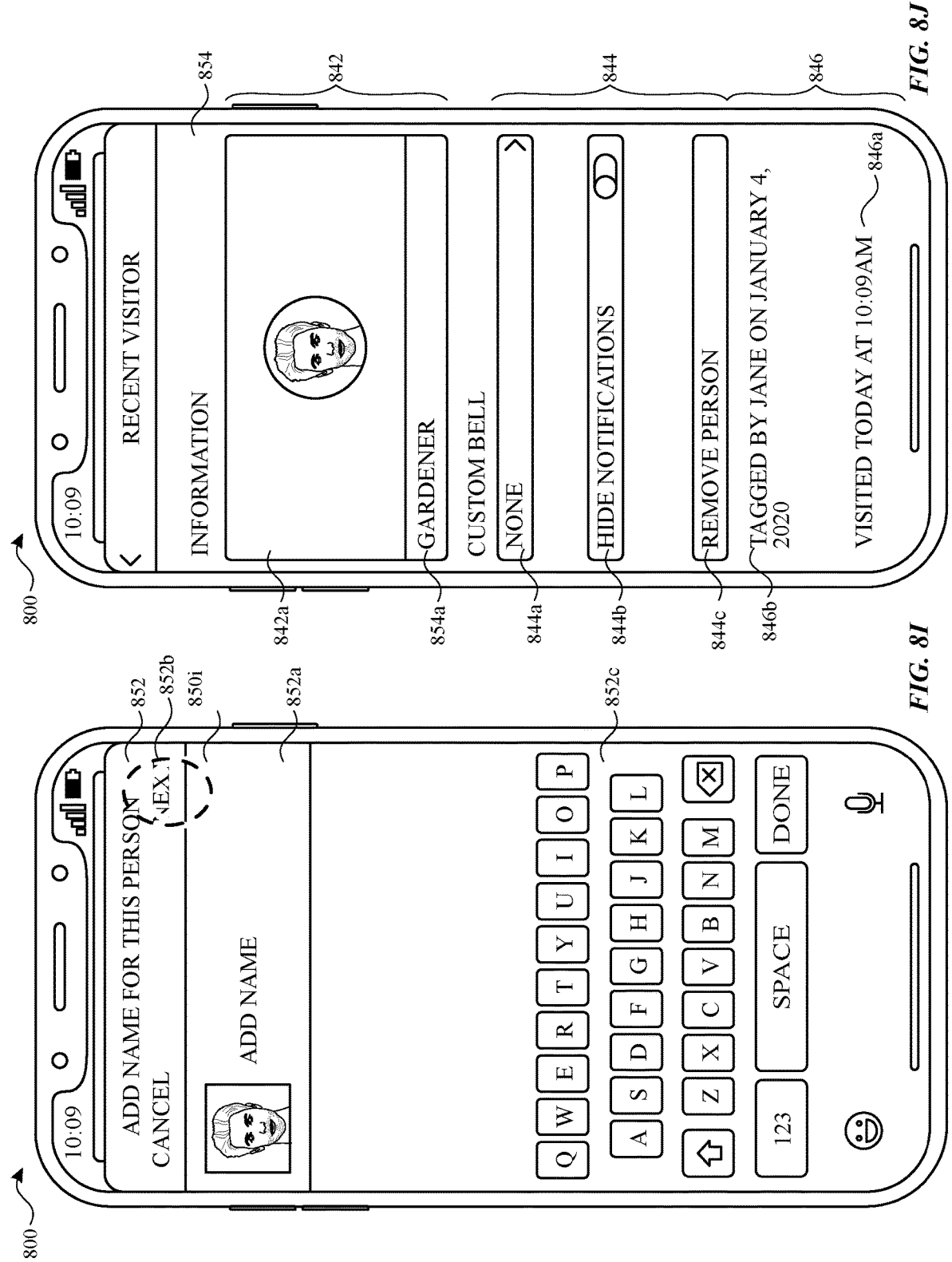

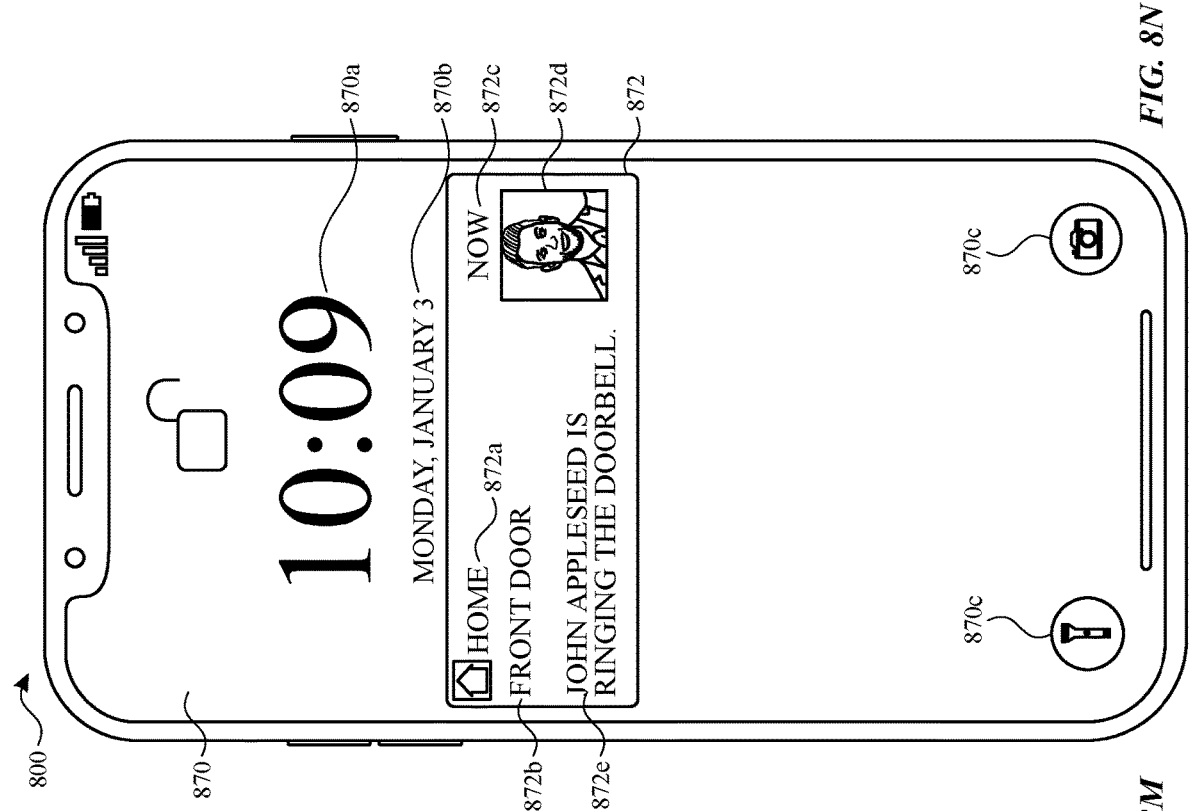

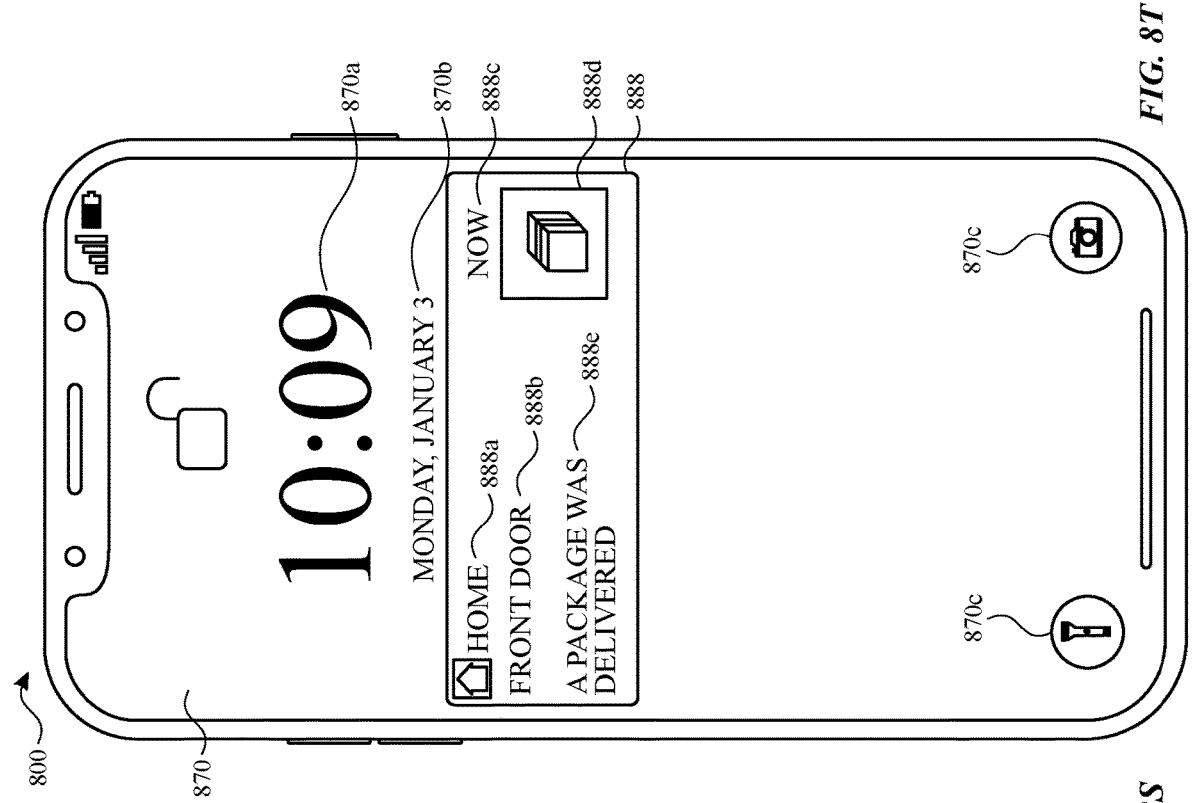
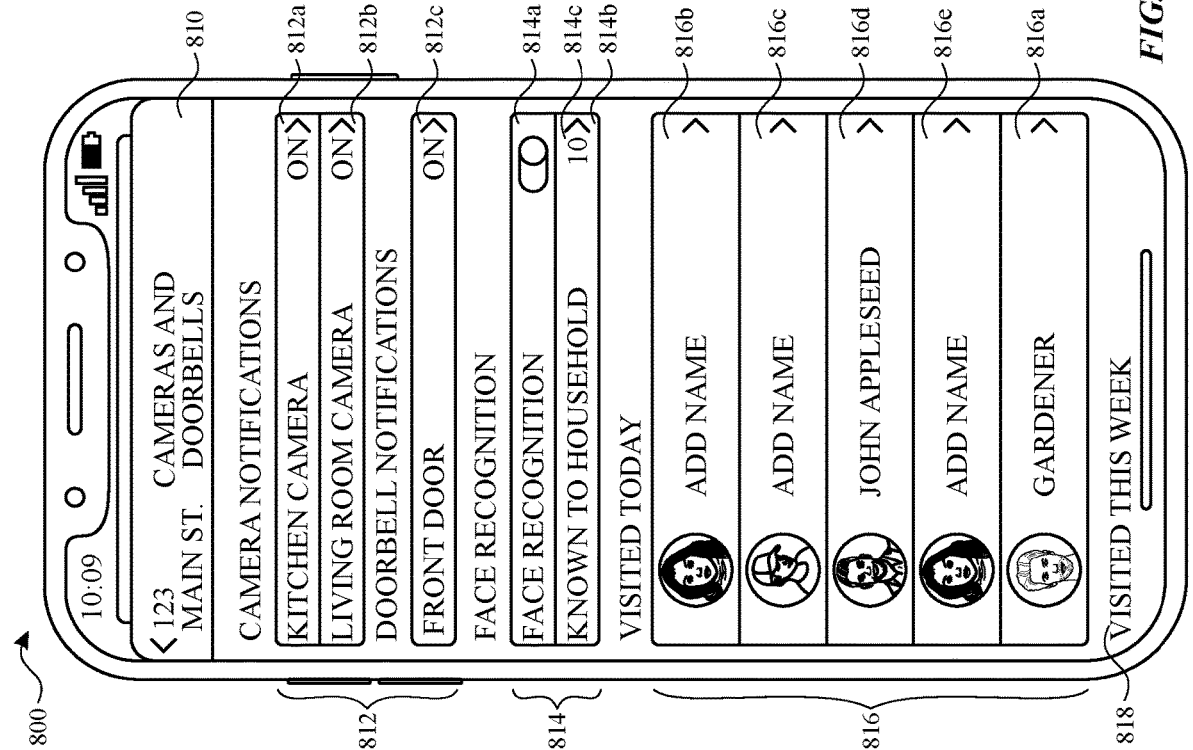
FIG. 8S
FIG. 8T

CAMERA AND VISITOR USER INTERFACES

CROSS-REFERENCE TO RELATED APPLICATIONS

This application claims priority to U.S. Provisional Patent Application Ser. No. 63/034,313, filed on Jun. 3, 2020, titled "CAMERA AND VISITOR USER INTERFACES," the content of which is hereby incorporated by reference in its entirety.

FIELD

The present disclosure relates generally to computer user interfaces, and more specifically to techniques for managing camera views and visitors.

BACKGROUND

Cameras installed inside or outside of a home enable residents of the home to view events that occur, or have occurred, at entry points to the home. The cameras record video or take images of the entry points, which residents can view from various electronic devices.

BRIEF SUMMARY

Some techniques for managing camera views and visitors using electronic devices, however, are generally cumbersome and inefficient. For example, residents may want to be notified of events captured by cameras, visitors at entry points, or other notable events. For another example, some existing techniques for managing camera views or notifications use a complex and time-consuming user interfaces, which may include multiple key presses or keystrokes. As another example, some existing techniques do not enable users to switch between different camera views while maintaining the ability to control other accessories. Other existing techniques do not provide users with an ability to obtain information related to recent visitors in images captured by the camera, where the information is different for visitors known to the home and visitors unknown to the home. Further, other existing techniques do not provide notifications of suggestions based on an event corresponding to a media stream that is available for display. Even further, other existing techniques do not provide notifications identifying a currently signed in user or user account and providing options or instructions for signing in a different user or user account. Existing techniques require more time than necessary, wasting user time and device energy. This latter consideration is particularly important in battery-operated devices.

Accordingly, the present techniques provides electronic devices with faster, more efficient methods and interfaces for managing camera views and visitors. Such methods and interfaces optionally complement or replace other methods for managing camera views and visitors. Such methods and interfaces reduce the cognitive burden on a user and produce a more efficient human-machine interface. For battery-operated computing devices, such methods and interfaces conserve power and increase the time between battery charges.

A method is described, in accordance with some embodiments. The method includes, at a computer system that is in communication with a display generation component: while displaying, via the display generation component, content, receiving a first input; in response to receiving the first input, displaying, via the display generation component, a camera view at least partially overlaid on the content, the camera view displayed using a first visual configuration; while displaying, via the display generation component, the camera view having the first visual configuration overlaid on the content, receiving a second input; and in response to receiving the second input: concurrently displaying, via the display generation component: the camera view using a second visual configuration that is different from the first visual configuration; and an accessory control user interface object corresponding to an accessory device, wherein selection of the accessory control user interface object initiates a process to transmit an instruction to change a state of the accessory device.

A non-transitory computer-readable storage medium is described, in accordance with some embodiments. The non-transitory computer-readable storage medium stores one or more programs configured to be executed by one or more processors of a computer system in communication with a display generation component, the one or more programs including instructions for: while displaying, via the display generation component, content, receiving a first input; in response to receiving the first input, displaying, via the display generation component, a camera view at least partially overlaid on the content, the camera view displayed using a first visual configuration; while displaying, via the display generation component, the camera view having the first visual configuration overlaid on the content, receiving a second input; and in response to receiving the second input: concurrently displaying, via the display generation component: the camera view using a second visual configuration that is different from the first visual configuration; and an accessory control user interface object corresponding to an accessory device, wherein selection of the accessory control user interface object initiates a process to transmit an instruction to change a state of the accessory device.

A transitory computer-readable storage medium is described, in accordance with some embodiments. The transitory computer-readable storage medium stores one or more programs configured to be executed by one or more processors of a computer system in communication with a display generation component, the one or more programs including instructions for: while displaying, via the display generation component, content, receiving a first input; in response to receiving the first input, displaying, via the display generation component, a camera view at least partially overlaid on the content, the camera view displayed using a first visual configuration; while displaying, via the display generation component, the camera view having the first visual configuration overlaid on the content, receiving a second input; and in response to receiving the second input: concurrently displaying, via the display generation component: the camera view using a second visual configuration that is different from the first visual configuration; and an accessory control user interface object corresponding to an accessory device, wherein selection of the accessory control user interface object initiates a process to transmit an instruction to change a state of the accessory device.

A computer system is described, in accordance with some embodiments. The computer system includes a display generation component; one or more input devices; one or more processors; and memory storing one or more programs configured to be executed by the one or more processors, the one or more programs including instructions for: while displaying, via the display generation component, content, receiving a first input; in response to receiving the first input, displaying, via the display generation component, a camera view at least partially overlaid on the content, the camera view displayed using a first visual configuration; while displaying, via the display generation component, the camera view having the first visual configuration overlaid on the content, receiving a second input; and in response to receiving the second input: concurrently displaying, via the display generation component: the camera view using a second visual configuration that is different from the first visual configuration; and an accessory control user interface object corresponding to an accessory device, wherein selection of the accessory control user interface object initiates a process to transmit an instruction to change a state of the accessory device.

A computer system is described, in accordance with some embodiments. The computer system includes a display generation component; while displaying, via the display generation component, content, means for receiving a first input; in response to receiving the first input, means for displaying, via the display generation component, a camera view at least partially overlaid on the content, the camera view displayed using a first visual configuration; while displaying, via the display generation component, the camera view having the first visual configuration overlaid on the content, means for receiving a second input; and in response to receiving the second input: means for concurrently displaying, via the display generation component: the camera view using a second visual configuration that is different from the first visual configuration; and an accessory control user interface object corresponding to an accessory device, wherein selection of the accessory control user interface object initiates a process to transmit an instruction to change a state of the accessory device.

A method is described, in accordance with some embodiments. The method includes, at a computer system that is in communication with a display generation component: at a computer system that is in communication with a display generation component: displaying, via the display generation component, a plurality of affordances corresponding to visitor images captured by a camera, wherein the camera is associated with the computer system, and wherein the plurality of affordances includes: a first affordance corresponding to a first visitor that is a known visitor; and a second affordance, different from the first affordance, corresponding to a second visitor that is an unknown visitor; while displaying the plurality of affordances corresponding to visitor images captured by the doorbell camera, receiving a first user input; and in response to receiving the first user input: in accordance with a determination that the first user input corresponds to selection of the first affordance, displaying a first user interface including information corresponding to the first visitor; in accordance with a determination that the first user input corresponds to selection of the second affordance, initiating a process to classify the second visitor as a known visitor, including displaying a second user interface; subsequent to displaying the second user interface, receiving one or more inputs corresponding to a name; and in response to receiving the one or more inputs corresponding to the name, classifying the second visitor as a known visitor.

A non-transitory computer-readable storage medium is described, in accordance with some embodiments. The non-transitory computer-readable storage medium stores one or more programs configured to be executed by one or more processors of a computer system in communication with a display generation component, the one or more programs including instructions for: displaying, via the display generation component, a plurality of affordances corresponding to visitor images captured by a camera, wherein the camera is associated with the computer system, and wherein the plurality of affordances includes: a first affordance corresponding to a first visitor that is a known visitor; and a second affordance, different from the first affordance, corresponding to a second visitor that is an unknown visitor; while displaying the plurality of affordances corresponding to visitor images captured by the doorbell camera, receiving a first user input; and in response to receiving the first user input: in accordance with a determination that the first user input corresponds to selection of the first affordance, displaying a first user interface including information corresponding to the first visitor; in accordance with a determination that the first user input corresponds to selection of the second affordance, initiating a process to classify the second visitor as a known visitor, including displaying a second user interface; subsequent to displaying the second user interface, receiving one or more inputs corresponding to a name; and in response to receiving the one or more inputs corresponding to the name, classifying the second visitor as a known visitor.

A transitory computer-readable storage medium is described, in accordance with some embodiments. The transitory computer-readable storage medium stores one or more programs configured to be executed by one or more processors of a computer system in communication with a display generation component, the one or more programs including instructions for: displaying, via the display generation component, a plurality of affordances corresponding to visitor images captured by a camera, wherein the camera is associated with the computer system, and wherein the plurality of affordances includes: a first affordance corresponding to a first visitor that is a known visitor; and a second affordance different from the first affordance, corresponding to a second visitor that is an unknown visitor; while displaying the plurality of affordances corresponding to visitor images captured by the doorbell camera, receiving a first user input; and in response to receiving the first user input: in accordance with a determination that the first user input corresponds to selection of the first affordance, displaying a first user interface including information corresponding to the first visitor; in accordance with a determination that the first user input corresponds to selection of the second affordance, initiating a process to classify the second visitor as a known visitor, including displaying a second user interface; subsequent to displaying the second user interface, receiving one or more inputs corresponding to a name; and in response to receiving the one or more inputs corresponding to the name, classifying the second visitor as a known visitor.

A computer system is described, in accordance with some embodiments. The computer system includes a display generation component; one or more input devices; one or more processors; and memory storing one or more programs configured to be executed by the one or more processors, the one or more programs including instructions for: displaying, via the display generation component, a plurality of affordances corresponding to visitor images captured by a camera, wherein the camera is associated with the computer system, and wherein the plurality of affordances includes: a first affordance corresponding to a first visitor that is a known visitor; and a second affordance, different from the first affordance, corresponding to a second visitor that is an unknown visitor; while displaying the plurality of affordances corresponding to visitor images captured by the doorbell camera, receiving a first user input; and in response to receiving the first user input: in accordance with a determination that the first user input corresponds to selection of the first affordance, displaying a first user interface including information corresponding to the first visitor; in accordance with a determination that the first user input corresponds to selection of the second affordance, initiating a process to classify the second visitor as a known visitor, including displaying a second user interface; subsequent to displaying the second user interface, receiving one or more inputs corresponding to a name; and in response to receiving the one or more inputs corresponding to the name, classifying the second visitor as a known visitor.

A computer system is described, in accordance with some embodiments. The computer system includes a display generation component; means for displaying, via the display generation component, a plurality of affordances corresponding to visitor images captured by a camera, wherein the camera is associated with the computer system, and wherein the plurality of affordances includes: a first affordance corresponding to a first visitor that is a known visitor; and a second affordance, different from the first affordance, corresponding to a second visitor that is an unknown visitor; while displaying the plurality of affordances corresponding to visitor images captured by the doorbell camera, means for receiving a first user input; and in response to receiving the first user input means for: in accordance with a determination that the first user input corresponds to selection of the first affordance, displaying a first user interface including information corresponding to the first visitor; in accordance with a determination that the first user input corresponds to selection of the second affordance, initiating a process to classify the second visitor as a known visitor, including displaying a second user interface; subsequent to displaying the second user interface, means for receiving one or more inputs corresponding to a name; and in response to receiving the one or more inputs corresponding to the name, means for classifying the second visitor as a known visitor.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing camera views and visitors, thereby increasing the effectiveness, efficiency, and user satisfaction with such devices. Such methods and interfaces may complement or replace other methods for managing camera views and visitors.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing camera views and visitors. For example, when viewing content on an electronic device, users typically must stop or pause the content to display a view from a camera of the home. Further, replacing the content with an enlarged view from the camera of the home may be impossible or require navigation of cumbersome interfaces. Such techniques can reduce the cognitive burden on a user that wishes to receive the view from the camera while content is displayed on the electronic device, thereby enhancing productivity. As another example, users viewing a recent list of individuals that visited the home can distinguish between individual visitors and whether the respective individual is known to someone in the home. Such techniques can also reduce the cognitive burden on a user that would like to see the visitors to the home that are most relevant to the user, thereby enhancing productivity. Further, such techniques can reduce processor and battery power otherwise wasted on redundant user inputs.

Figure 6A:
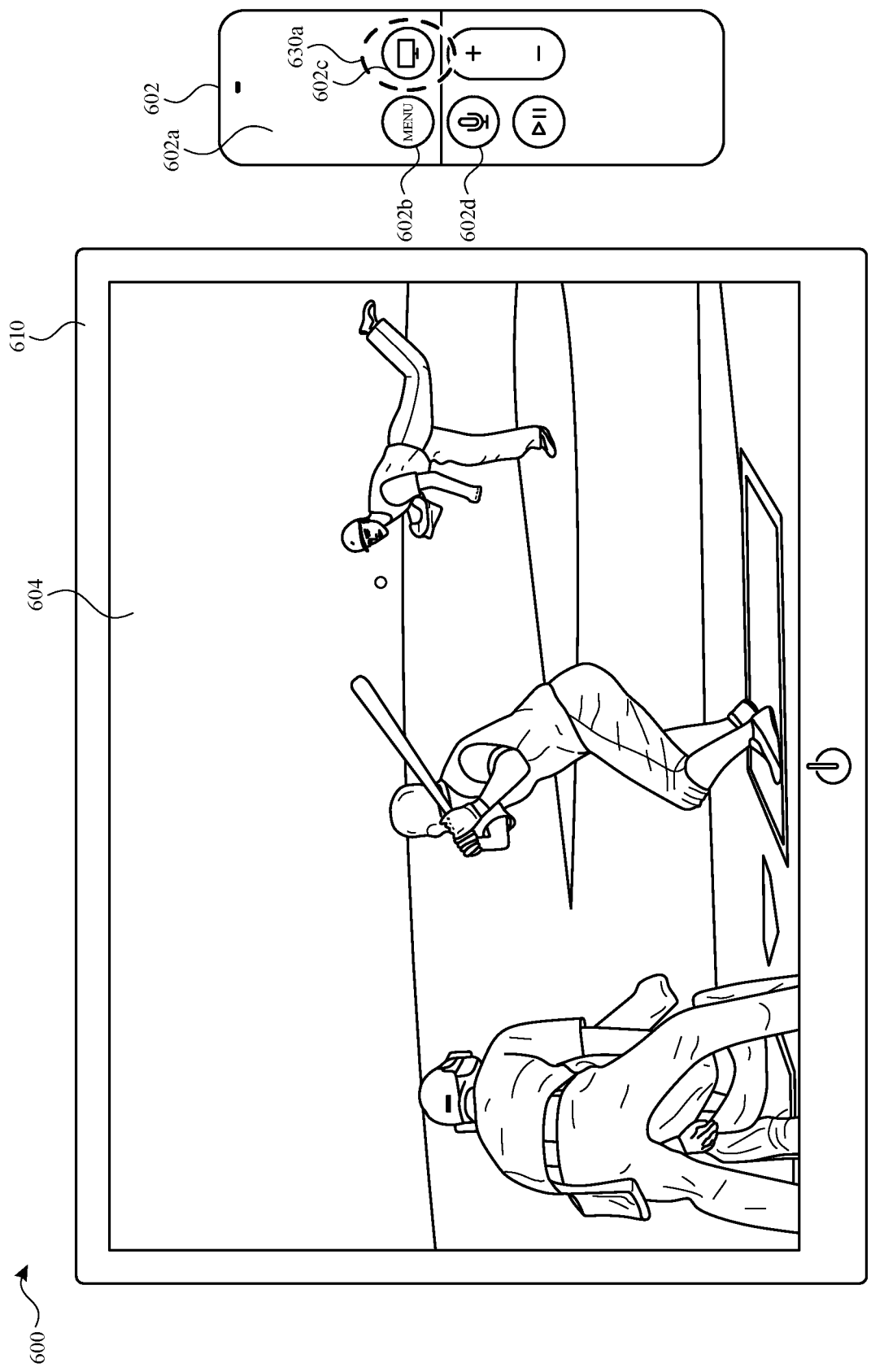
FIGS. 6A-6U illustrate exemplary devices and users interfaces for displaying camera views, in accordance with some embodiments.
Figure 6U:
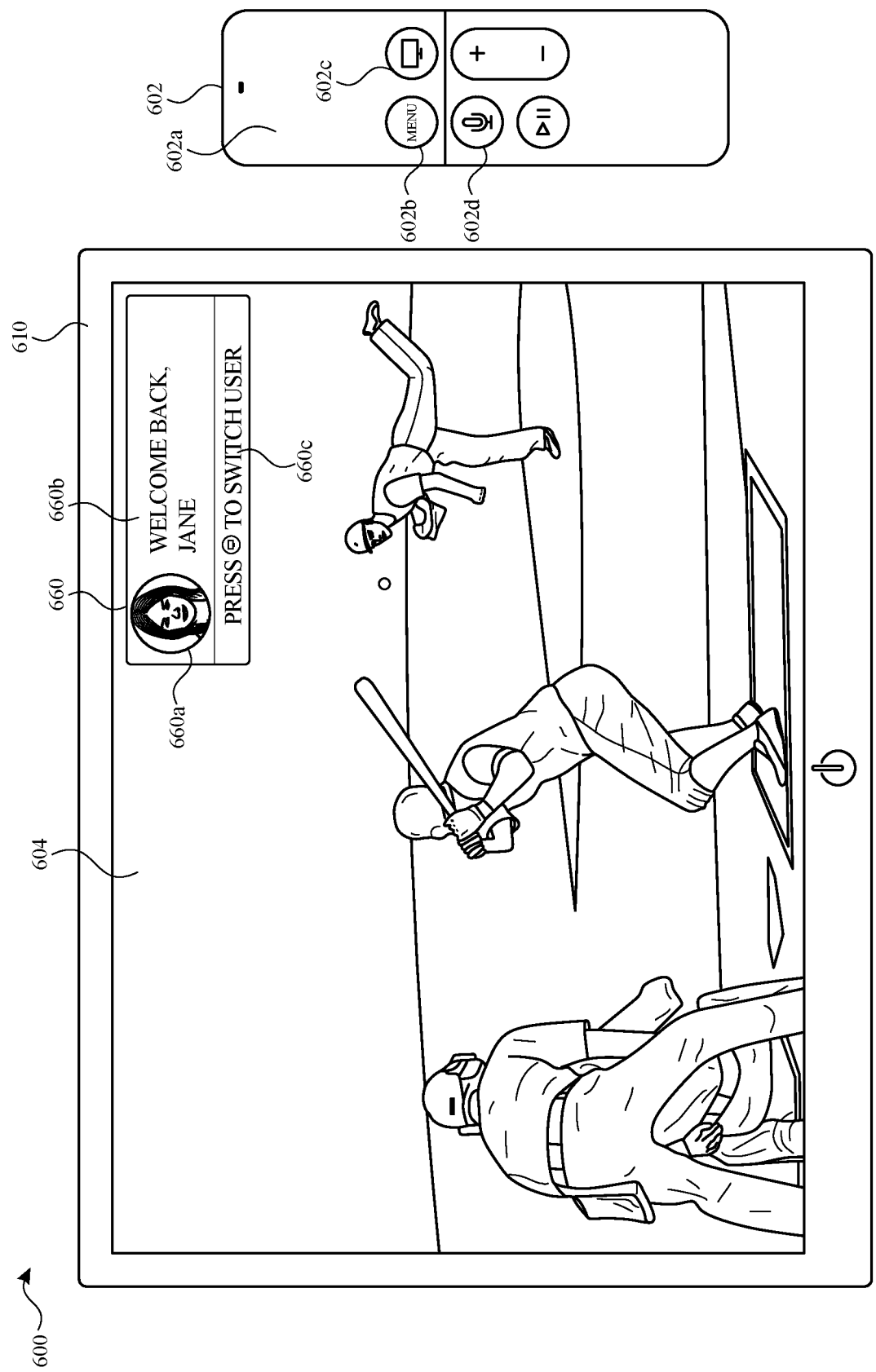
Figure 7:
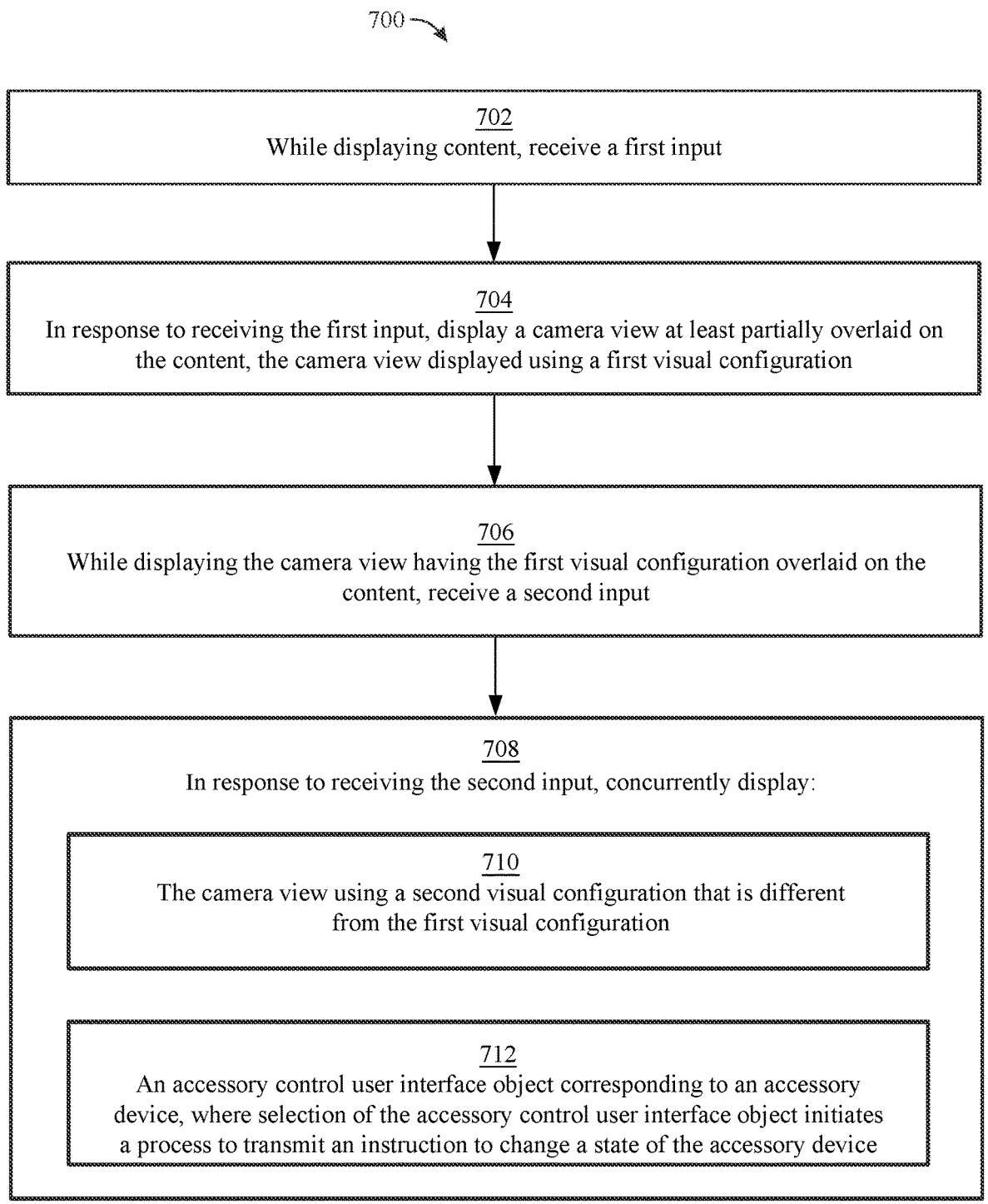
FIG. 7 illustrates a flow diagram of a process for displaying camera views, in accordance with some embodiments.
Figures 8A, 8B:
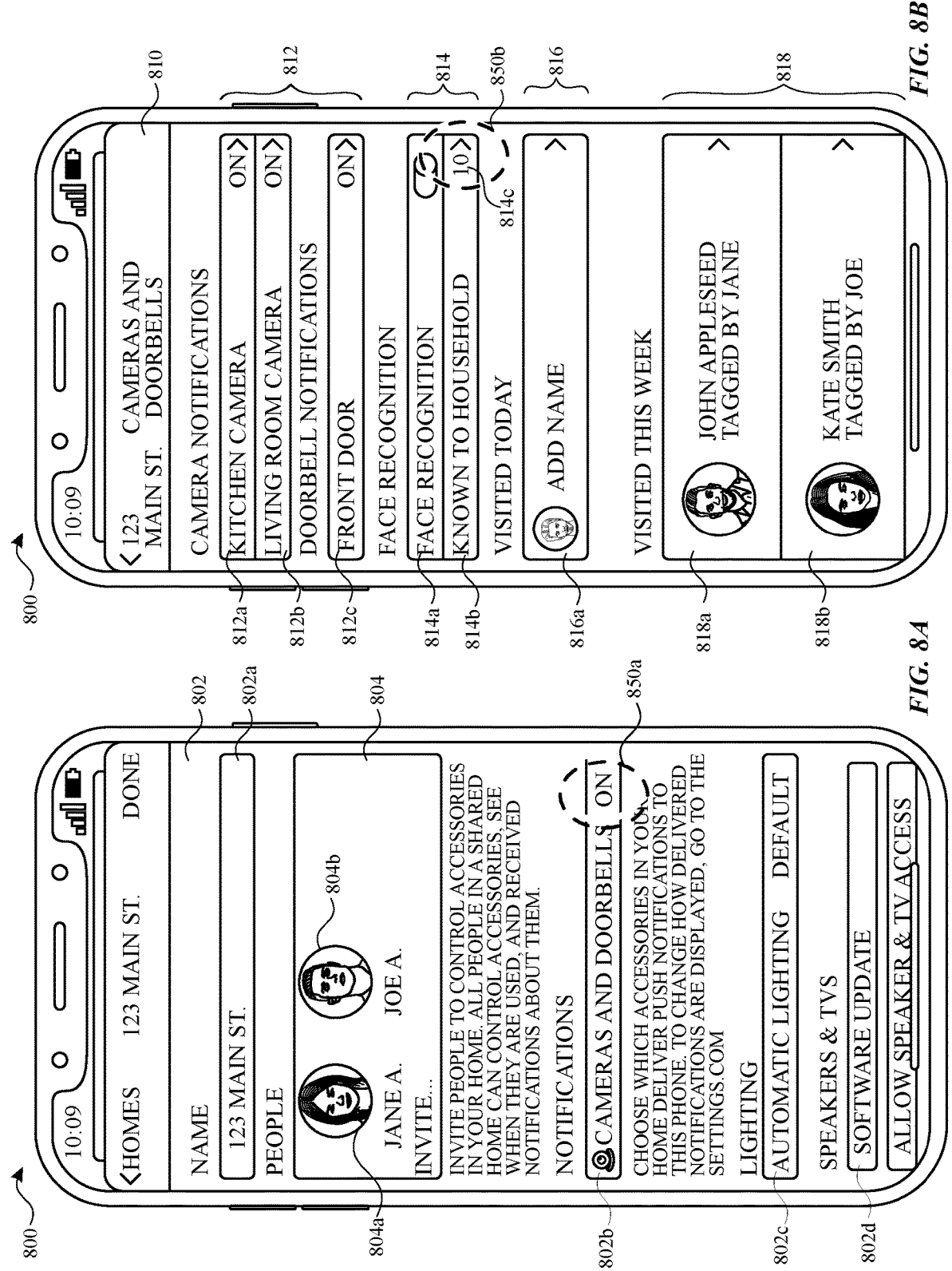
FIGS. 8A-8W illustrate exemplary devices and user interfaces for managing visitors, in accordance with some embodiments.
Figure 8W:
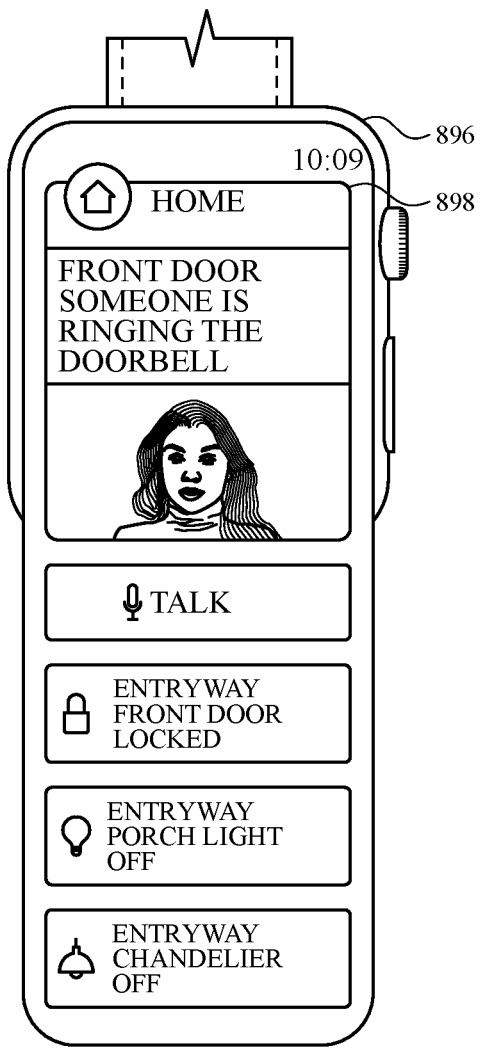
Figure 9:
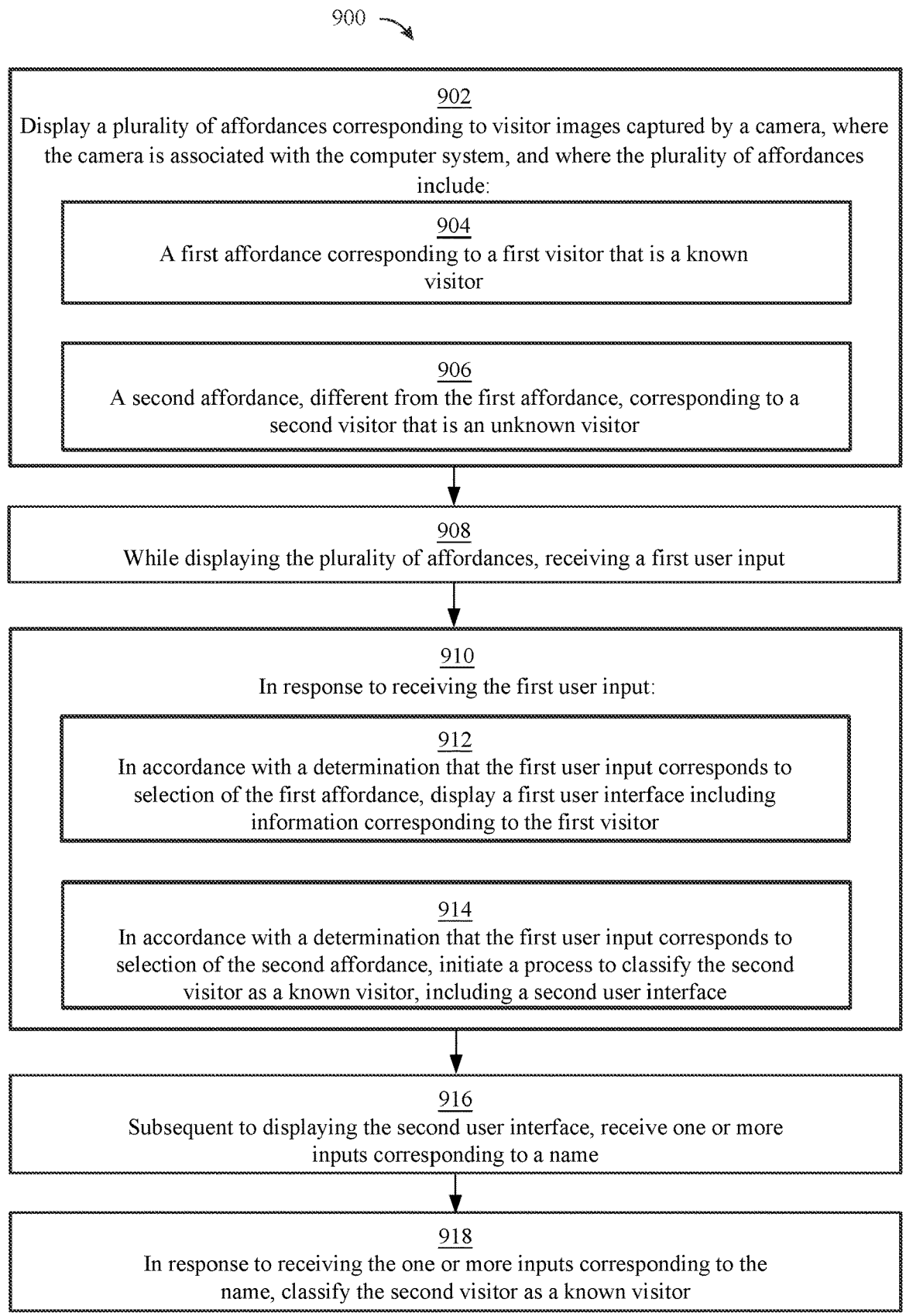
FIG. 9 illustrates a flow diagram of a process for managing visitors, in accordance with some embodiments.

Below, FIGS. 1A-1B, 2, 3, 4A-4B, and 5A-5H provide a description of exemplary devices for performing the techniques for managing event notifications. FIGS. 6A-6U illustrate exemplary user interfaces for displaying camera views. FIG. 7 is a flow diagram illustrating methods of displaying camera views in accordance with some embodiments. The user interfaces in FIGS. 6A-6U are used to illustrate the processes described below, including the processes in FIG. 7. FIGS. 8A-8W illustrate exemplary user interfaces for managing visitors. FIG. 9 is a flow diagram illustrating methods of managing visitors in accordance with some embodiments. The user interfaces in FIGS. 8A-8W are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
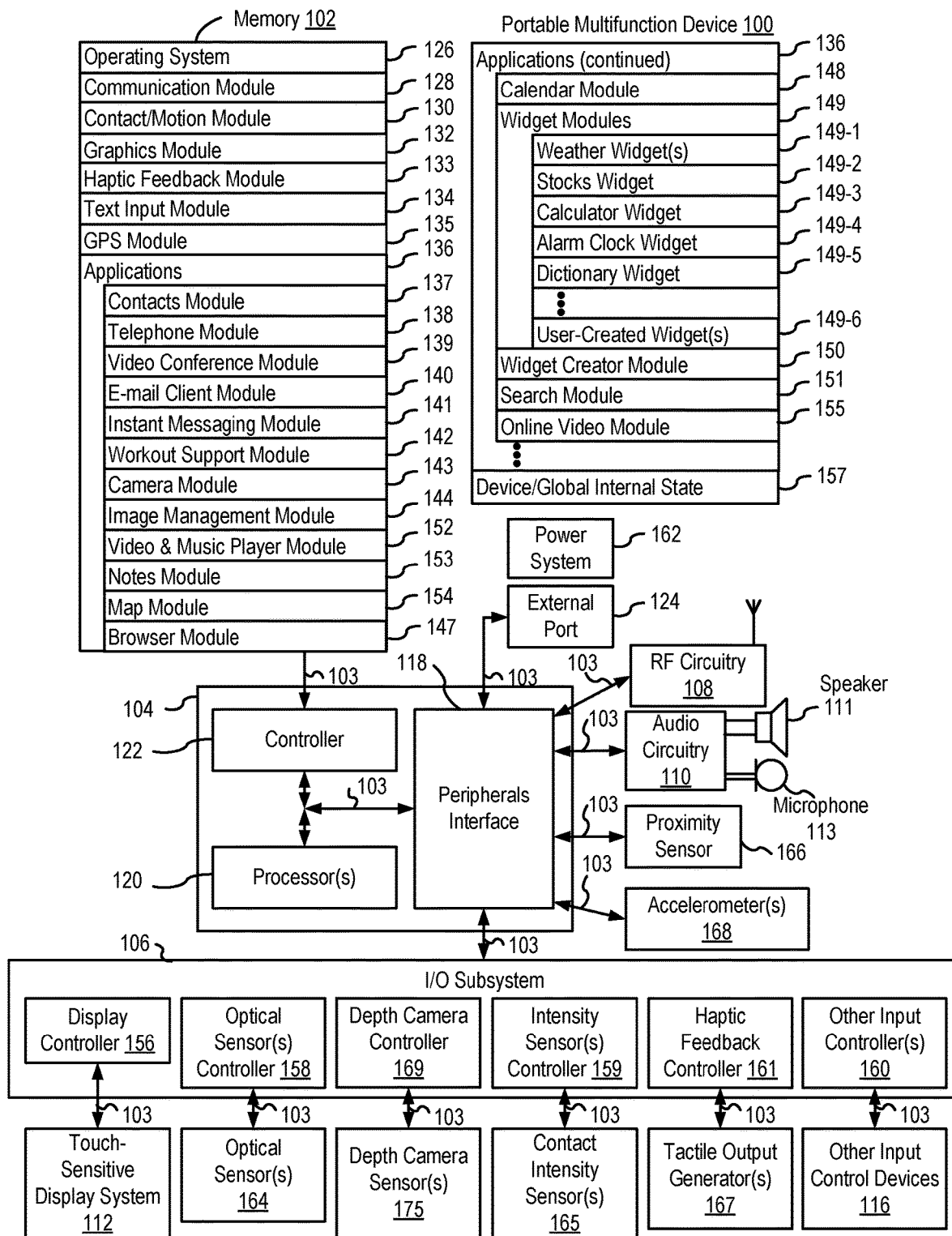
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
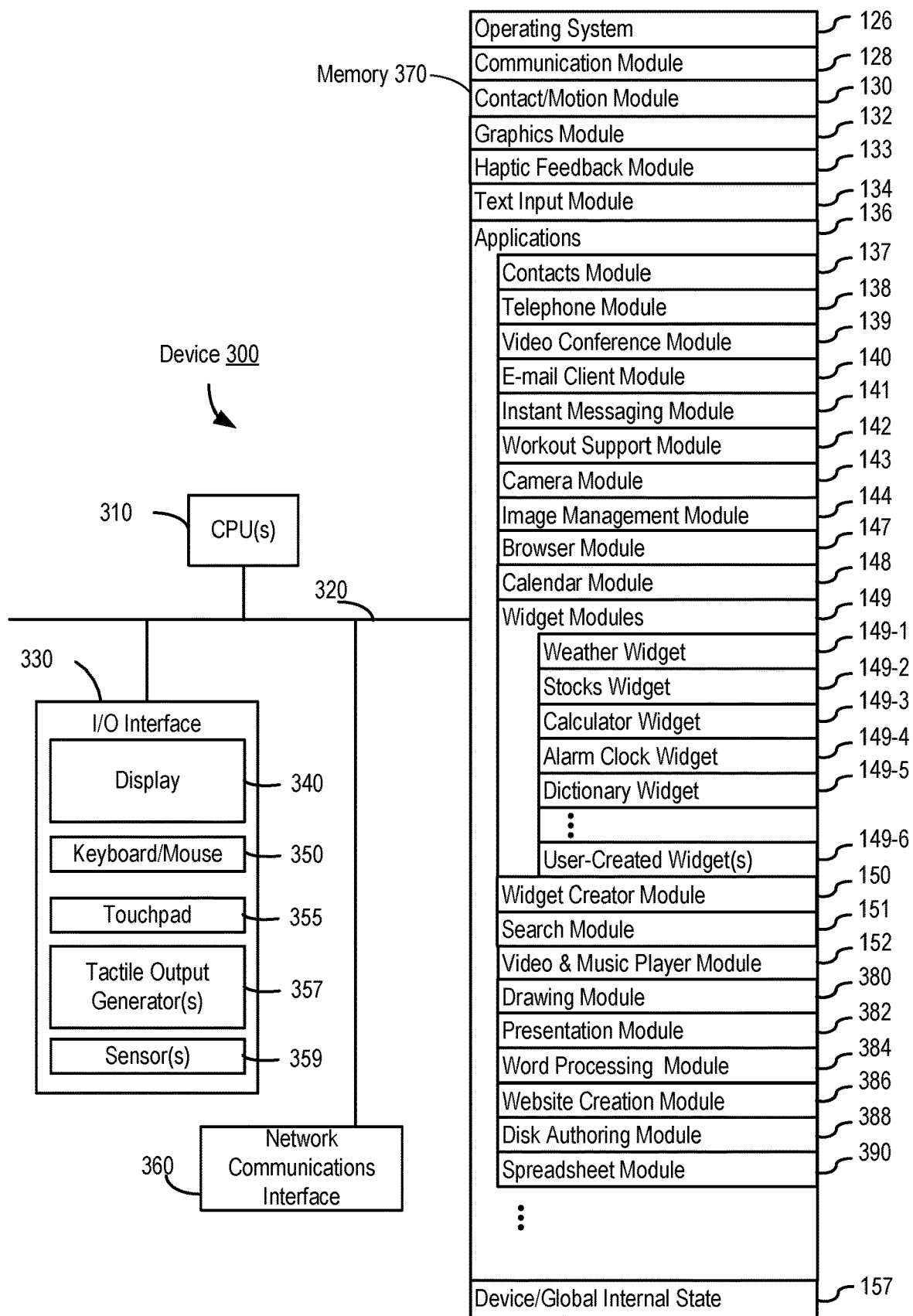
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
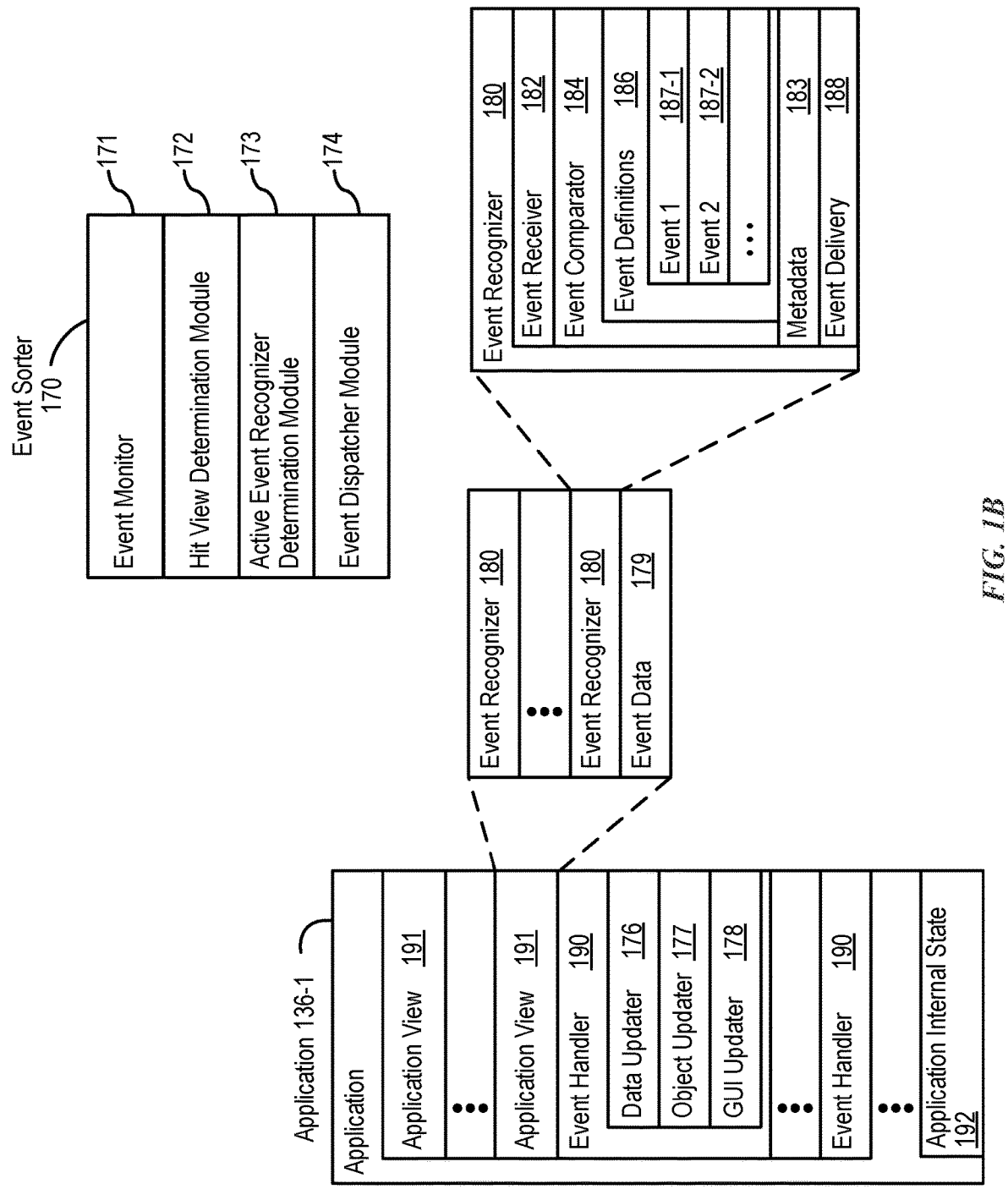
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
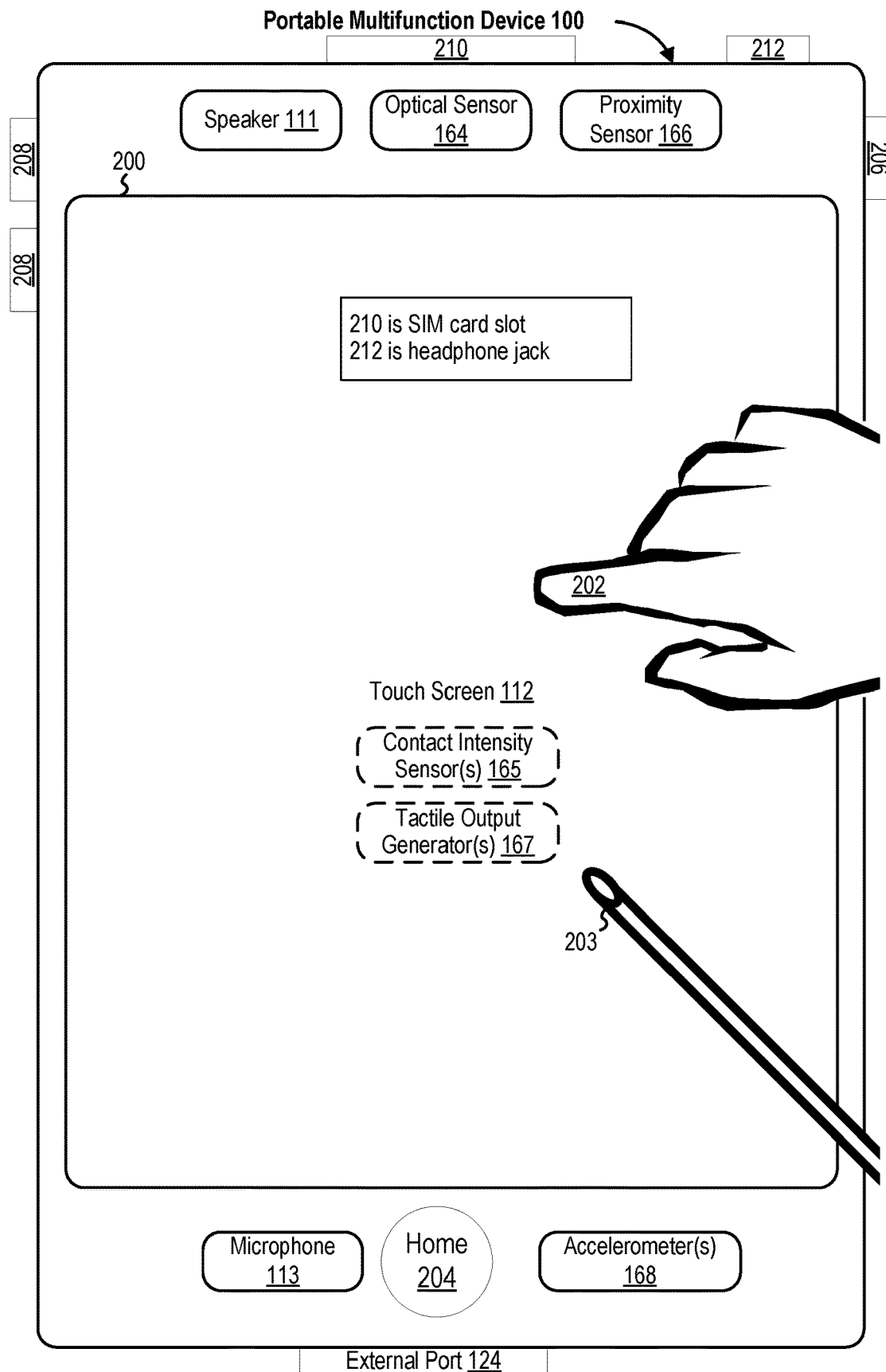
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
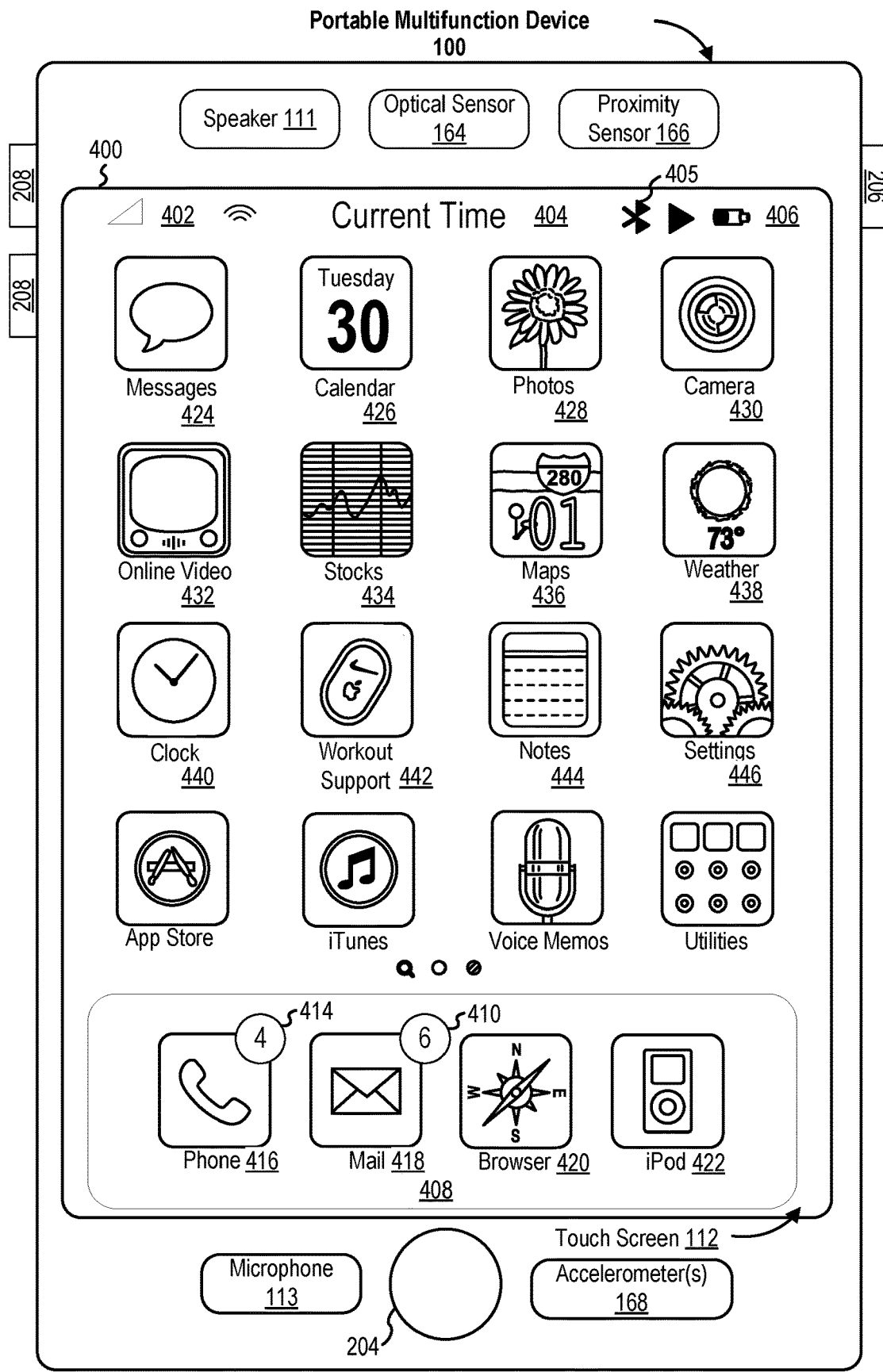
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
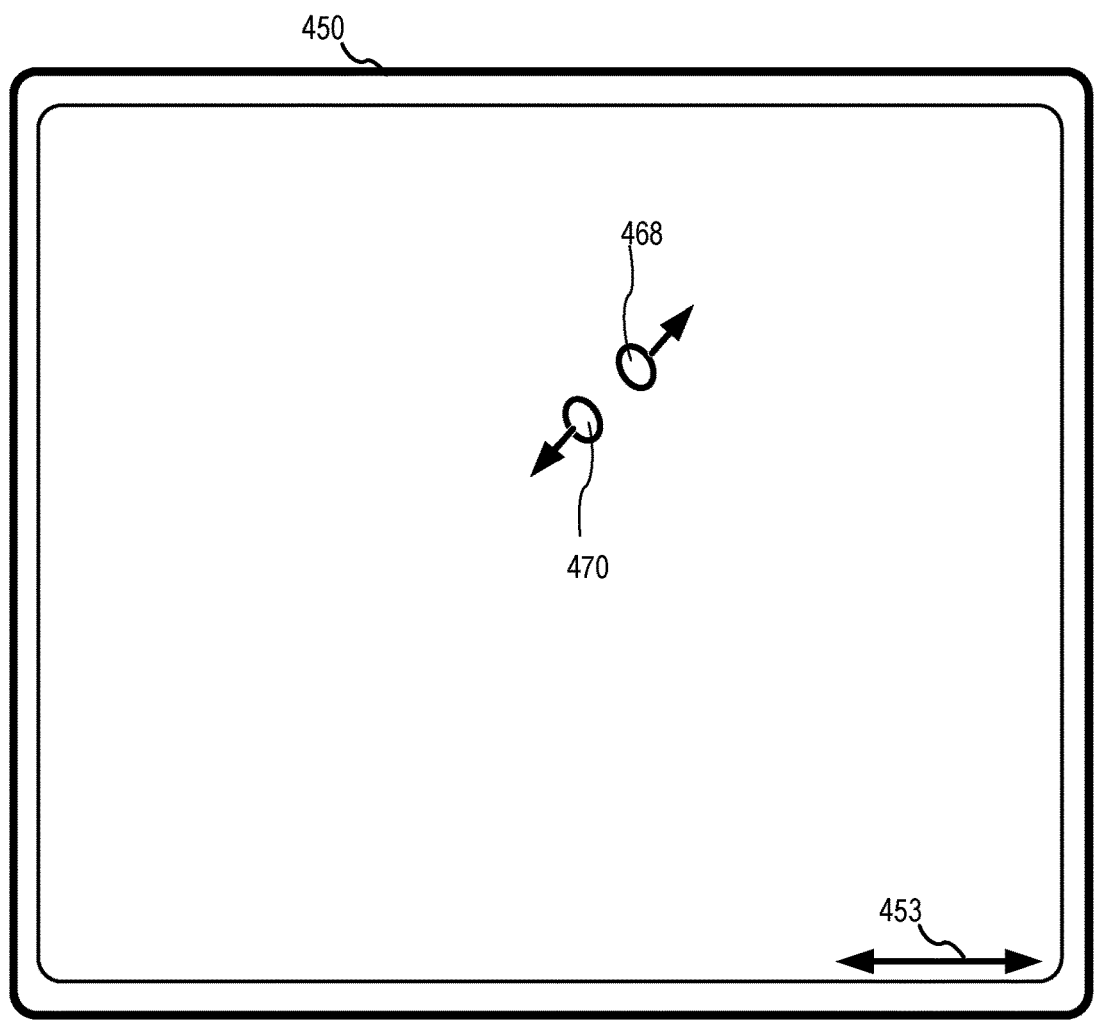
FIG. 4B illustrates an exemplary user interface for a multifunction device with a touch-sensitive surface that is separate from the display in accordance with some embodiments.
Figure 4B:
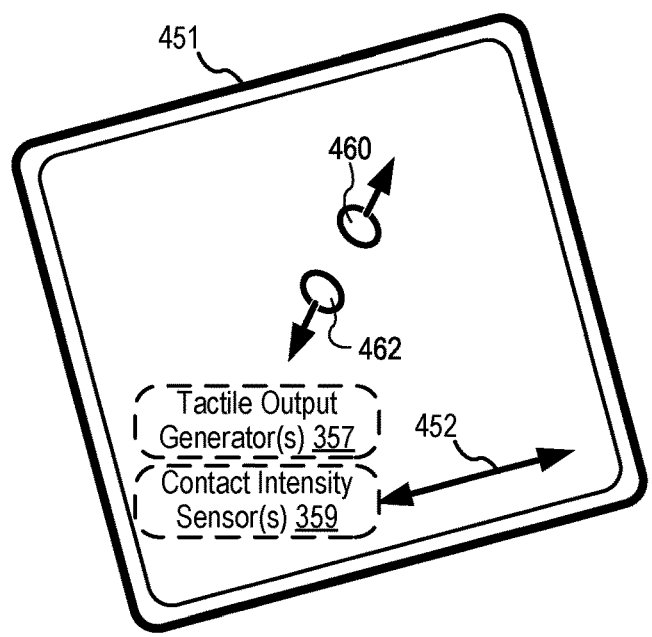

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
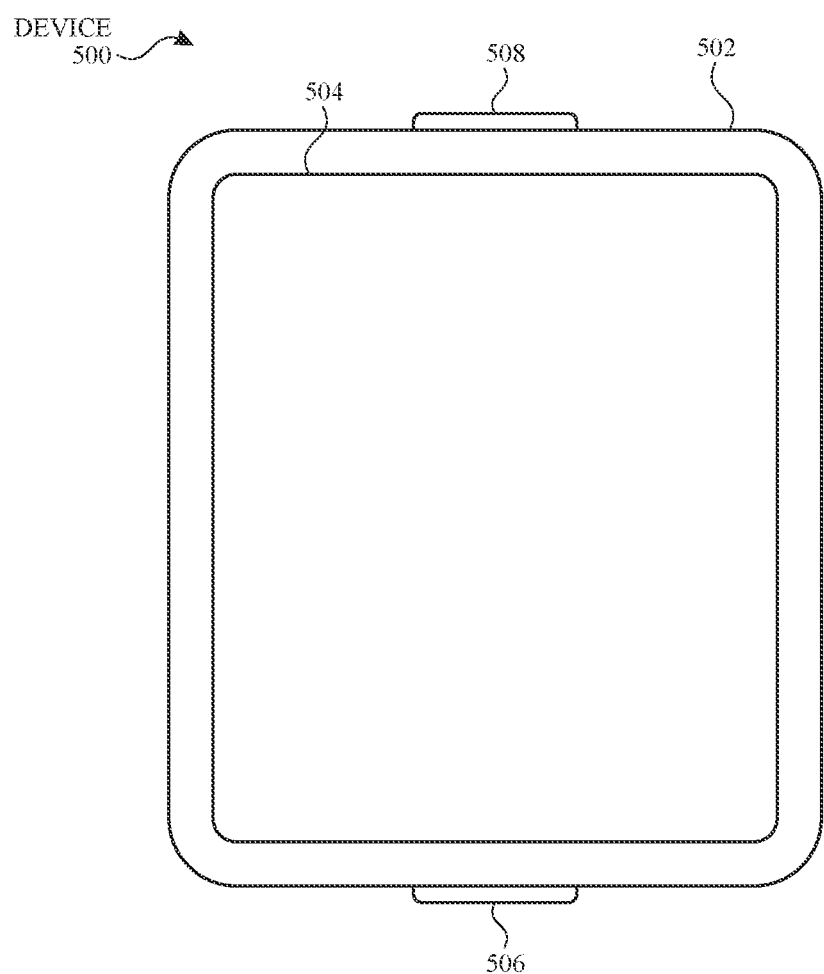
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
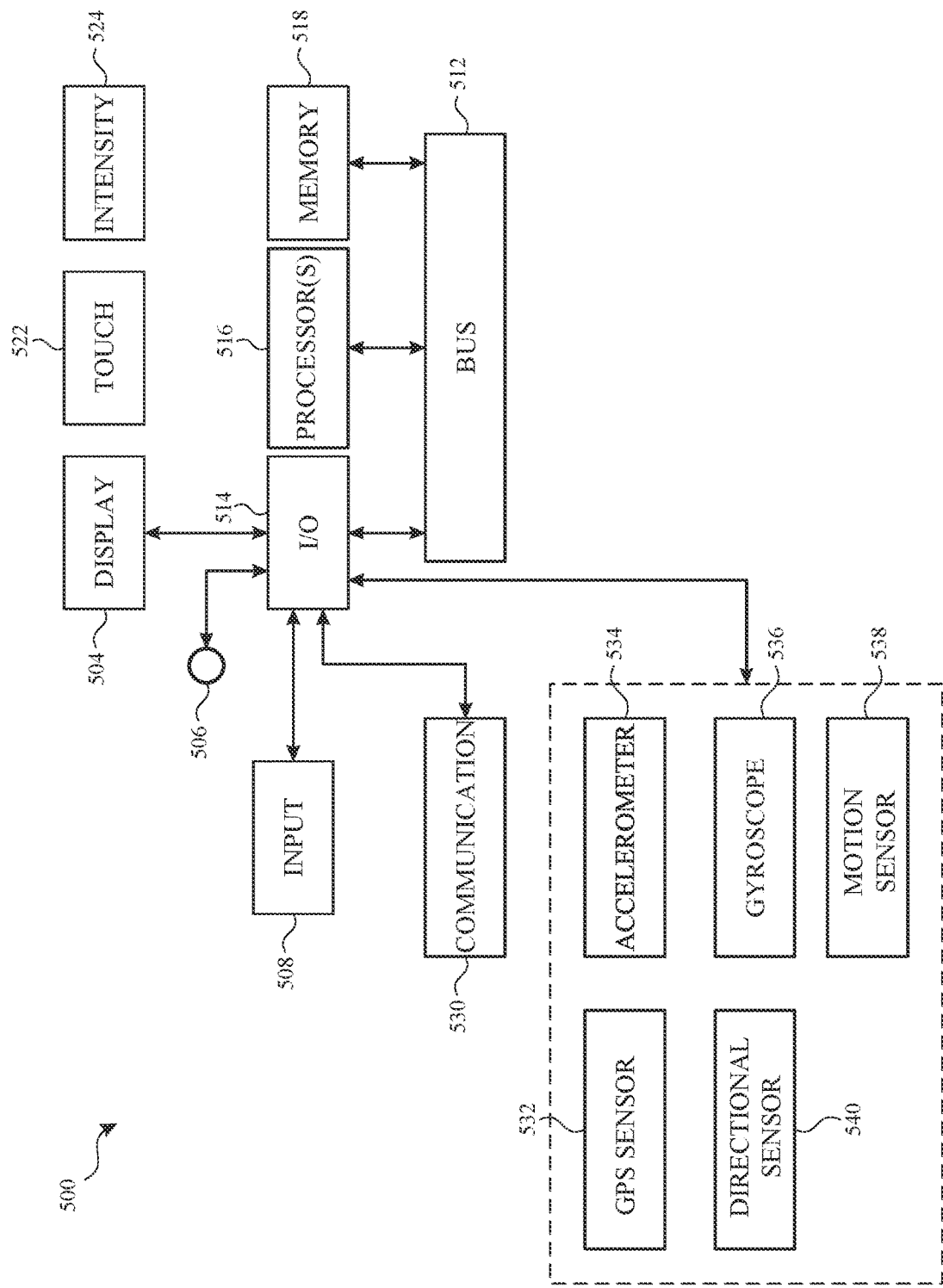
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
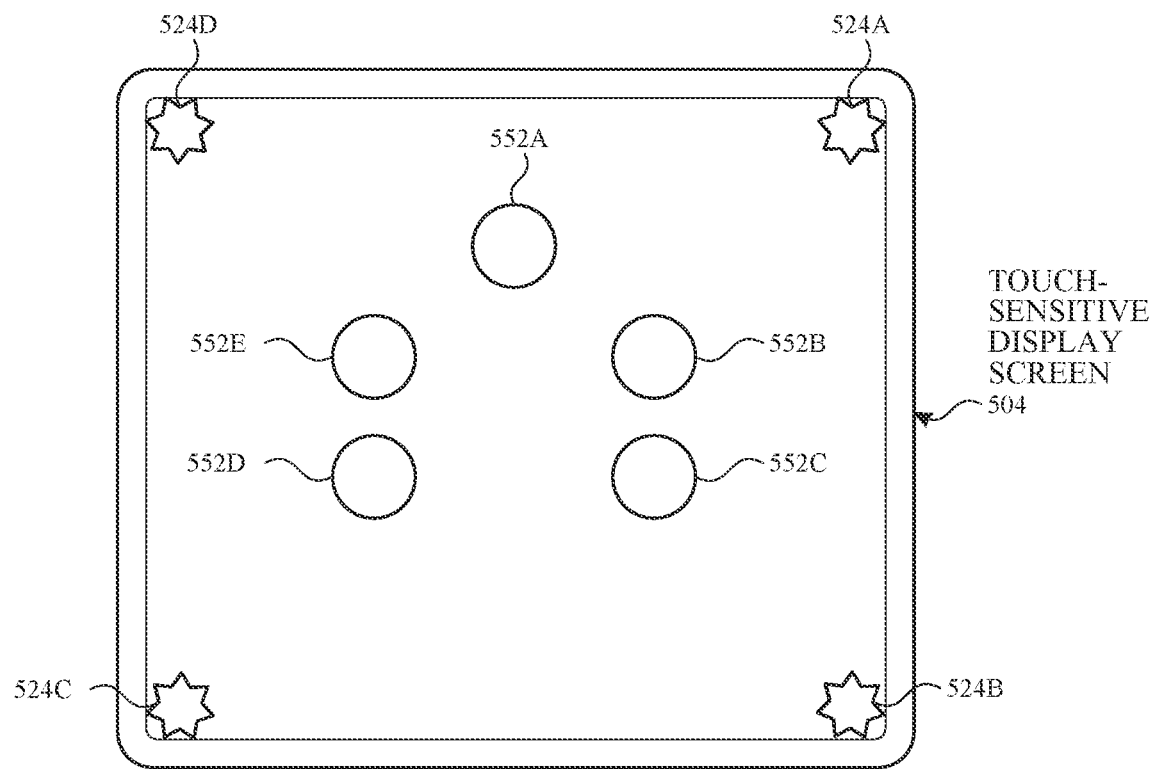
FIGS. 5C-5D illustrate exemplary components of a personal electronic device having a touch-sensitive display and intensity sensors in accordance with some embodiments.
Figure 5C:
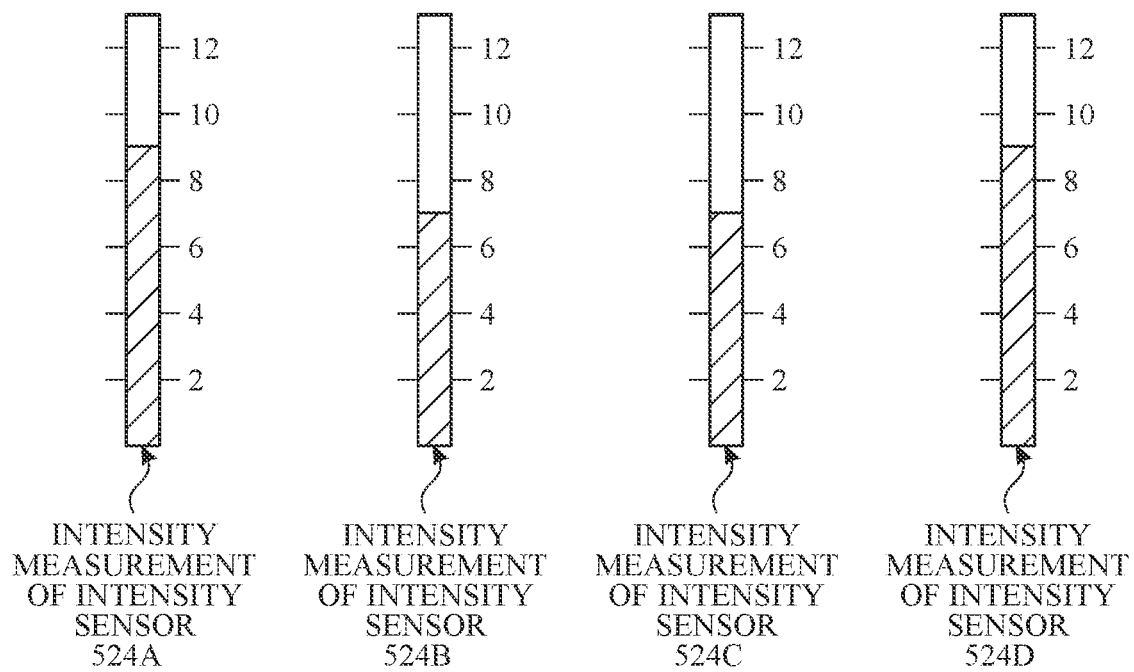
Figure 5D:
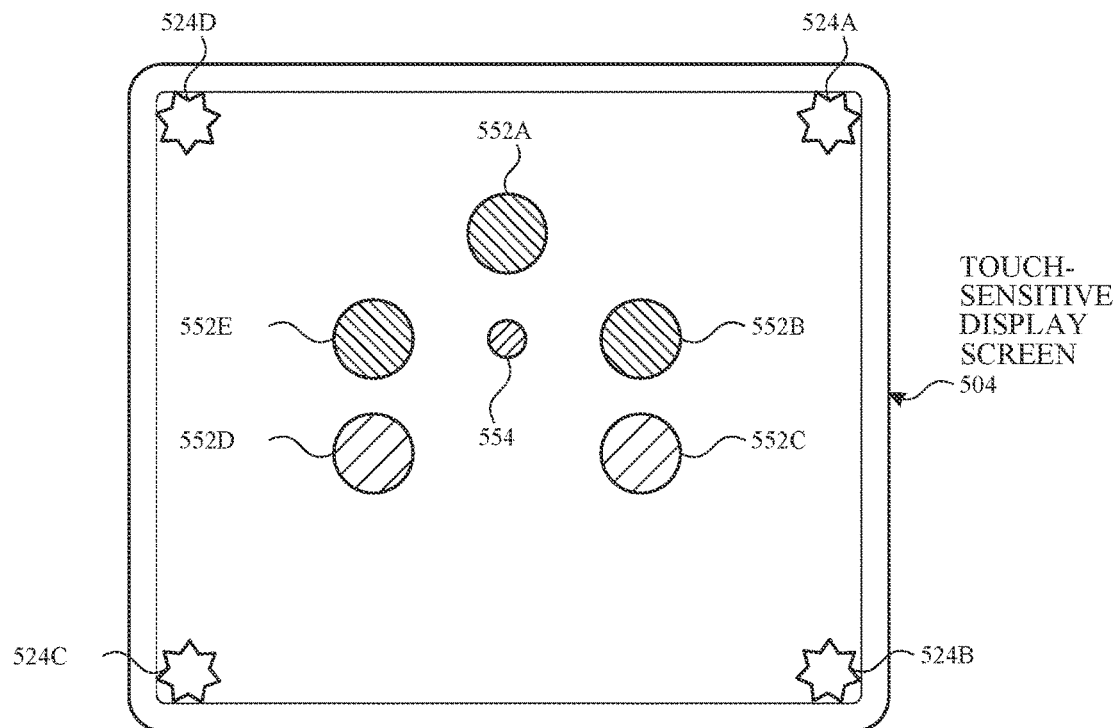
Figure 5D:
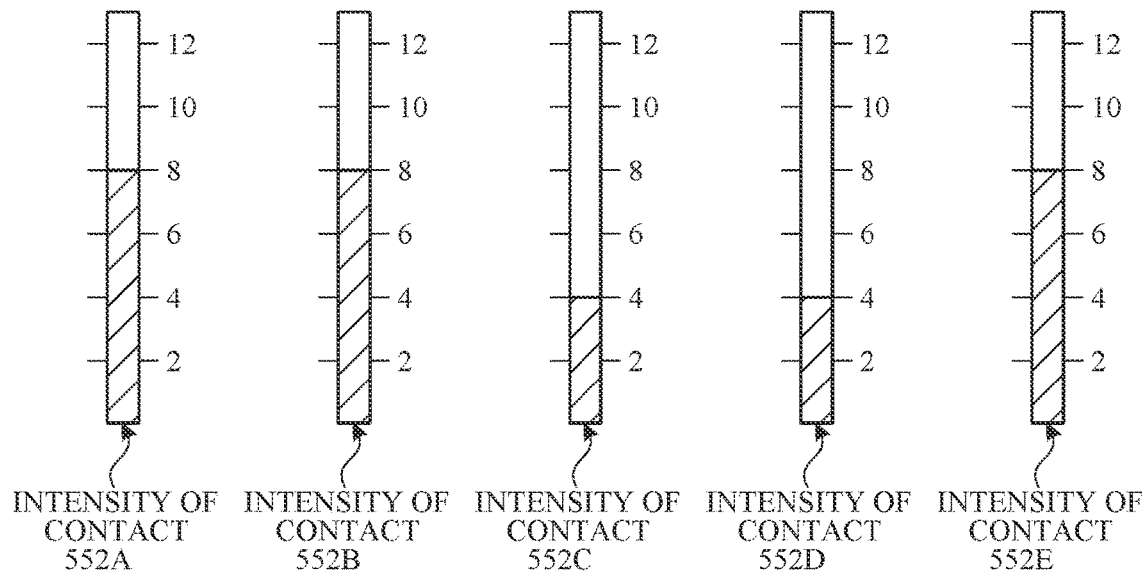

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
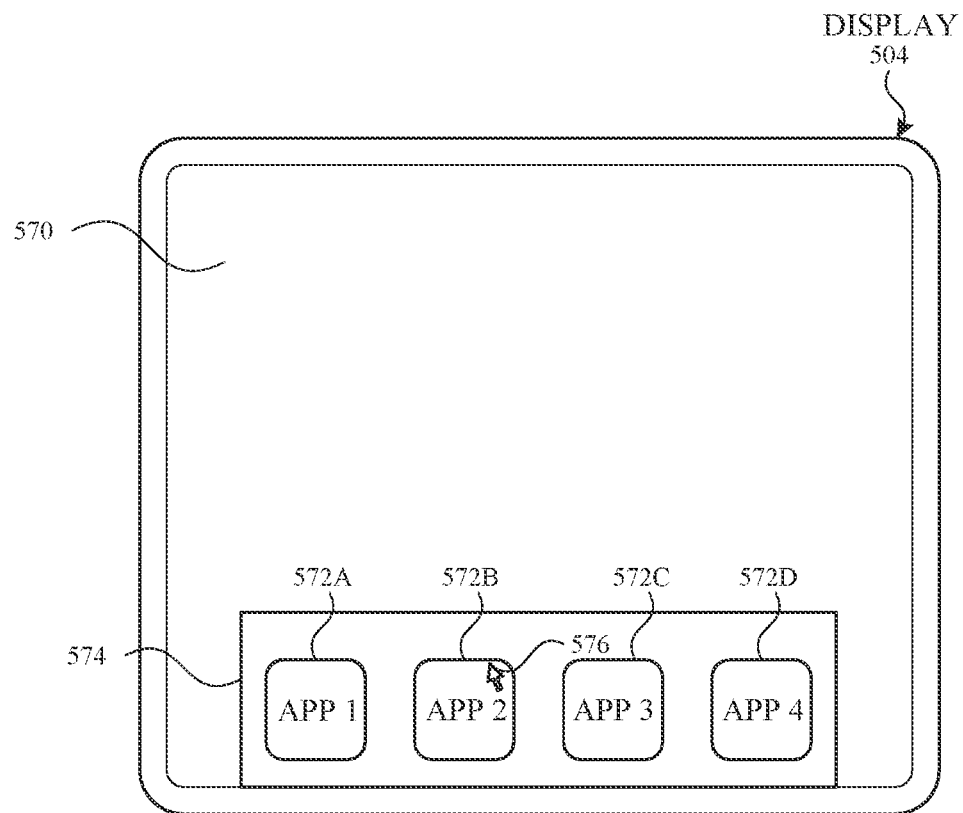
FIGS. 5E-5H illustrate exemplary components and user interfaces of a personal electronic device in accordance with some embodiments.
Figure 5E:
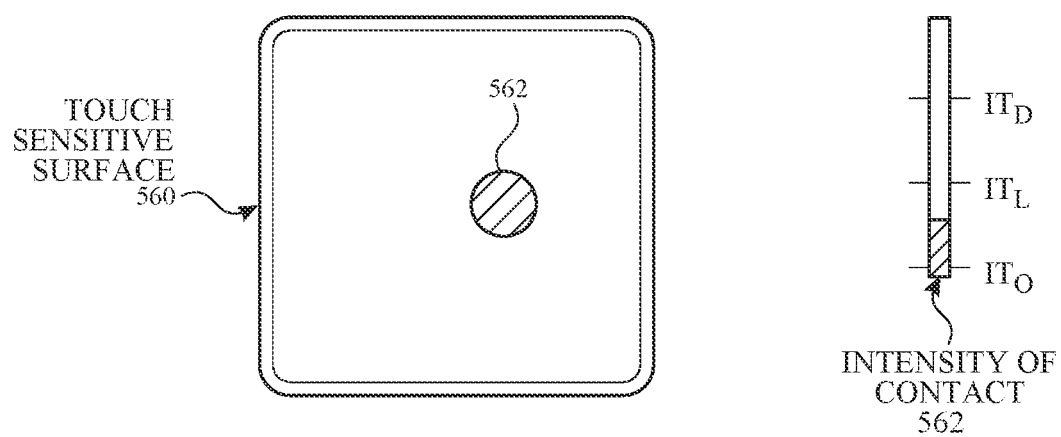
Figure 5F:
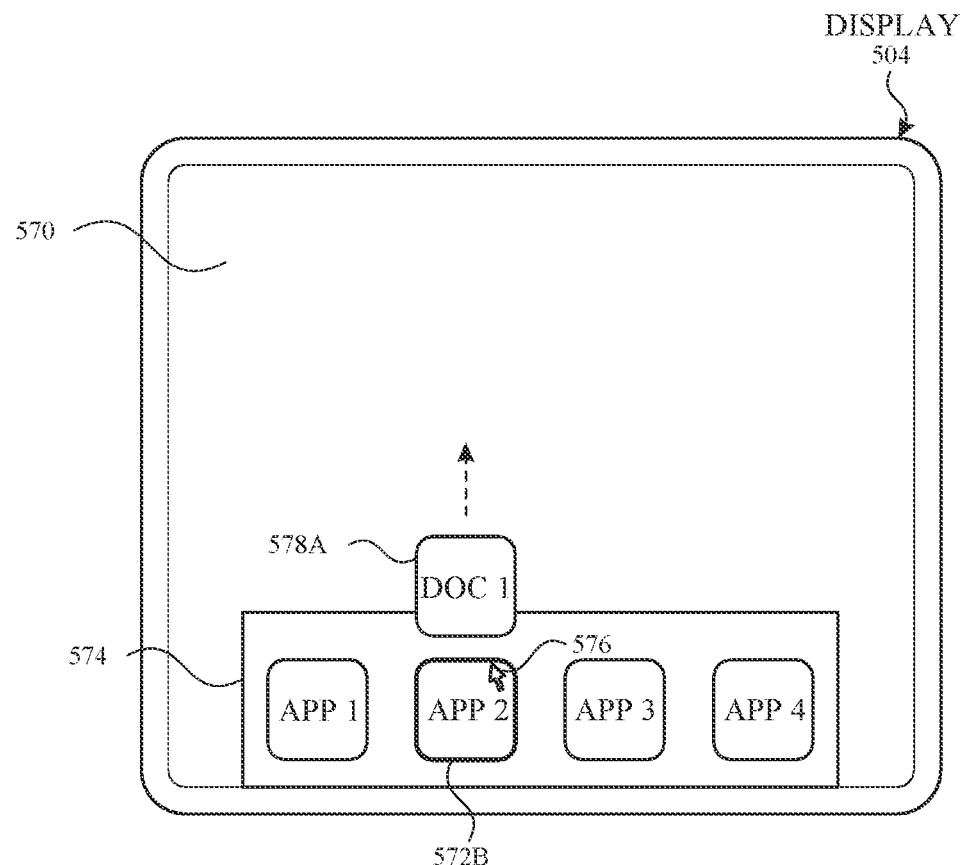
Figure 5F:
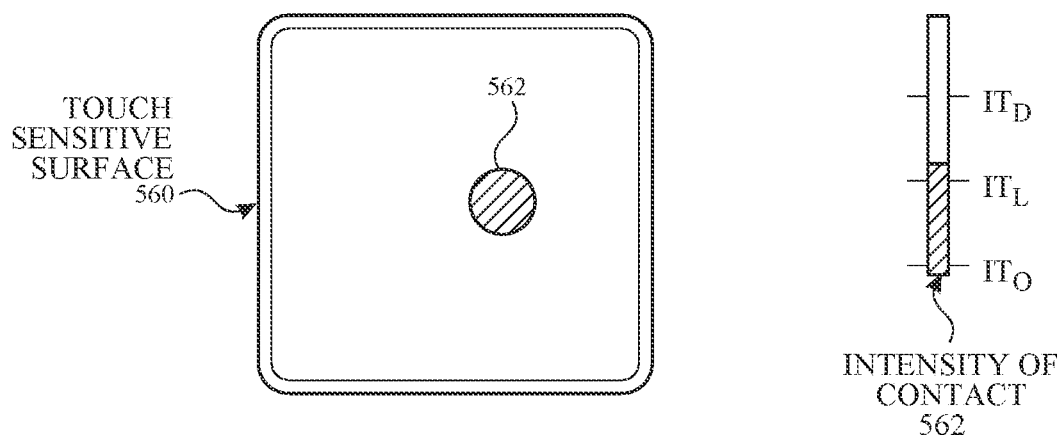
Figure 5G:
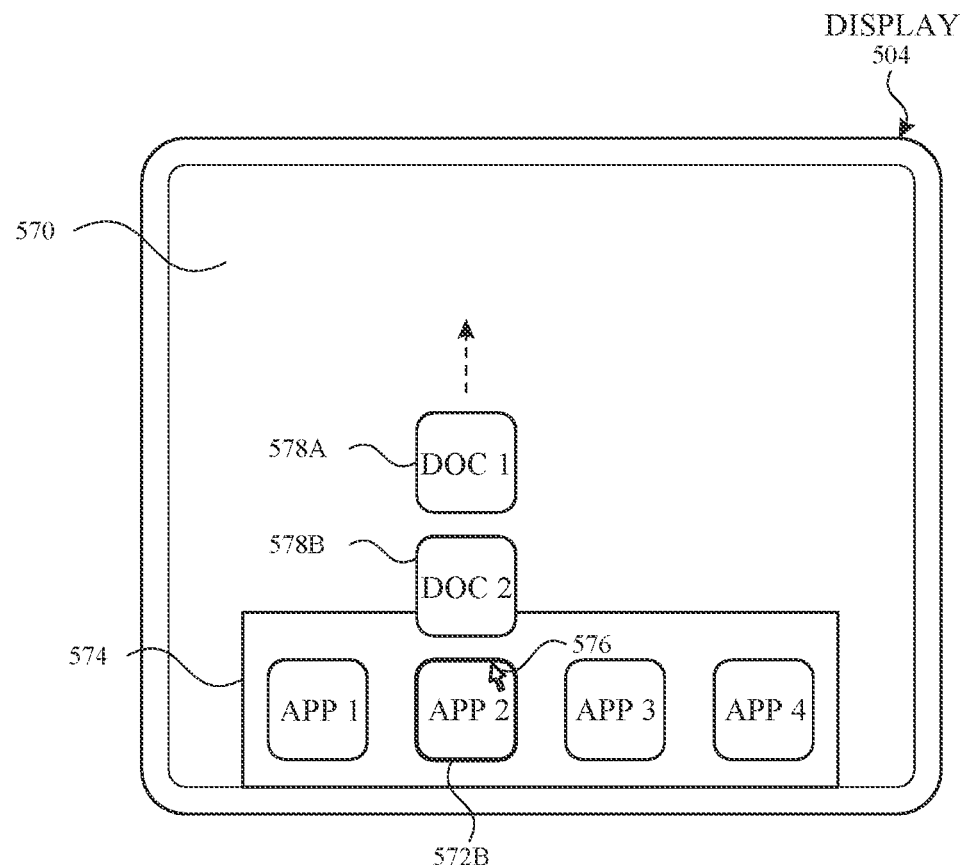
Figure 5G:
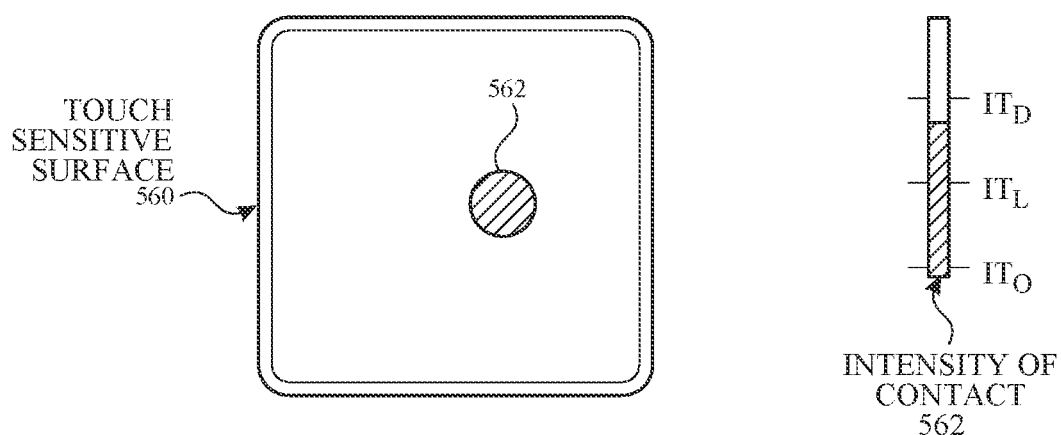
Figure 5H:
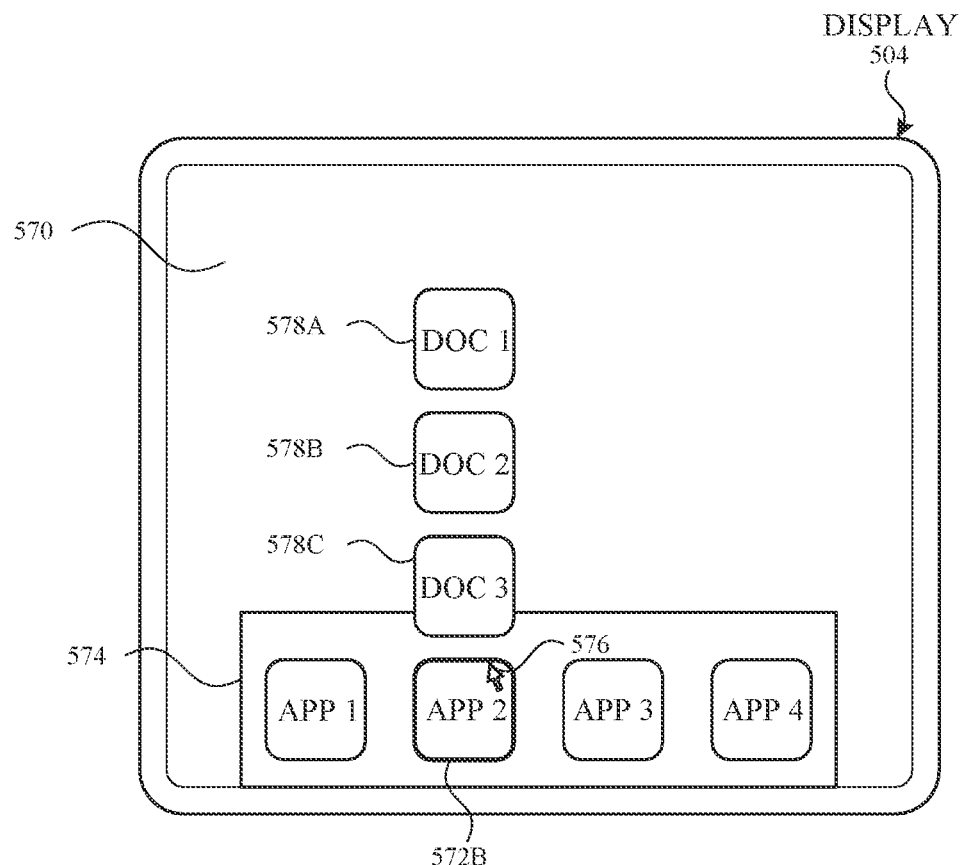
Figure 5H:
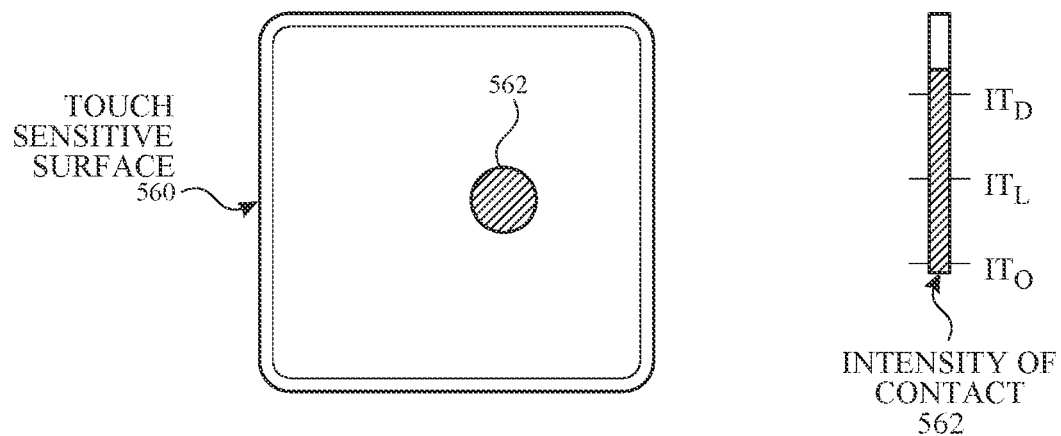

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6U illustrate exemplary user interfaces for displaying camera views, in accordance with some embodiments. The user interfaces in these figures are used to illustrate the processes described below, including the processes in FIG. 7.

At FIG. 6A, computer system 600 (e.g., device 100, 300, 500) is displaying video 604, such as a baseball game, on display 610 (e.g., a television) and is outputting audio for video 604 at a speaker of display 610. In some embodiments, display 610 is an integrated part of computer system 600. In some embodiments, computer system 600 is in communication (e.g., wireless, wired) with display 610. In some embodiments, video 604 is being played back from local media stored at computer system 600. In some embodiments, video 604 is being played via a video stream (e.g., a live video stream) received over a network.

FIG. 6A also illustrates remote control 602, which is configured to transmit data (e.g., via RF communication, via Bluetooth, via infrared) to computer system 600 based on user input that is detected at remote control 602. Remote control 602 includes a selection region 602a, which includes a touch-sensitive surface for detecting tap, press, and swipe gestures, a menu button 602b, a television button 602c, a microphone button 602d, a play/pause button, and volume control buttons.

At FIG. 6A, while video 604 continues playing, remote control 602 detects activation of television button 602c via long press 630a, and transmits an indication of the input to computer system 600. While video 604 continues playing, computer system 600 receives, from remote control 602, the indication corresponding to the long press of television button 602c and, in response, overlays control user interface 612 over video 604, as shown in FIG. 6B.

Figure 6B:
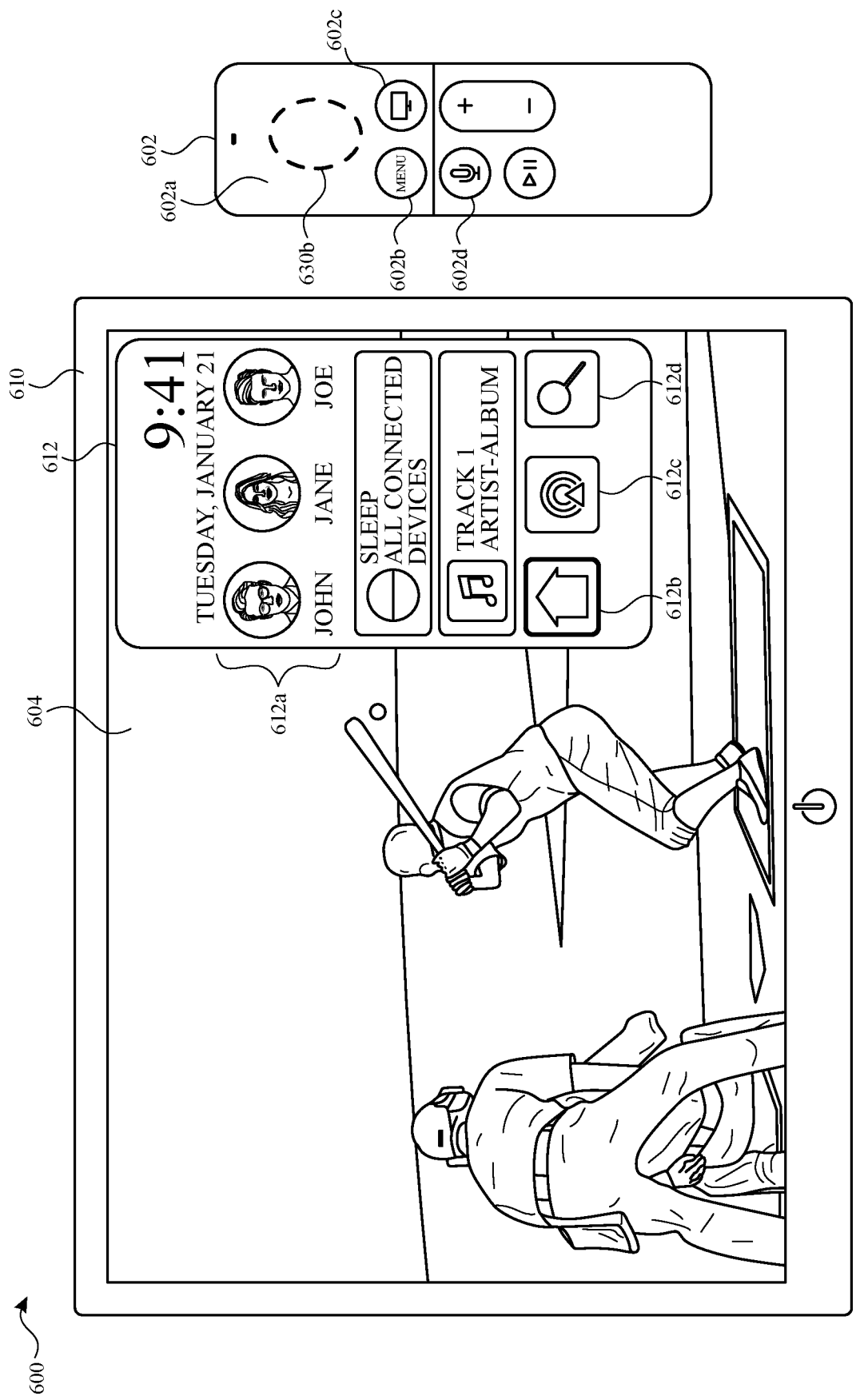

At FIG. 6B, video 604 continues playing while control user interface 612 is overlaid on video 604. Control user interface 612 overlays a first portion of video 604 (e.g., the portion previously including the pitcher) and does not overlay a second portion of video 604 (e.g., the portion including the batter).

Control user interface 612 includes indications 612a of users (John, Jane, Joe) of a home automation system, statuses for devices and audio that are controllable by the home automation system, and selectable UI objects 612b, 612c, and 612d. Selectable UI object 612c corresponds to a function for transmitting audio and/or video to a remote device. Selectable UI object 612d corresponds to a function for performing a search. Selectable UI object 612b corresponds to a function for accessing cameras (e.g., cameras, doorbell cameras) and other accessories of the home automation system. At FIG. 6B, computer system 600 has received input from remote control 602 corresponding to a navigation to place a focus on selectable UI object 612b and, as a result, selectable UI object 612b is visually emphasized to indicate the focus (as shown in FIG. 6B via the bold border of selectable UI object 612b).

At FIG. 6B, while video 604 continues playing and while the focus is on selectable UI object 612b, remote control 602 detects activation of selection region 602a via button press 630b, and transmits an indication of the input to computer system 600. While video 604 continues playing and while the focus is on selectable UI object 612b, computer system 600 receives, from remote control 602, the indication corresponding to button press 630b of selection region 602a and, in response, replaces display of control user interface 612 with user interface 614, as shown in FIG. 6C.

Figure 6C:
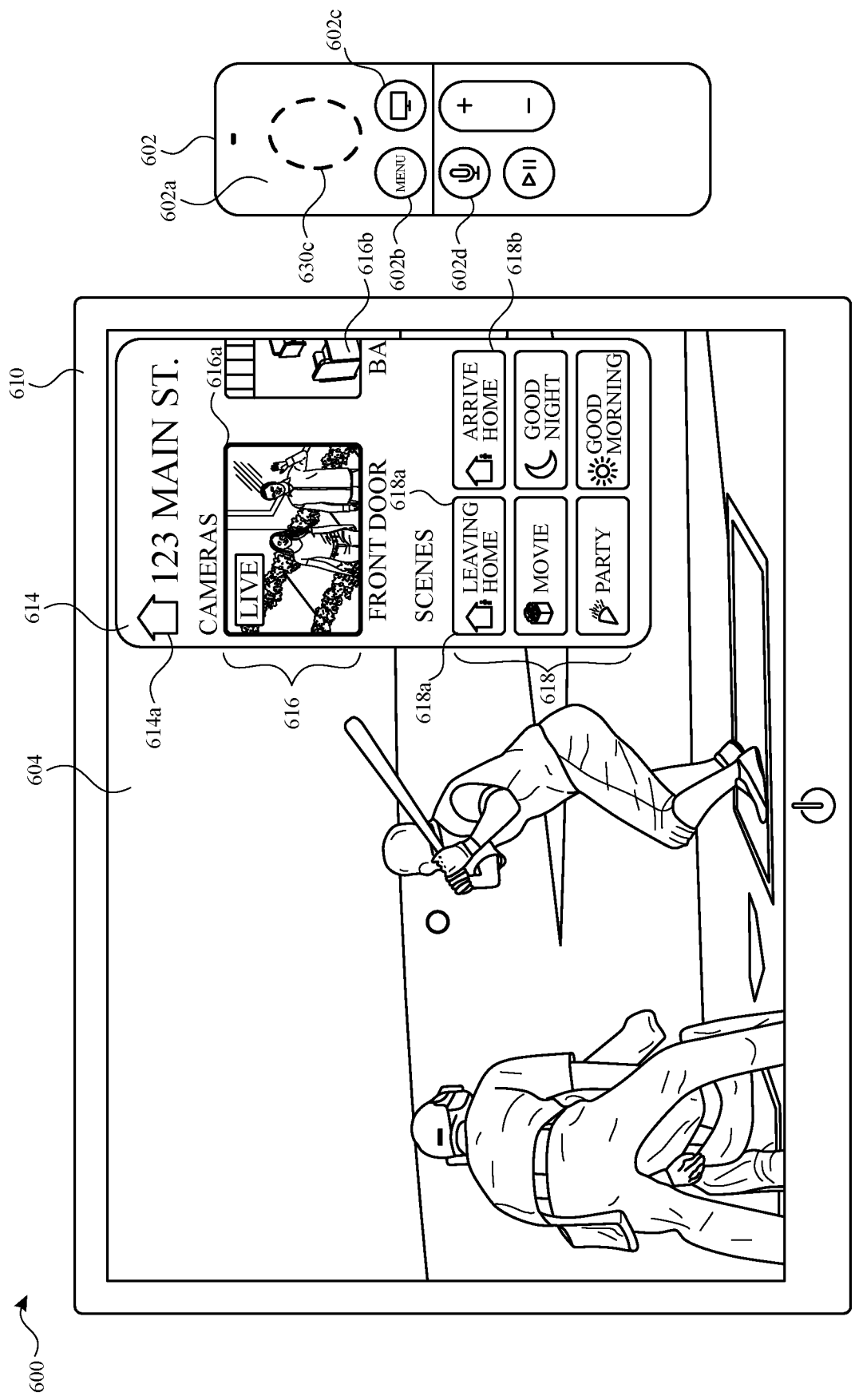

At FIG. 6C, video 604 continues playing and user interface 614 is overlaid on video 604. User interface 614 overlays the first portion of video 604 and does not overlay the second portion of video 604. User interface 614 includes indication 614a of the name of a home corresponding to the home automation system, cameras region 616, and scenes region 618.

At FIG. 6C, cameras region 616 includes camera preview 616a of a camera (e.g., a doorbell camera) located at the front door of the home and a portion of camera preview 616b of a camera (e.g., a camera without doorbell capabilities) located in the back yard of the home. Camera preview 616a is a live video stream of the field-of-view of the camera located at the front door of the home. The live video stream is indicated by the 'live' indication overlaid at the top left of camera preview 616a. An indication ('Front Door') of the name of the camera is displayed adjacent to (e.g., below) camera preview 616a.

At FIG. 6C, scenes region 618 includes several objects for activating scenes, including UI object 618a for activating a 'leaving home' scene and UI object 618b for activating an 'arrive home' scene. When a scene is activated, computer system 600 causes respective accessory devices corresponding to each scene to change modes to respective modes for the activated scene. For example, activation of UI object 618a causes music to stop playing on a smart speaker and the entryway light accessory to turn on (or stay on). Camera region 616 is horizontally scrollable (to reveal additional camera previews) and scenes region 618 is vertically scrollable (to reveal additional scene UI objects).

Figure 6D:
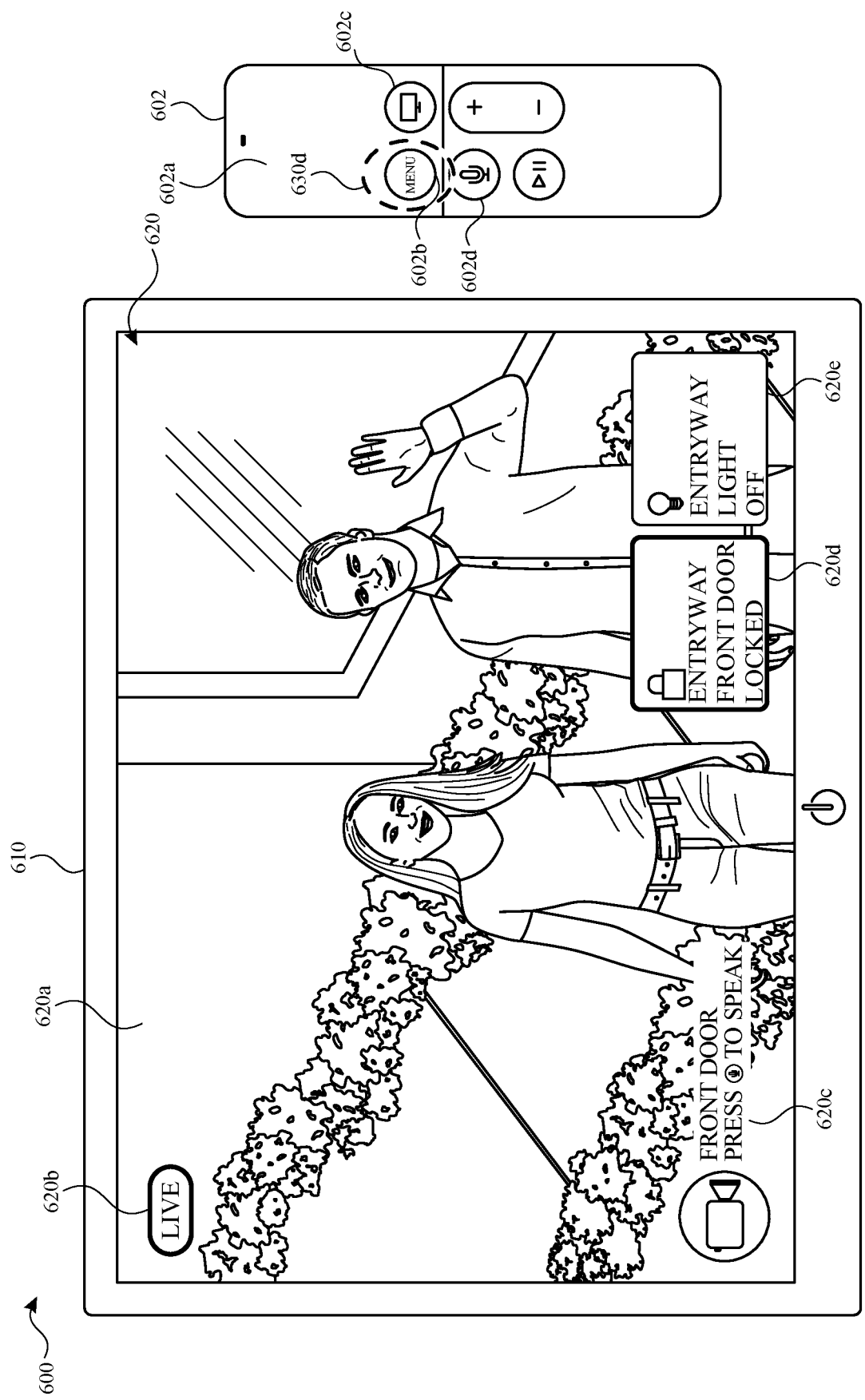
Figure 6E:
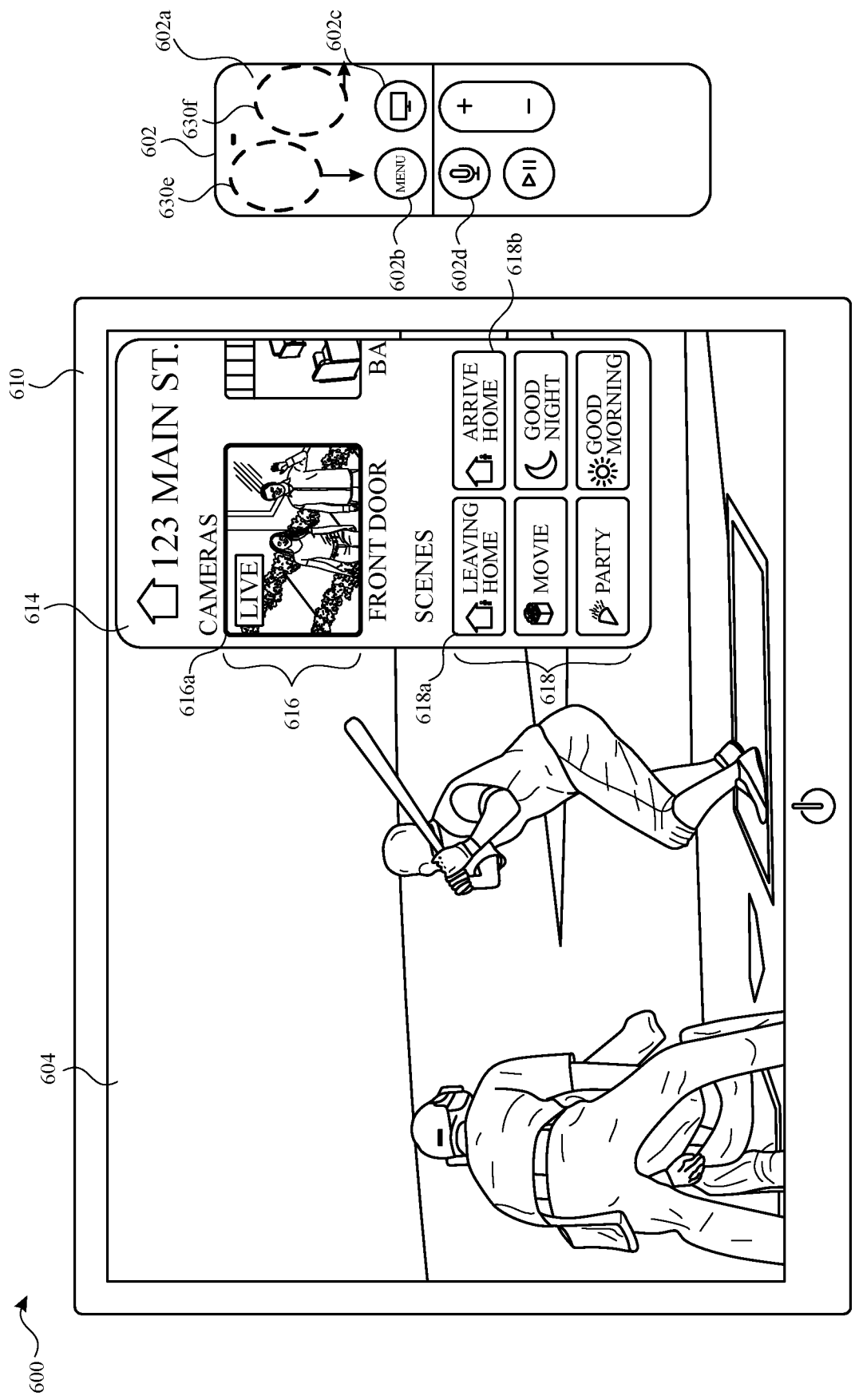
Figure 6F:
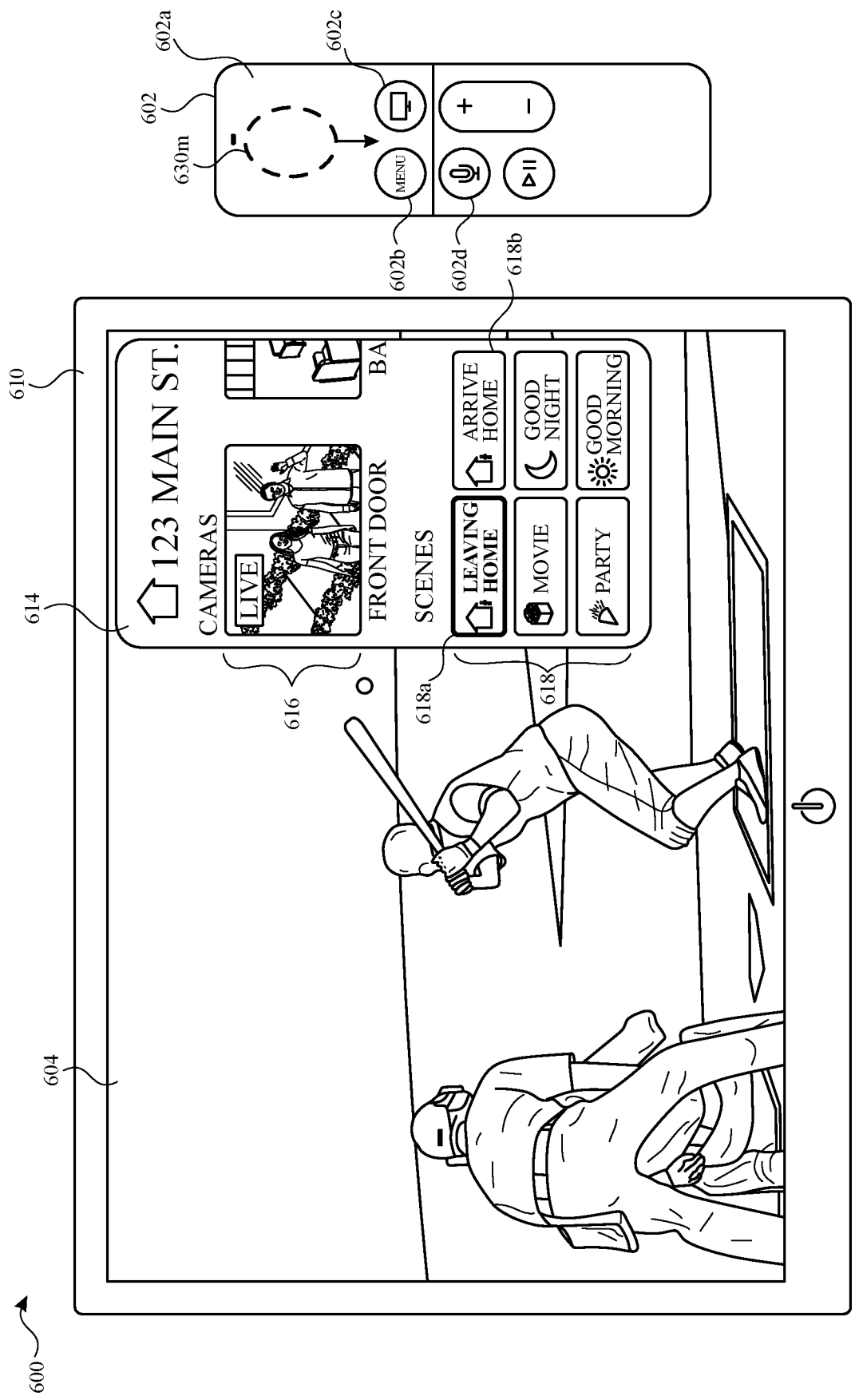
Figure 6G:
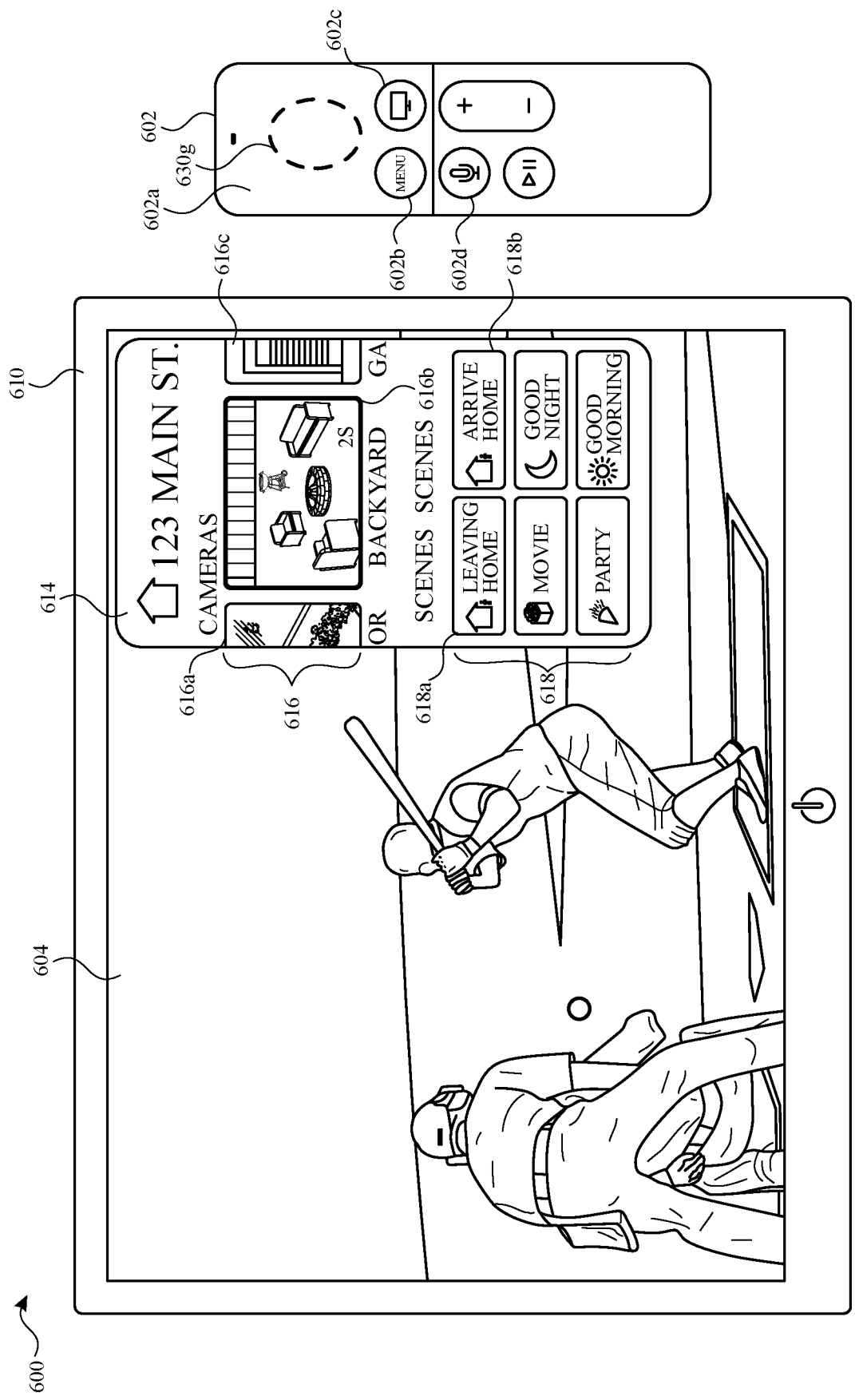
Figure 6H:
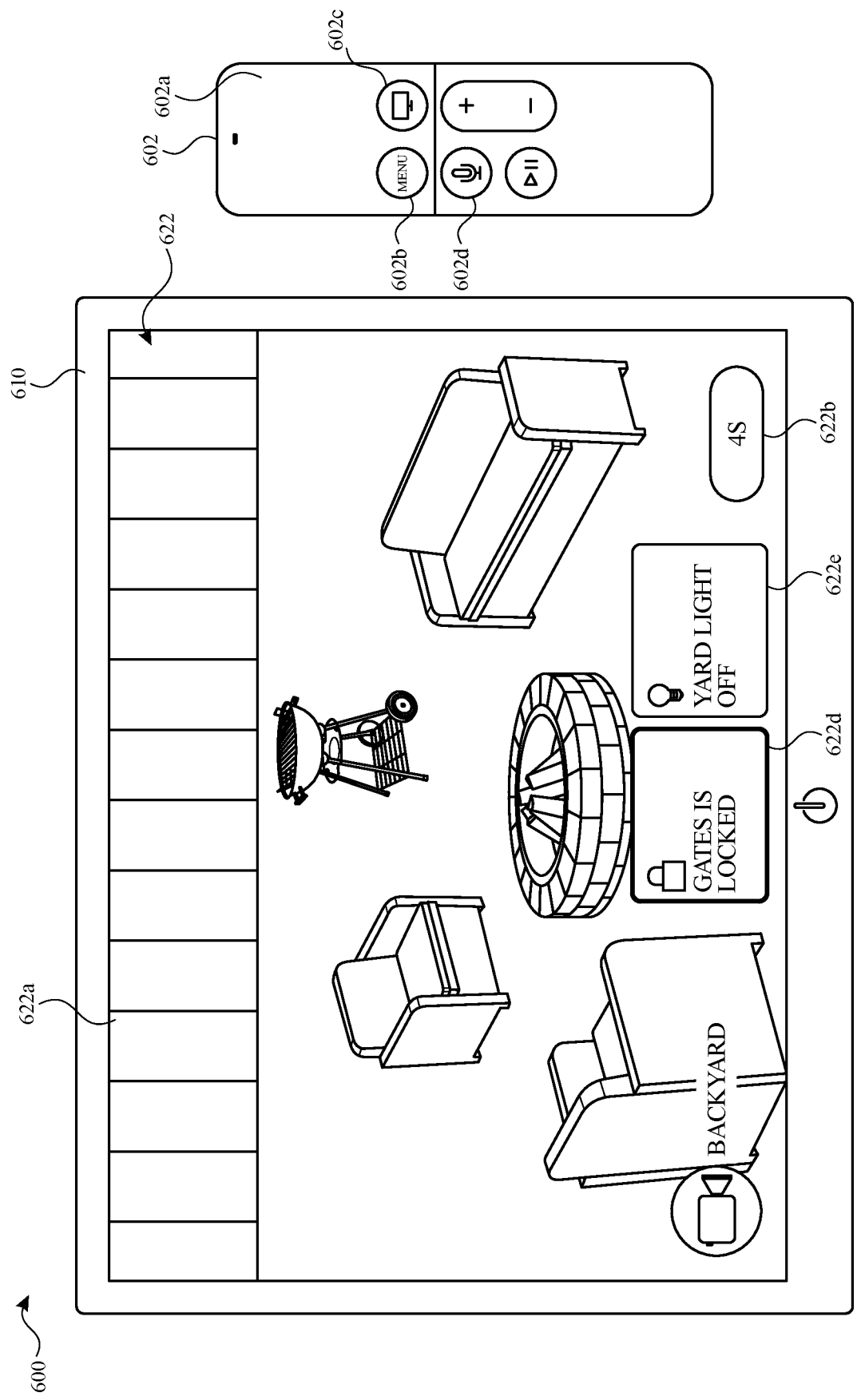
Figure 6I:
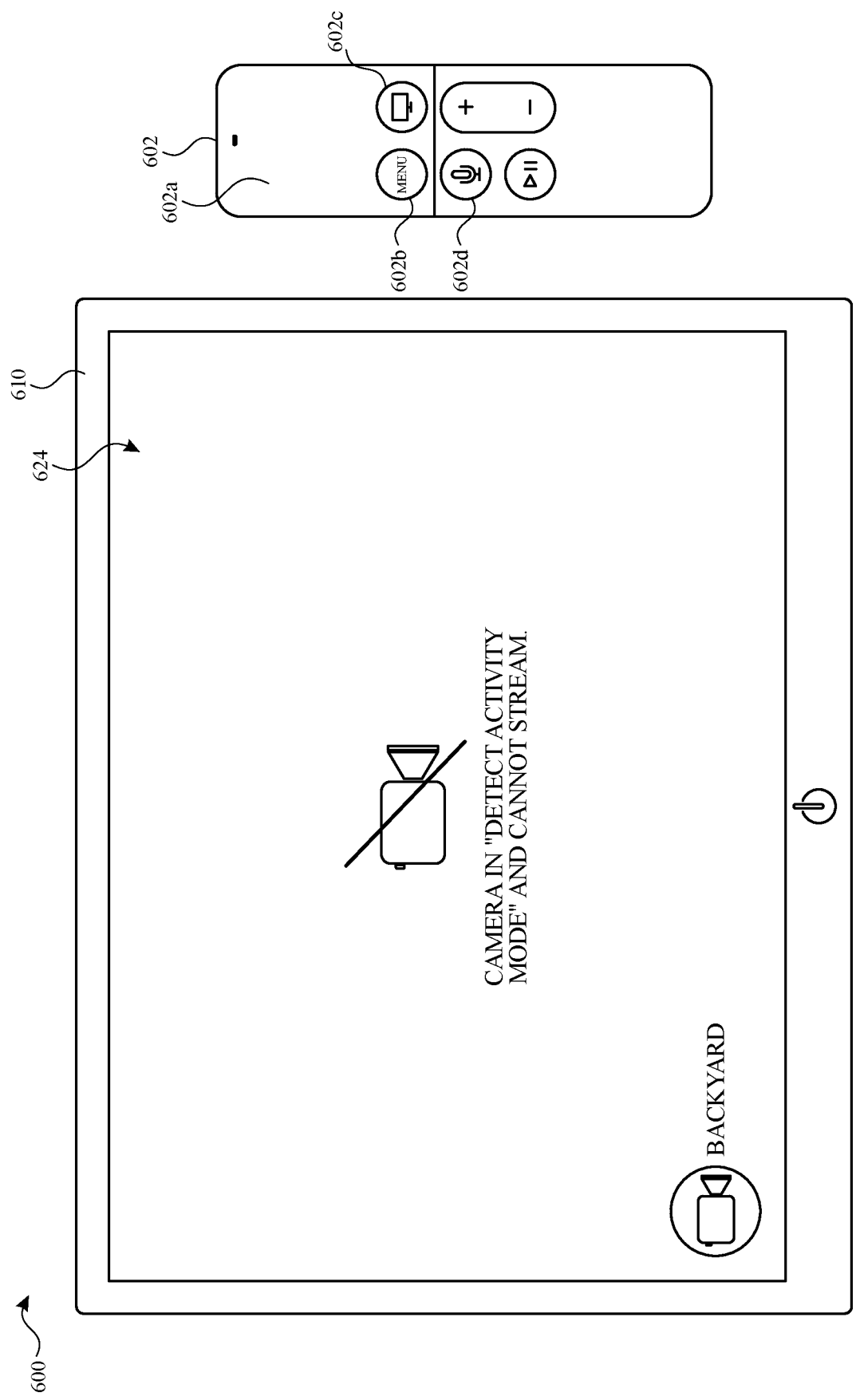
Figure 6J:
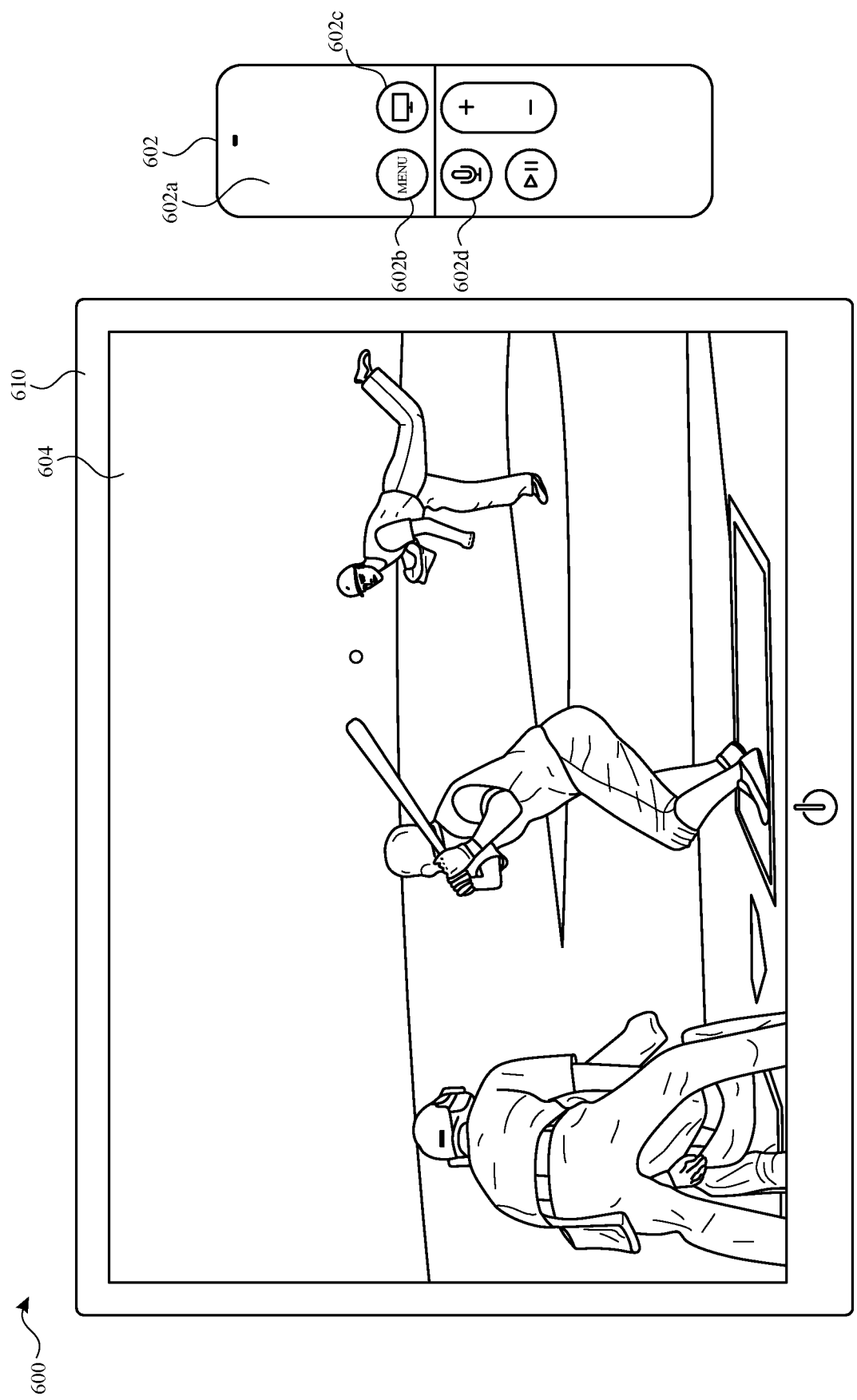
Figure 6K:
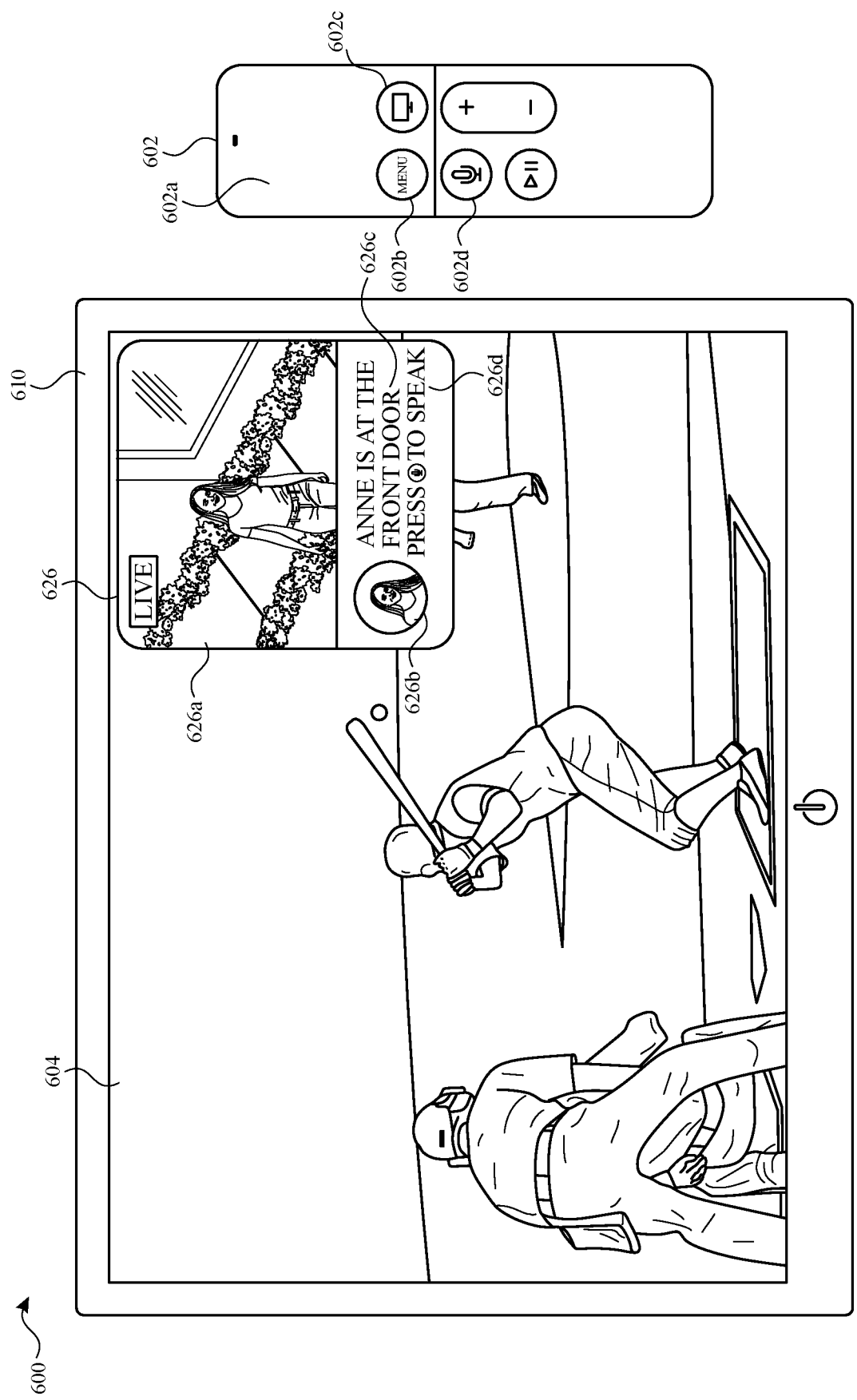
Figure 6M:
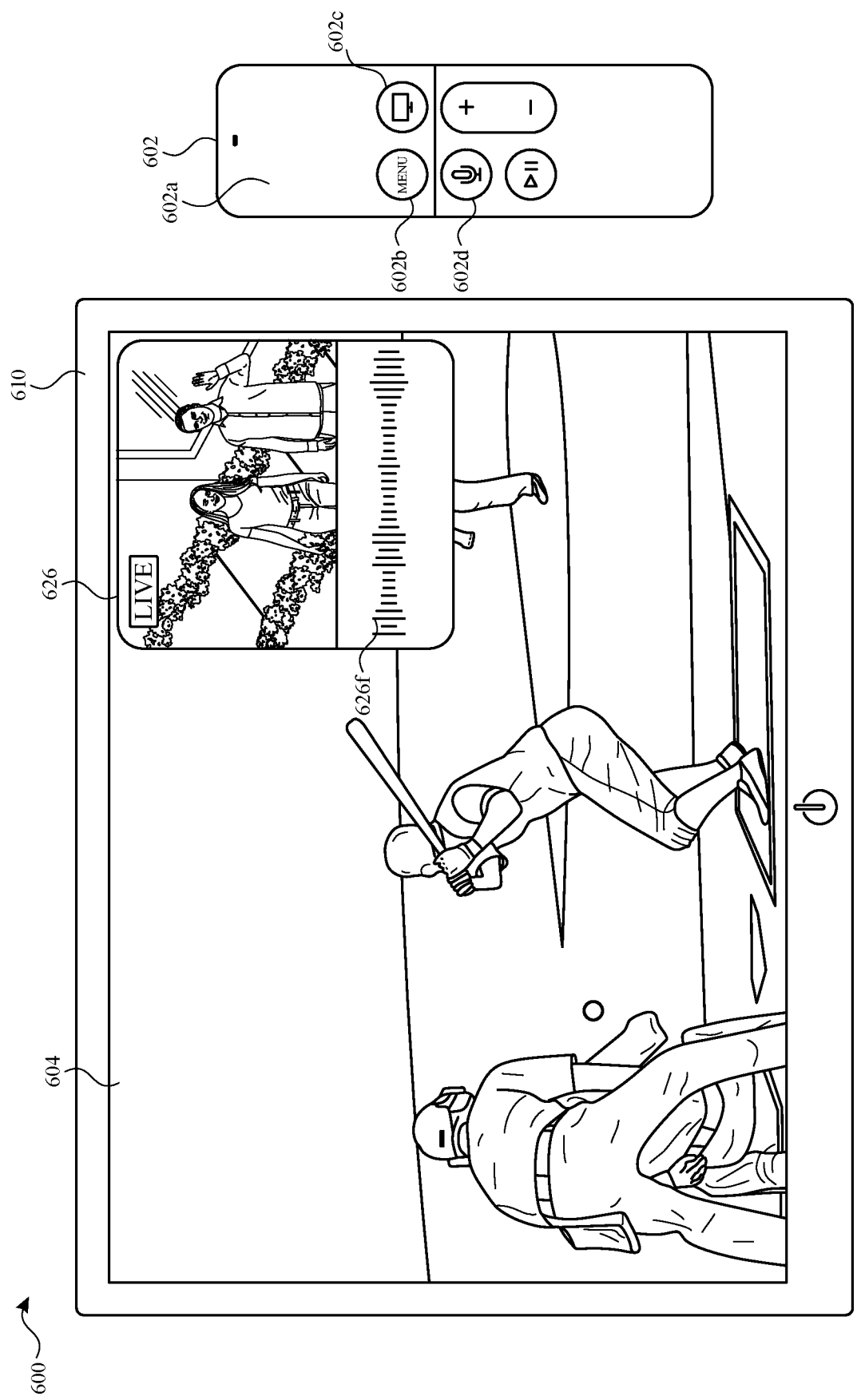
Figure 6N:
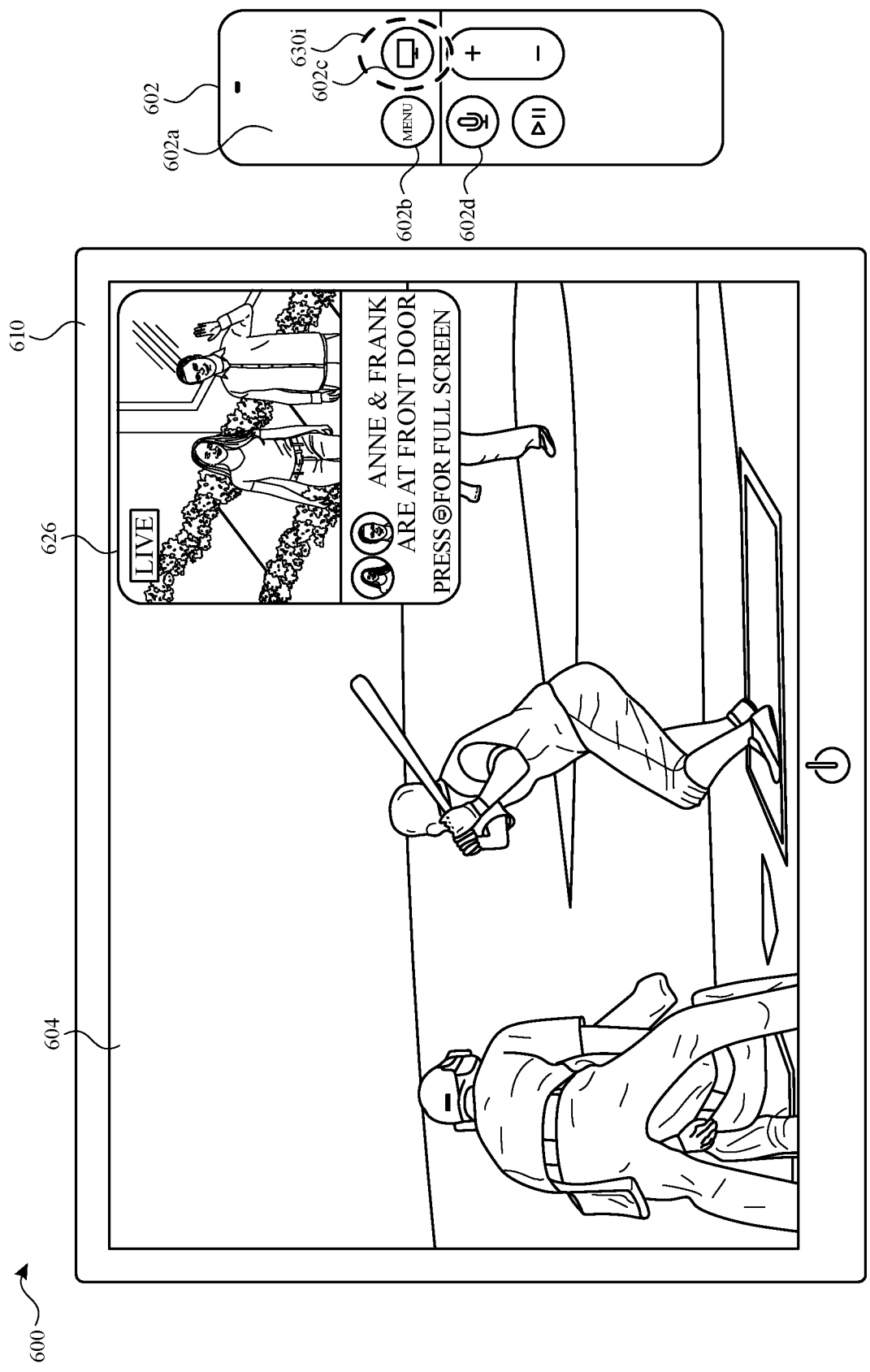
Figure 6O:
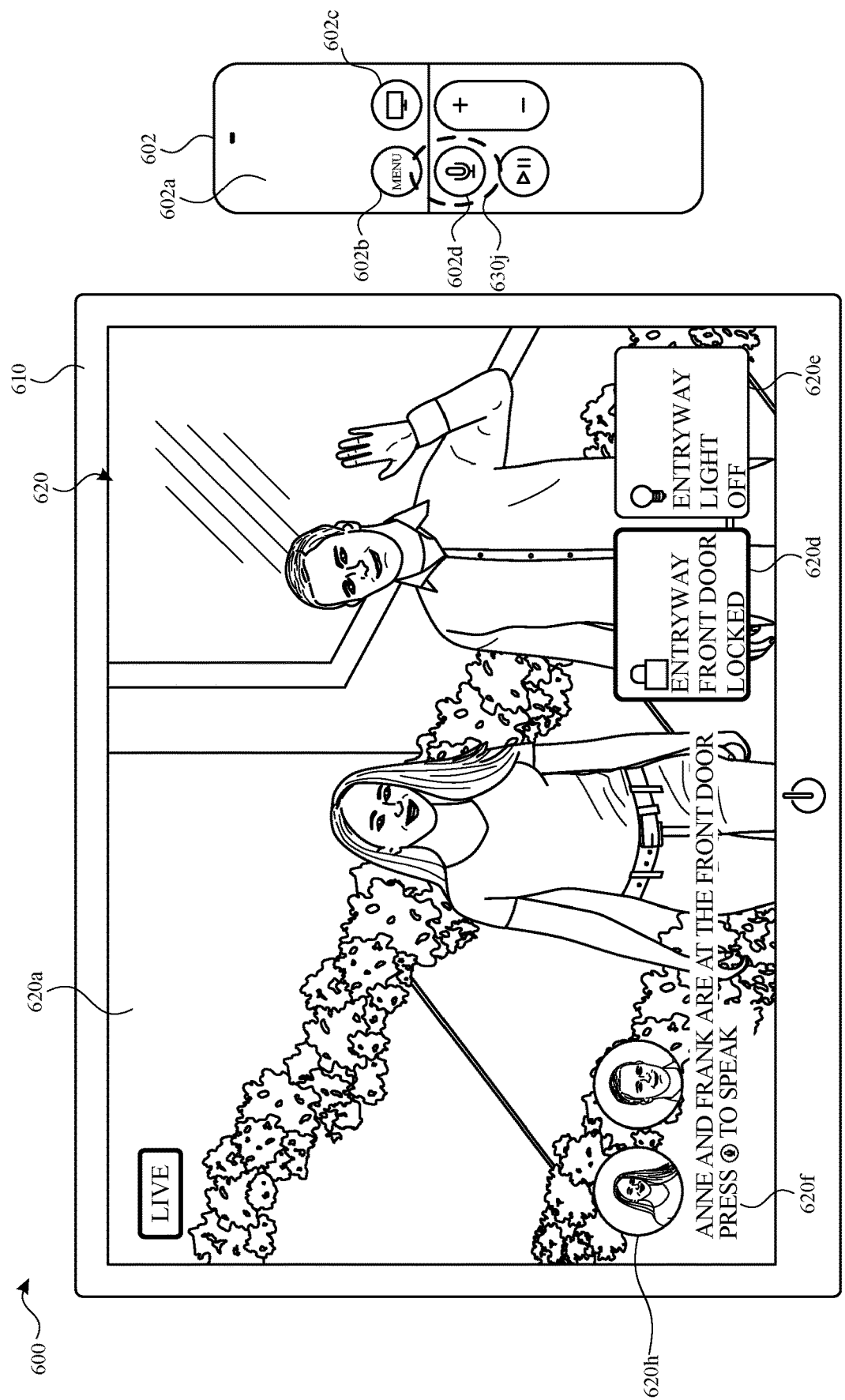
Figure 6P:
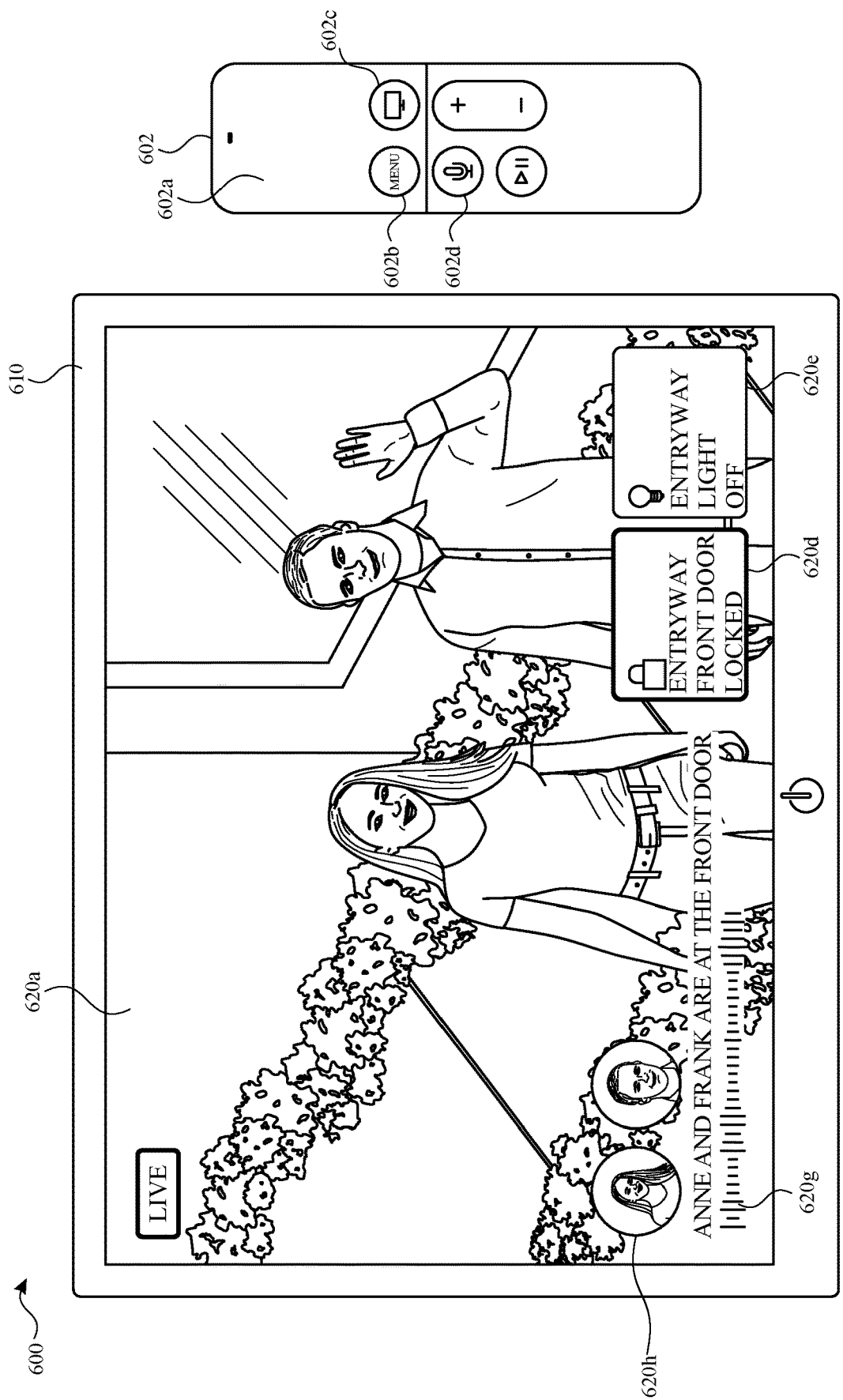

At FIG. 6C, while video 604 continues playing and while the focus is on camera preview 616a, remote control 602 detects activation of selection region 602a via button press 630c, and transmits an indication of the input to computer system 600. While video 604 continues playing and while the focus is on camera preview 616a, computer system 600 receives, from remote control 602, the indication corresponding to button press 630c of selection region 602a and, in response, replaces display of video 604 and user interface 614 with front door camera UI 620, as shown in FIG. 6D. Thus, computer system 600 ceases to display video 604 and user interface 614, and instead displays front door camera UI 620, as shown in FIG. 6D.

In some embodiments, at FIG. 6C, computer system 600 outputs audio of video 604 without outputting audio received from a microphone of the camera located at the front door of the home. In some embodiments, computer system 600 outputs audio received from a microphone of the camera located at the front door of the home without outputting audio of video 604. In some embodiments, computer system 600 concurrently outputs audio of video 604 and audio received from a microphone of the front door camera.

In some embodiments, computer system 600 pauses playback of video 604 when transitioning to the user interface of FIG. 6D. In some embodiments, computer system 600 does not pause playback of video 604 when transitioning to the user interface of FIG. 6D.

At FIG. 6D, front door camera UI 620 includes full-screen (e.g., reaching to each of four edges of display 610) camera view 620a of the field-of-view of the camera located at the front door of the home. Full-screen camera view 620a is larger than camera preview 616a, though both views correspond to the same camera. Front door camera UI 620 also includes live indication 620b, audio indication 620c, front door lock control user interface object 620d, and entryway light control user interface object 620e, each of which is overlaid on full-screen camera view 620a.

At FIG. 6D, full-screen camera view 620a is a live video stream of the field-of-view of the camera located at the front door of the home. The live video stream is indicated by the 'live' indication 620b overlaid at the top left of full-screen camera view 620a. Audio indication 620c provides instructions to the user on how to activate audio communication at the entryway where the camera is located, such as through a speaker and/or microphone located at the entryway. An indication ('Front Door') of the name of the camera is displayed adjacent (e.g., above) audio indication 620c. Front door lock control user interface object 620d is an accessory control user interface object corresponding to a lock of the front door. Activation of front door lock control user interface object 620d initiates a process to lock or unlock the front door lock. Entryway light control user interface object 620e is an accessory control user interface object corresponding to a light at the entryway. Activation of entryway light control user interface object 620e initiates a process to turn on or off the entryway light.

In some embodiments, computer system 600 also displays visual representations 620h, as part of front door camera UI 620, of known visitors (e.g., identified via facial recognition analysis), as illustrated and described with respect to FIGS. 6O-6S.

Figure 6Q:
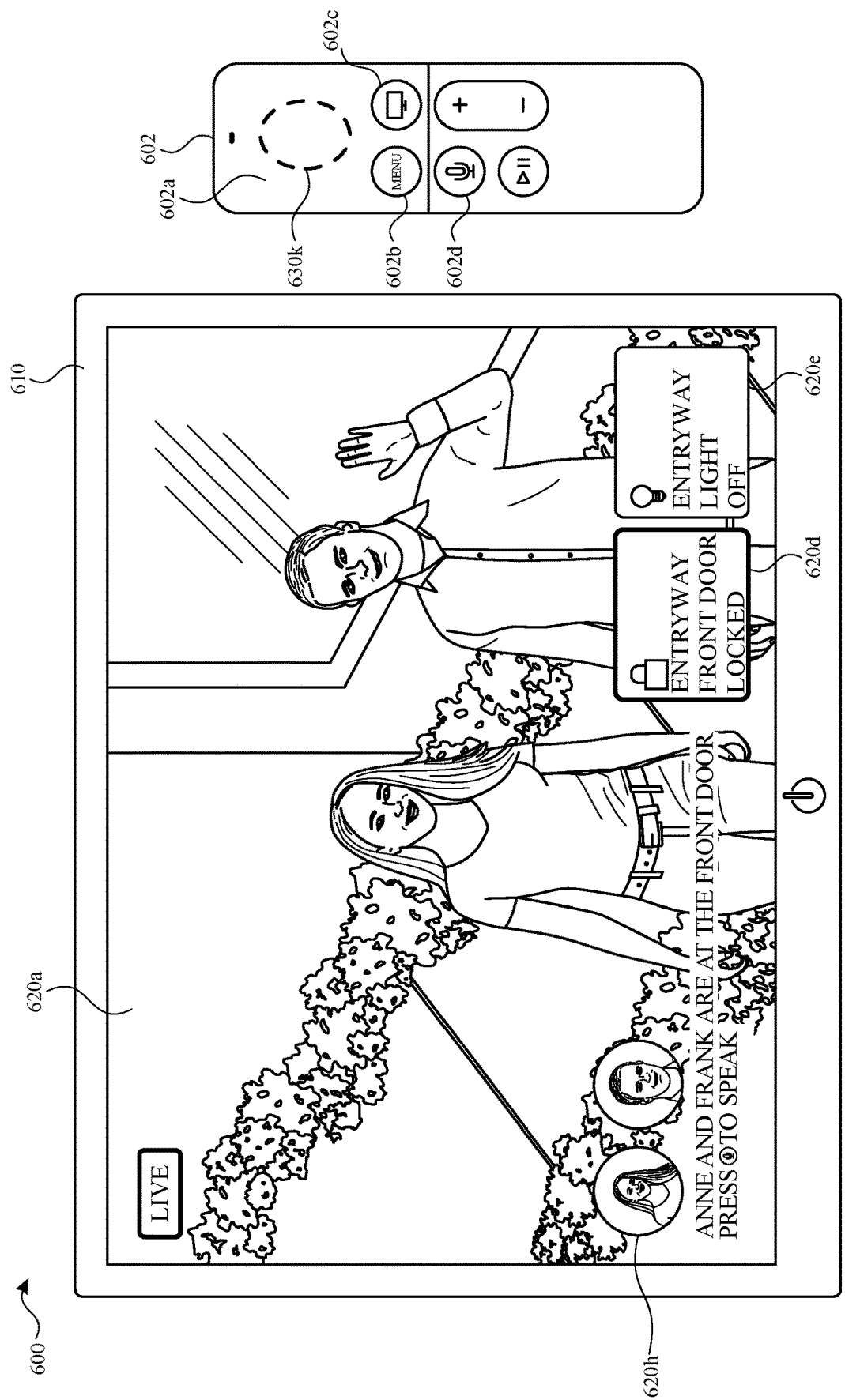
Figure 6R:
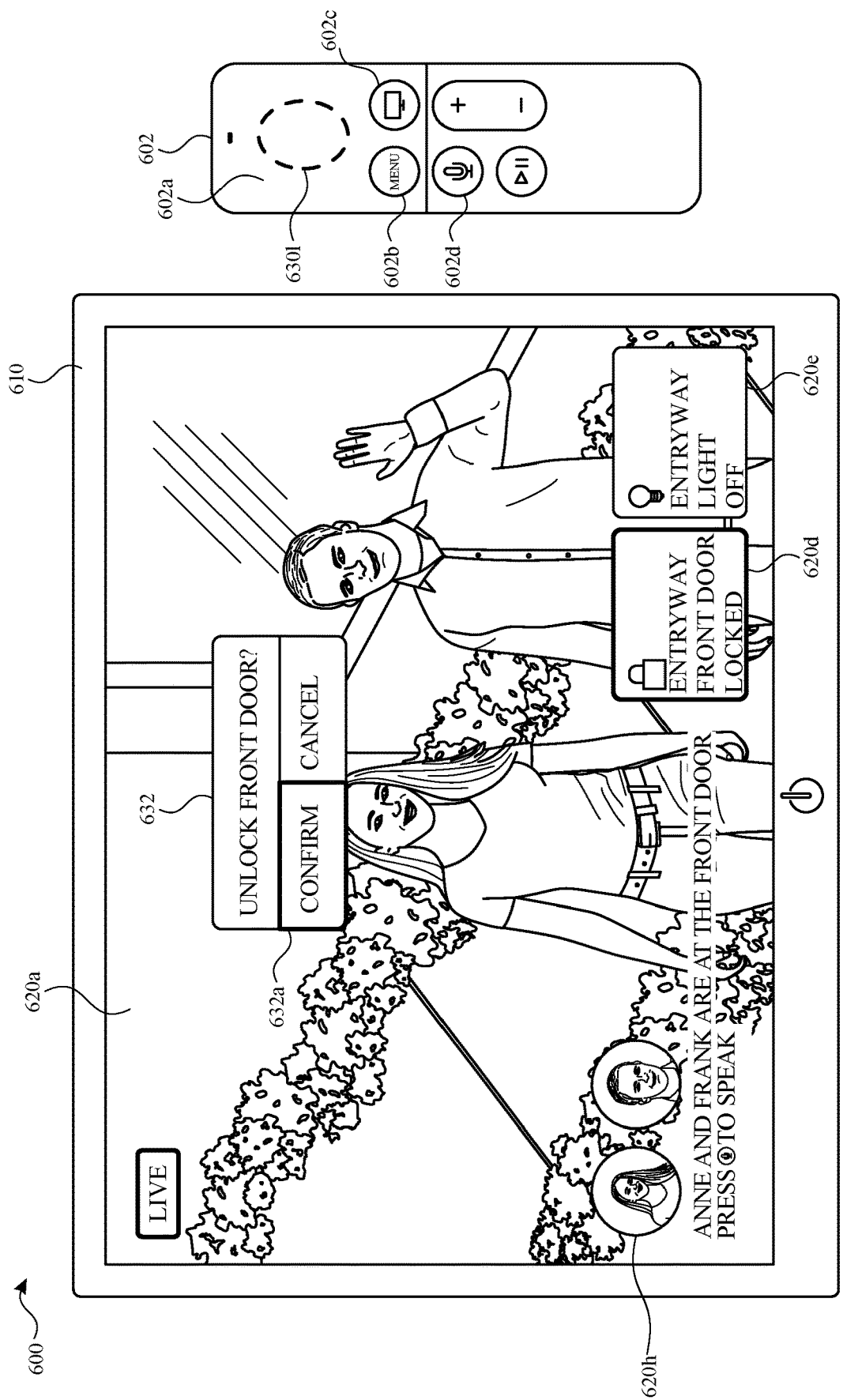
Figure 6S:
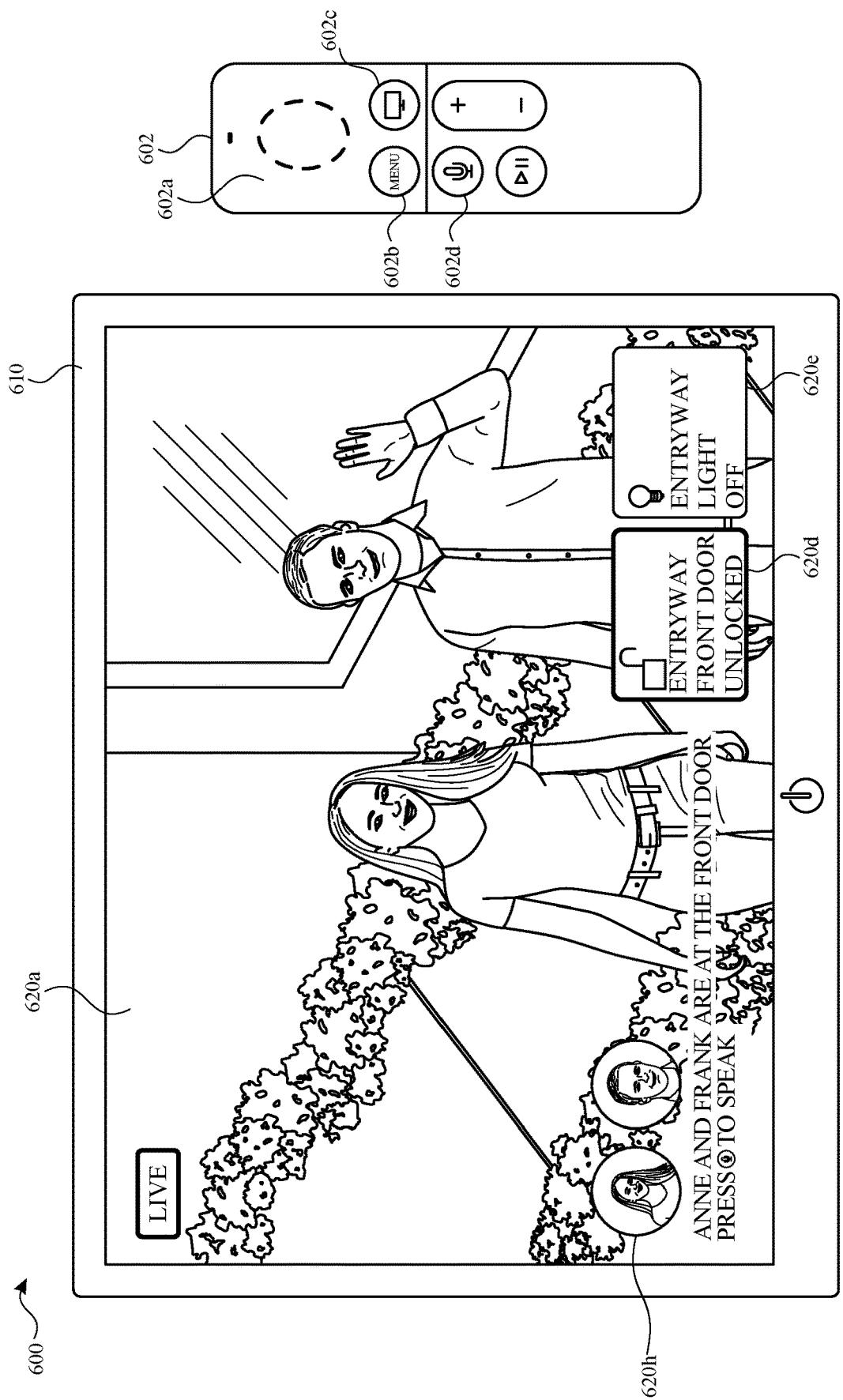

At FIG. 6D, if computer system 600 receives, from remote control 602, an indication corresponding to a button press of selection region 602a, computer system 600 would initiate the process to lock or unlock the front door lock, as described in additional detail with respect to FIGS. 6Q-6S, because the focus is on front door lock control user interface object 620d.

At FIG. 6D, while live video stream 620a of the field-of-view of the camera is playing, remote control 602 detects activation of menu button 602b via button press 630d and transmits an indication of the input to computer system 600. While live video stream 620a of the field-of-view of the camera is playing, computer system 600 receives, from remote control 602, the indication corresponding to button press 630d of menu button 602b and, in response (and independent of the focus), replaces display of front door camera UI 620 with video 604 (e.g., which starts playing) and user interface 614, as shown in FIG. 6E (and the same as shown in FIG. 6C). In some embodiments, while displaying the user interface of FIG. 6E, computer system 600 receives an indication corresponding to a button press of menu button 602b (independent of the focus) and, in response, displays the user interface of FIG. 6B. In some embodiments, while displaying the user interface of FIG. 6B, computer system 600 receives an indication corresponding to a button press of menu button 602b (independent of the focus) and, in response, displays the user interface of FIG. 6A.

At FIG. 6E, the display has transitioned from full-screen camera view 620a of FIG. 6D to the user interface as shown in FIG. 6E and playback of paused video 604 is optionally resumed. At FIG. 6E, remote control 602 alternatively detects downward swipe gesture 630e or rightward swipe gesture 630f on selection region 602a while video 604 and live camera preview 616a continue playing.

At FIG. 6E, while the focus is on camera preview 616a, when remote control 602 detects downward swipe gesture 630e on selection region 602a, remote control 602 transmits an indication of the input to computer system 600. While the focus is on camera preview 616a, computer system 600 receives, from remote control 602, the indication corresponding to downward swipe gesture 630e and, in response, changes the focus to UI object 618a for activating a 'leaving home' scene, as shown in FIG. 6F.

At FIG. 6F, while the focus is in scenes region 618, additional downward swipes (e.g., 630m) detected on selection region 602a of remote control 602 concurrently causes the focus to change among the objects in scenes region 618 and to vertically scroll the objects in scenes region 618. While the focus is in scenes region 618, leftward and rightward swipes cause the focus to move to the left and right, respectively, but does not cause the objects in scenes region 618 to scroll (horizontally or vertically). When a scene UI object is activated, computer system 600 causes respective accessory devices corresponding to the respective scene to change modes to respective modes for the activated scene.

Returning to FIG. 6E, while the focus is on camera preview 616a, when remote control 602 detects rightward swipe gesture 630f on selection region 602a, remote control 602 transmits an indication of the input to computer system 600. While the focus is on camera preview 616a, computer system 600 receives, from remote control 602, the indication corresponding to rightward swipe gesture 630f and, in response, as shown in FIG. 6G, concurrently horizontally scrolls the objects in cameras region 616 and changes the focus to camera preview 616b of the camera located in the back yard of the home.

At FIG. 6G, a portion of camera preview 616a (e.g., a live preview) is displayed (and a portion is not displayed), camera preview 616b is displayed, and a portion of camera preview 616c is displayed (and a portion is not displayed). Camera preview 616b is not a live video stream of the field-of-view of the corresponding camera. Instead, camera preview 616b shows a static image of a previously captured field-of-view of the camera located in the back yard of the home. The indication '2S' overlaid at the bottom right of camera preview 616b (and lack of the 'live' indication overlaid at the top left) indicates that camera preview 616b is not a live video stream. The '2S' also indicates that the image of camera preview 616b was captured two seconds earlier (and continues to increment as time passes). An indication ('Back Yard') of the name of the camera is displayed adjacent to (e.g., below) camera preview 616b.

At FIG. 6G, while video 604 continues playing and while the focus is on camera preview 616b, remote control 602 detects activation of selection region 602a via button press 630g and transmits an indication of the input to computer system 600. While video 604 continues playing and while the focus is on camera preview 616b, computer system 600 receives, from remote control 602, the indication corresponding to button press 630g of selection region 602a and, in response, replaces display of video 604 and control user interface 614 with backyard camera UI 622, as alternatively shown in FIGS. 6H-6I. Thus, computer system 600 ceases to display video 604 and control user interface 614, and instead displays backyard camera UI 622.

In some embodiments, when a live video stream of the field-of-view of the camera located at the back yard of the home is not available, computer system 600 displays a static image (e.g., static image camera view 622a) of a previously captured field-of-view of the camera located in the back yard of the home, as shown in FIG. 6H, as part of backyard camera UI 622. Indication 622B ('4S') overlaid on static image camera view 622a at the bottom right of backyard camera UI 622 (and lack of the 'live' indication overlaid at the top left) indicates that static image camera view 622a is not a live video stream. Indication 622B ('4S') also indicates that static image camera view 622a of backyard camera UI 622 was captured four seconds earlier (and continues to increment as time passes).

Static image camera view 622a is larger than camera preview 616b, though both views correspond to the same view from the same camera. Backyard camera UI 622 also includes gate lock control user interface object 622d and yard light control user interface object 622e, each of which is overlaid on static image camera view 622a.

When the backyard camera has a corresponding microphone and/or speaker (and independent of whether a live video stream is available), backyard camera UI 622 includes an indication (like 620c) that provides instructions to the viewer on how to activate audio communication with the back yard.

At FIG. 6H, an indication ('Back Yard') of the name of the camera is displayed. Gate lock control user interface object 622d is an accessory control user interface object corresponding to a lock of a gate of the back yard. Activation of gate lock control user interface object 622d initiates a process to lock or unlock the gate lock. Yard light control user interface object 622e is an accessory control user interface object corresponding to a light in the back yard. Activation of yard light control user interface object 622e initiates a process to turn the yard light on or off.

As shown in FIG. 6I, computer system 600 optionally shows an error UI 624, rather than backyard camera UI 622, when the live video stream is of the camera is not available (e.g., when the camera or the home automation system has been placed into a mode where motion, faces, and/or objects that appear in the field-of-view of the camera are processed to be recognized, such as through facial recognition analysis or object recognition analysis).

Both at FIGS. 6H and 6I, regardless of the focus, when remote control 602 detects activation of menu button 602b, the remote transmits an indication of the input to computer system 600. Computer system 600 receives, from remote control 602, the indication corresponding to the button press of menu button 602b and, in response (and independent of the focus), replaces display of the user interface with video 604 and user interface 614, as shown in FIG. 6G.

At FIG. 6J, computer system 600 has received indications of inputs (e.g., multiple activations of menu button 602b) to return to displaying video 604, such as the continuation of the baseball game, on display 610 and outputting audio for video 604 at the speaker of display 610 (same as in FIG. 6A). While displaying video 604, computer system 600 receives an indication of doorbell activity at the front door of the home. In some embodiments, the doorbell activity is activation of a doorbell corresponding to (e.g., connected to, in communication with) the camera located at the front door of the home. In some embodiments, the doorbell activity is detection an individual in the field-of-view of the camera located at the front door of the home.

At FIG. 6K, in response to receiving the indication of doorbell activity at the front door of the home (e.g., without receiving any additional user input, without receiving input at remote control 602), computer system 600 displays user interface 626 overlaid on video 604 (while video 604 continues to play). User interface 626 includes camera preview 626a of the camera located at the front door of the home, graphical image 626b corresponding to the known visitor Anne, textual description 626c of the visitor, and instructions 626d.

Camera preview 626a includes a live video stream of the field-of-view of the camera located at the front door of the home. The live video stream is indicated by the 'live' indication overlaid at the top left of camera preview 626a. Graphical image 626b is, for example, a picture or an avatar retrieved from a repository of the home automation system, such as described with respect to FIGS. 8A-8W. The picture of avatar corresponds to the visitor in the field-of-view of the camera. In some embodiments, graphical image 626b is an image captured by the camera at the time the visitor is in the field-of-view of the camera. Textual description 626c of the visitor includes a name of the known visitor (e.g., retrieved from a repository of the home automation system) and the name of the camera ('Front Door' camera). Instructions 626d provide instructions to the user of computer system 600 on how to activate audio communication at the entryway, such as through a speaker and/or microphone located at the entryway (e.g., speaker and/or microphone connected to the camera, part of the camera).

In some embodiments, at FIG. 6K, computer system 600 outputs audio of video 604 (e.g., using speakers of display 610) without outputting audio received from a microphone of (or connected to) the front door camera. In some embodiments, computer system 600 outputs audio received from a microphone of the front door camera without outputting audio of video 604. In some embodiments, computer system 600 concurrently outputs audio of video 604 and audio received from a microphone of the front door camera.

In some embodiments, computer system 600 receiving an indication corresponding to a button press of menu button 602*b* (independent of the focus) while displaying the user interface of FIG. 6K causes computer system 600 to cease displaying user interface 626 and continue to display video 604, as illustrated in FIG. 6J.

At FIG. 6L, as video 604 continues to play, an additional known visitor has entered the field-of-view of the camera and, as a result, computer system 600 has updated user interface 626 to include a graphical image 626*e* corresponding to the known visitor Frank (in addition to the previously displayed visitor Anne) and updated textual description 626*c* to include the name of the additional visitor (e.g., without receiving any additional user input, without receiving input at remote control 602), in addition to the name of the previously displayed visitor (Anne). In some embodiments, after a timeout (e.g., 3 seconds), instructions 626*d* change from "Press MIC to speak" to an instruction indicating how to view a full-screen view of camera preview 626*a*: "Press TV for full screen", as show in FIG. 6N.

At FIG. 6L, remote control 602 detects activation of microphone button 602*d* via button press 630*h*, and transmits an indication of the input to computer system 600. Computer system 600 receives, from remote control 602, the indication corresponding to button press 630*h* of microphone button 602*d* and, in response, enables two-way audio communication with the entryway. In some embodiments, enabling two-way audio communication with the entryway includes computer system 600 transmitting audio received at computer system 600 (e.g., via a microphone of computer system 600, via a microphone wirelessly connected to computer system 600, via a microphone of remote control 602) to be output at a speaker located at the entryway (e.g., via a speaker of the camera) and concurrently causing audio output (e.g., via a speaker of display 610) of received audio that is detected by a microphone located at the entryway (e.g., a microphone of the front door camera).

At FIG. 6M, as video 604 continues to play, in response to receiving the indication corresponding to button press 630*h* of microphone button 602*d*, computer system 600 replaces display of 626*b*-626*e* with display of visualization 626*f* of (e.g., based on) audio (e.g., audio received at computer system 600, such audio received at a microphone of computer system 600). In some embodiments, visualization 626*f* continues to be displayed (and computer system 600 continues transmitting audio received at computer system 600 for output at the speaker located at the entryway) after computer system 600 receives an indication that button press 630*h* has been released, as shown in FIG. 6M (e.g., a toggle-to-talk system where audio is transmitted once the button is pressed and released). In some embodiments, visualization 626*f* ceases to be displayed (and computer system 600 ceases transmitting audio received at computer system 600 for output at the speaker located at the entryway) when computer system 600 receives an indication that button press 630*h* has been released (e.g., a push-to-talk system where audio is only transmitted when the button continues to be pressed). Thus, the user of remote 602 and computer system 600 can communicate with the visitors.

In some embodiments, in response to receiving the indication corresponding to button press 630*h* of microphone button 602*d* as illustrated in FIG. 6L, computer system 604 ceases to produce (e.g., at a speaker of display 604) the audio of video 604 while continuing to play the video of video 604. In some embodiments, in response to receiving the indication corresponding to button press 630*h* of microphone button 602*d*, computer system 604 produces (e.g., at a speaker of display 604) the audio received from the microphone located at the entry way (e.g., a microphone of the front door camera).

At FIG. 6N, computer system 600 has received an indication that button press 630*h* has been pressed again (e.g., for the toggle-to-talk system where audio ceases to be transmitted once the button is again pressed and released) or receives an indication that button press 630*h* has been released (e.g., for the push-to-talk system where audio is only transmitted when the button continues to be pressed). In response, computer system 600 ceases to display visualization 626*f* and ceases transmitting audio received at computer system 600 for output at the speaker located at the entryway.

At FIG. 6N, remote control 602 detects activation of television button 602*c* via button press 630*i* and transmits an indication of the input to computer system 600. Computer system 600 receives, from remote control 602, the indication corresponding to button press 630*i* of television button 602*d* and, in response (and independent of focus), replaces display of video 604 and user interface 626 with front door camera UI 620, as shown in FIG. 6O (and the same as FIG. 6D). Thus, computer system 600 ceases to display video 604 and user interface 626, and instead displays front door camera UI 620, as shown in FIG. 6O.

At FIG. 6O, front door camera UI 620 includes visual representations 620*h* of the detected visitors (e.g., known visitors). In some embodiments, each visual representation is a photo retrieved from a recognition database, wherein the photo corresponds to the known visitors identified using facial recognition analysis. In some embodiments, each visual representation is an avatar (e.g., a cartoon avatar) corresponding to the known visitors identified using facial recognition analysis.

At FIG. 6O, front door camera UI 620 also includes textual description 620*f* (e.g., same as 626*c*) of the visitor. Textual description 626*f* of the visitor includes a name of the known visitor (e.g., retrieved from a repository of the home automation system, as described with reference to FIGS. 8A-8W) and the name of the camera ('Front Door'). Front door camera UI 620 includes the same features and functionality as described above with respect to FIG. 6D. In some embodiments, while displaying the user interface of FIG. 6O, computer system 600 receives an indication corresponding to a button press of menu button 602*b* and, in response, (and independent of the focus) displays the user interface of FIG. 6J (e.g., video 605 playing without user interface 626).

At FIG. 6O, as the live video feed from the camera continues to be displayed, remote control 602 detects activation of microphone button 602*d* via button press 630*j* and transmits an indication of the input to computer system 600. Computer system 600 receives, from remote control 602, the indication corresponding to button press 630*j* of microphone button 602*d* and, in response, enables two-way audio communication with the entryway. In some embodiments, enabling two-way audio communication with the entryway includes computer system 600 transmitting audio received at computer system 600 (e.g., via a microphone of computer system 600, via a microphone wirelessly connected to computer system 600, via a microphone of remote control 602) to be output at the speaker located at the entryway (e.g., via a speaker of the camera) and concurrently causing audio output (e.g., via a speaker of display 610) of received audio that is detected by a microphone located at the entryway (e.g., a microphone of the front door camera).

At FIG. 6P, as the live video feed from the camera continues to be displayed, in response to receiving the indication corresponding to button press 630*j* of microphone button 602*d*, computer system 600 replaces display of 620*f* with display of visualization 620*g* of (e.g., based on) audio (e.g., audio received at computer system 600). In some embodiments, visualization 620*g* continues to be displayed (and computer system 600 continues transmitting audio received at computer system 600 for output at the speaker located at the entryway) after computer system 600 receives an indication that button press 630*j* has been released (e.g., a toggle-to-talk system where audio is transmitted once the button is pressed and released). In some embodiments, visualization 620*g* ceases to be displayed (and computer system 600 ceases transmitting audio received at computer system 600 for output at the speaker located at the entryway) when computer system 600 receives an indication that button press 630*j* has been released (e.g., a push-to-talk system where audio is only transmitted when the button continues to be pressed). Thus, the user of remote 602 and computer system 600 can communicate with the visitors.

At FIG. 6Q, focus is on front door lock control user interface object 620*d*, which corresponds to the lock of the front door, based on computer system 600 having received input from remote control 602 corresponding to navigation to front door lock control user interface object 620*d*. Front door lock control user interface object 620*d* is visually emphasized to indicate the focus (as shown in FIG. 6Q via the bold border of front door lock control user interface object 620*d*).

At FIG. 6Q, while the focus is on front door lock control user interface object 620*d*, remote control 602 detects activation of selection region 602*a* via button press 630*k* and transmits an indication of the input to computer system 600. While the focus is on selectable UI object 612*b*, computer system 600 receives, from remote control 602, the indication corresponding to button press 630*k* of selection region 602*a*.

In response to the indication corresponding to button press 630*k* while focus is on front door lock control user interface object 620*d*, and in accordance with a determination that the indication corresponding to button press 630*k* was received from a secure remote control (e.g., a Bluetooth remote control paired with computer system 600) (and optionally in accordance with a determination that the accessory device corresponding to front door lock control user interface object 620*d* is a secure accessory device (e.g., a lock, a security-related accessory)), computer system 600 initiates a process to change the state of (e.g., lock or unlock) the front door lock.

In response to the indication corresponding to button press 630*k* while focus is on front door lock control user interface object 620*d*, and in accordance with a determination that the accessory device corresponding to front door lock control user interface object 620*d* is a secure accessory device (e.g., a lock, a security-related accessory) and in accordance with a determination that the indication corresponding to button press 630*k* was received from a non-secure remote control (e.g., an infrared instruction from a remote control that cannot be confirmed to be paired with computer system 600), computer system 600 forgoes initiating the process to change the state of (e.g., lock or unlock) the front door lock. This helps to prevent the state of secure accessory devices from being changed using non-secure remote controls.

At FIG. 6R, confirmation UI 632 is displayed based on a determination that the accessory device (the front door lock) corresponding to front door lock control user interface object 620*d* is a secure accessory device. Because the front door lock is a secure accessory device, the state of the front door lock is not changed until computer system 600 receives confirmation (e.g., via activation of confirm UI object 632*a*). This process helps to prevent the state of secure accessory devices from being unintentionally changed.

At FIG. 6R, while the focus is on confirm UI object 632*a*, remote control 602 detects activation of selection region 602*a* via button press 630*l* and transmits an indication of the input to computer system 600. While the focus is on confirm UI object 632*a*, computer system 600 receives, from remote control 602, the indication corresponding to button press 6301 of selection region 602*a* and, in response, transmits an instruction to unlock the entry way front door lock.

At FIG. 6S, (e.g., in response to receiving confirmation that the entry way front door lock has been unlocked), computer system 600 updates display of front door lock control user interface object 620*d* to indicate that the lock is 'unlocked'.

In contrast to front door lock control user interface object 620*d*, because entryway light control user interface object 620*e* corresponds to a non-secure accessory (e.g., non-lock, non-security-related accessory), computer system 600 initiates a process to change the state of (e.g., turn on or turn off) the corresponding accessory (the light) independent of whether the front door lock control user interface object 620*d* was activated using a secure or non-secure remote control. Further, unlike for secure accessories (such as the lock corresponding to front door lock control user interface object 620*d*), initiating the process to change the state of (e.g., turn on or turn off) the corresponding non-secure accessory does not include a confirmation (e.g., an instruction is transmitted to turn on/off the light located at the entry way without requiring further user input).

Figure 6T:
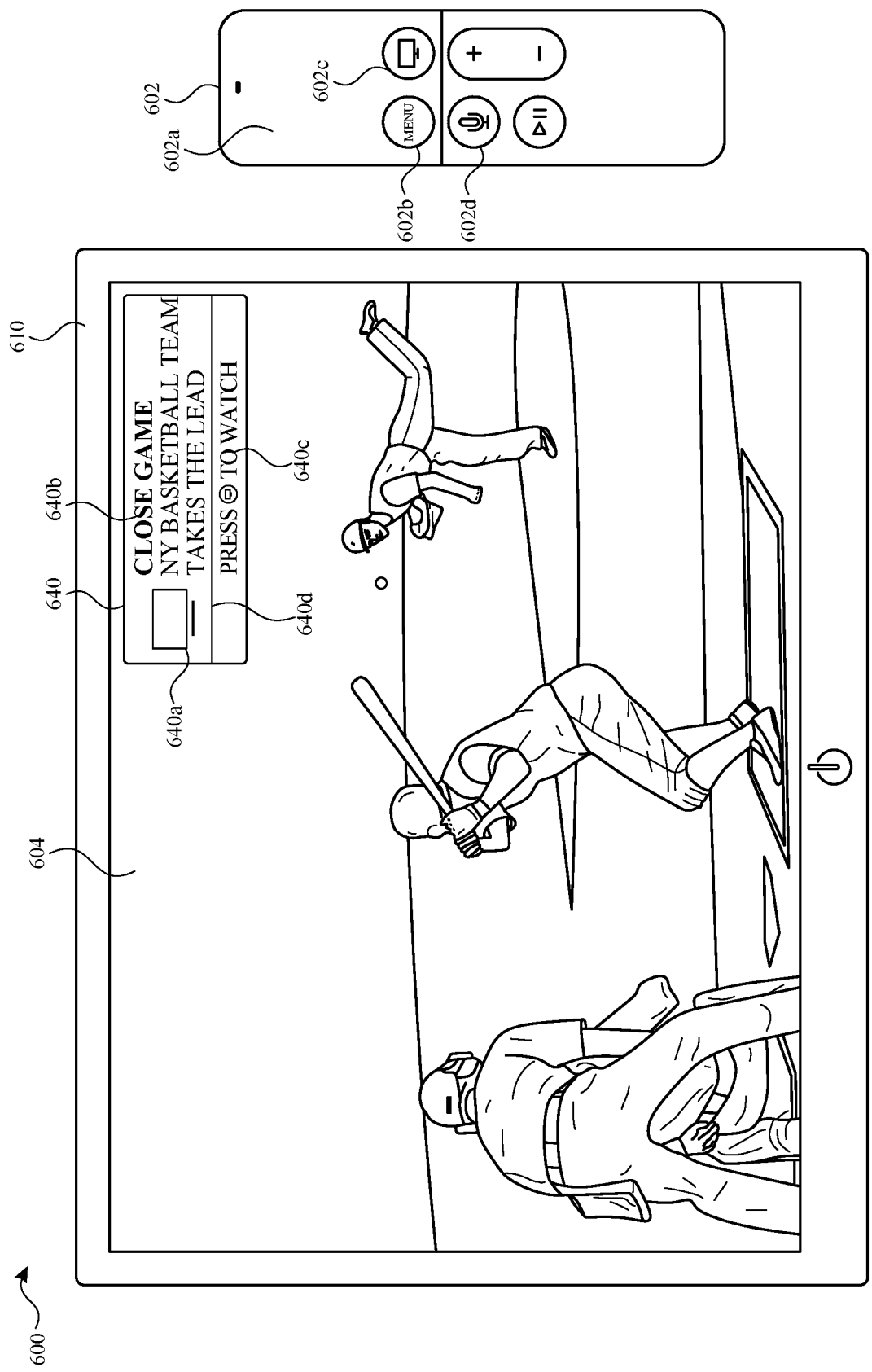

Turning back to FIG. 6A, while displaying video 604 (e.g., a baseball game), computer system 600 receives input (e.g., from a remote server). In accordance with a determination that the input corresponds to an indication of an event (e.g., score differential with less than a threshold amount of game time left in a live sporting event, such as a basketball game) corresponding to a media stream (e.g., a video stream of a live sporting event, such as a basketball game), computer system 600 displays notification 640 overlaid on content 604 (as content 604 continues to play), as shown in FIG. 6T. In some embodiments, computer system 600 displays notifications of suggested content (e.g., suggested videos, suggested media) based on suggestion criteria (e.g., based on user preferences, previously played media, current events, and/or content availability). In some embodiments, the notifications of suggested content are overlaid on content 604 (as content 604 continues to play).

At FIG. 6T, notification 640 includes visual representation 640*a*, textual description 640*b* of the event, and instructions 640*c* that the user can perform to cause display of the media stream. In some embodiments, visual divider 640*d* visually separates visual representation 640*a* and textual description

640*b* from instructions 640*c*. In some embodiments, visual divider 604*d* is not displayed as part of notification 640.

In some embodiments, while computer system 600 displays notification 640 overlaid on video 604 (which is continuing to play), remote control 602 detects activation of television button 602*c* via a button press and transmits an indication of the input to the computer system. While video 604 continues playing with notification 640 overlaid, computer system 600 receives, from remote control 602, the indication corresponding to the press of television button 602*a* and, in response, replaces display of video 604 with display (e.g., full screen display) of the media stream associated with the event.

Turning back to FIG. 6A, while displaying video 604 (e.g., a baseball game), computer system 600 receives input (e.g., from remote 602). Computer system 600 determines a user account that is currently signed into computer system 600 (e.g., the user account that is currently active on computer system 600). In accordance with a determination that the input meets a set of criteria (e.g., input that turns on the TV, input that wakes up the computer system from sleep or low-power mode, input that requests to change what user account is signed in to the computer system), computer system 600 displays notification 660 overlaid on video 604 (which continues to play), as shown in FIG. 6U.

At FIG. 6U, notification 660 includes avatar 660*a*, textual description 660*b*, and instructions 660*c* that the user can perform to initiate a process to change the user account currently signed into computer system 600 (e.g., change the signed-in account from a first user account to a second user account). Avatar 660*a* (e.g., an image) corresponds to the user account currently signed into computer system 600. Textual description 660*b* includes an identifier (e.g., name of the user) corresponding to the user account currently signed into computer system 600.

In some embodiments, while computer system 600 displays notification 660 overlaid on video 604 (which is continuing to play), remote control 602 detects activation of television button 602*c* via a button press and transmits an indication of the input to the computer system. While video 604 continues playing with notification 660 overlaid, computer system 600 receives, from remote control 602, the indication corresponding to the press of television button 602*a* and, in response, initiates the process for changing the user signed into computer system 600. In some embodiments, initiating the process includes displaying one or more user account objects for selection, wherein selection of a user account object causes computer system 600 to be signed in using the respective user account.

FIG. 7 is a flow diagram illustrating a method for displaying camera views using a computer system in accordance with some embodiments. Method 700 is performed at a computer system (e.g., 100, 300, 500, 600). Some operations in method 700 are, optionally, combined, the orders of some operations are, optionally, changed, and some operations are, optionally, omitted.

As described below, method 700 provides an intuitive way for displaying camera views. The method reduces the cognitive burden on a user for displaying camera views, thereby creating a more efficient human-machine interface. For battery-operated computing devices, enabling a user to display camera views faster and more efficiently conserves power and increases the time between battery charges.

Computer system (e.g., an electronic device 600, a set top device; a digital media player) is in communication with (e.g., wired communication, wireless communication) a display generation component (e.g., 610). While displaying, via the display generation component (e.g., 610), content (e.g., 604, video content being received from a source other than the camera, such as a movie streaming from a server), computer system receives (702) a first input (e.g., an input corresponding to an indication of doorbell activity (an indication that motion has been detected by the camera, an indication that a doorbell switch has been activated), an input (e.g., 630*b*) corresponding to activation of a selectable user interface object of a control user interface displayed via the display generation component; an input corresponding to received audio that includes a voice command). In some embodiments, the computer system is also in communication with a camera (e.g., a doorbell camera, a camera system that includes a camera sensor (and an optional doorbell switch), a camera system mounted at an entrance to a physical location, such as an entrance to a home), and with an accessory device (e.g., a remote and controllable accessory device, such as a door lock or a light).

In response to receiving the first input (e.g., 630*b*), the computer system (e.g., 600) displays (704), via the display generation component (e.g., 610), a camera view (e.g., 616*a*, 626*a*, that includes visual elements from the camera, such as a video feed, a live video feed, an image, a series of images, a selectable user interface object) at least partially overlaid (e.g., fully overlaid) on the content (e.g., 604, such that a first portion of the content is replaced with display of the camera view while continuing to display a second portion of the content). The camera view is displayed using a first visual configuration (e.g., a first display size (a preview display size), a first display location (in a corner of the displayable area)). In some embodiments, playback of the content (e.g., 604) continues despite receiving the first input.

While displaying, via the display generation component (e.g., 610), the camera view (e.g., 616*a*, 626*a*) having the first visual configuration overlaid on the content (e.g., video content), the computer system (e.g., 600) receives (706) a second input (e.g., 630*c*, selection of the selectable camera view user interface object, 630*i*, an input corresponding to an indication of activation of a remote control button, such as a menu button or a selection button, or an input corresponding to received audio that includes a voice command).

In response to receiving the second input (e.g., 630*c*, 630*i*), the computer system (e.g., 600) concurrently displays (708), via the display generation component (e.g., 610): the camera view using a second visual configuration (710) (e.g., 620*a*, at a second display size that is larger than the first display size, at a display size that causes the camera view to reach four edges of the displayable area, at a full-screen display size, at a second display location that is different from the first display location) that is different from the first visual configuration (e.g., and without displaying the camera view using the first visual configuration) and an accessory control user interface object (e.g., 620*d*, 620*e*, 622*d*, 622*e*) corresponding to an accessory device (712). Selection of the accessory control user interface object (e.g., 620*d*, 620*e*, 622*d*, 622*e*) initiates a process to transmit an instruction (e.g., selection causes transmission of the instruction) to change a state of the accessory device (e.g., causes the door to lock or unlock, causes the light to turn on or off). In some embodiments, the accessory control user interface object (e.g., 620*d*, 620*e*, 622*d*, 622*e*) is overlaid on the camera view (e.g., 620*a*, 622*a*) having the second visual configuration. In some embodiments, in response to receiving the second input (e.g., 630*c*, 630*i*), the computer system ceases display, via the display generation component (e.g., 610), of the content (e.g., 604). In some embodiments, the camera view (e.g., 620*a*, 622*a*) fully replaces display of the content such that no portion of the content continues to be displayed. In some embodiments, the content (e.g., 604) is video content and playback of the video content is paused in response to receiving the second input.

Displaying the camera view using the second visual configuration concurrently with the accessory control UI object reduces the number of inputs required to control the accessory device while still being able to view the camera view. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the second input (and, optionally, in accordance with a determination that an individual, such as an individual corresponding to an entry of an electronic phone or address book, is depicted in (or determined to be in) the camera view), the computer system (e.g., 600) displays, via the display generation component (e.g., 610), concurrently with the camera view (e.g., 620*a*) in the second visual configuration and the accessory control user interface object (e.g., 620*d*, 620*e*) corresponding to the accessory device: an indication (e.g., "Anne" and "Frank", a name retrieved from an phone/address book) of an individual determined to be in the camera view (e.g., within the field-of-view of the camera that is in communication with the computer system; the individual identified using face recognition); and a visual representation (e.g., 620*h*, an avatar of the individual retrieved from the phone/address book, a graphical non-photographic depiction of the individual, different from an image of the individual as depicted (or determined to be in) in the camera view) of the individual determined to be in the camera view.

Displaying an indication of the individual and a visual representation of the individual provides the user with feedback about the identity of the individual in the field-of-view of the camera, as determined by the computer system. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the second input and in accordance with a determination that no individual (or no individual that corresponds to an entry of an electronic phone or address book) is depicted (or determined to be in) in the camera view, forgoing displaying an indication or visual representation of any individual in the camera view. Thus, in some embodiments, when a known person (person corresponding to an entry of a phone/address book) is displayed in the camera view, a name and visual representation of the known person is shown; when a known person is not depicted (or determined to be in) in the camera view, a name and avatar is not displayed.

In some embodiments, in response to receiving the first input (and, optionally, in accordance with a determination that an individual, such as an individual corresponding to an entry of an electronic phone or address book, is depicted in (or determined to be in) the camera view), displaying, via the display generation component, concurrently with the camera view in the first visual configuration: an indication (e.g., a name retrieved from an phone/address book) of an individual depicted in (or determined to be in) the camera view (e.g., within the field-of-view of the camera that is in communication with the computer system; the individual identified using face recognition); and a visual representation (e.g., an avatar of the individual retrieved from the phone/address book, a graphical non-photographic depiction of the individual, different from an image of the individual as depicted in (or determined to be in) the camera view) of the individual depicted in (or determined to be in) the camera view.

In some embodiments, in response to receiving the second input (and, optionally, in accordance with a determination that an individual, such as an individual corresponding to an entry of an electronic phone or address book, is depicted in (or determined to be in) the camera view), displaying, via the display generation component, concurrently with the camera view in the second visual configuration and the accessory control user interface object corresponding to the accessory device: instructions to follow to activate transmitting of audio detected at a microphone (e.g., message overlaid on the camera view (at the bottom) that says "Press third button (e.g., an audio button) of the control device to speak.")

In some embodiments, while concurrently displaying, via the display generation component (e.g., 610), the camera view (e.g., 620*a*) using the second visual configuration and the accessory control user interface object (e.g., 620*d*, 620*e*, 622*d*, 622*d*) corresponding to the accessory device, receiving selection of (e.g., navigation inputs to target the accessory control user interface object and selection input 630*k* to activate the selected accessory control user interface object) the accessory control user interface object. In response to receiving selection of the accessory control user interface object, computer system 600 initiates the process to transmit an instruction to change the state of the accessory device. The process optionally includes transmitting an instruction to change the state of the accessory device (e.g., turning a light on or off, pausing/unpausing a speaker).

In some embodiments, the second input is received from a control device (e.g., 602, a remote control; a secure control device, such as a BT-linked or otherwise identifiable remote control; a non-secure control device, such as an infrared remote control or a non-BT-linked/non-identifiable remote control). Initiating a process to transmit an instruction to change the state of the accessory device includes: in accordance with a determination that the accessory device is a second type of accessory device (e.g., a secure accessory device; a lock-type of device; a door lock), and in accordance with a determination that the control device (e.g., 602) is a secure control device (e.g., is a device that is verified by the computer system as a previously approved control device; is a currently paired Bluetooth control device), proceeding with the process to transmit an instruction to change the state of the accessory device (e.g., requesting confirmation to transmit the instruction to change the state of the accessory device; transmitting the instruction to change the state of the accessory device); and in accordance with a determination that the accessory device is a second type of accessory device (e.g., a secure accessory device; a lock-type of device; a door lock), and in accordance with a determination that the control device (e.g., 602) is not a secure control device (e.g., is not a device that is verified by the computer system as a previously approved control device; is not a currently paired Bluetooth control device), forgoing proceeding with the process to transmit the instruction to change the state of the accessory device (e.g., forgo requesting confirmation to transmit the instruction to change the state of the accessory device; forgo transmitting the instruction to change the state of the accessory device).

In some embodiments, initiating the process to transmit an instruction to change the state of the accessory device further includes: in accordance with a determination that the accessory device is a first type of accessory device (e.g., a non-secure accessory device; not a lock-type of device; not a door lock), transmitting the instruction to change the state of the accessory device (e.g., irrespective of whether the control device from which the second input was received is a secure control device or a non-secure control device, without requesting confirmation of the instruction to change the state of the accessory device; without sending a notification of the state change to other devices (based on being the first type of accessory).

In some embodiments, a secure control device is required to both lock and unlock an accessory device of the second type. In some embodiments, in accordance with a determination that the accessory device is the second type of accessory device (e.g., a secure accessory device; a lock-type of device; a door lock), and in accordance with a determination that the control device is a secure control device (e.g., a device that is verified by the computer system as a previously approved control device, such as through user confirmation; a currently paired Bluetooth control device), requesting confirmation (e.g., from the user; using the secure control device) to transmit the instruction (e.g., using a displayed confirmation object) to change the state of the accessory device (and, once the requested confirmation is received, transmitting the instruction and sending a notification of the state change to other devices (based on being the second type of accessory).

Limiting particular accessory to only be activated using a secure control device provides added security so that an unauthorized individual with a non-secure control device cannot activate the accessory. Securing sensitive accessories enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, initiating a process to transmit an instruction to change the state of the accessory device includes: in accordance with a determination that the accessory device is a first type of accessory device (e.g., a non-secure accessory device; not a lock-type of device; not a door lock), transmitting, in response to receiving selection (e.g., 630k) of the accessory control user interface object, the instruction to change the state of the accessory device (e.g., irrespective of whether the control device from which the second input was received is a secure control device or a non-secure control device, without requesting confirmation of the instruction to change the state of the accessory device); and in accordance with a determination that the accessory device is a second type of accessory device (e.g., a secure accessory device; a lock-type of device; a door lock): requesting confirmation (e.g., 632, from the user; using the secure control device) to transmit the instruction (e.g., using a displayed confirmation object) to change the state of the accessory device without transmitting the instruction to change the state of the accessory device (and, once the requested confirmation is received, transmitting the instruction).

Requesting a confirmation for particular accessories help to prevent the state of important accessories from being unintentionally changed. Preventing unintentional state changes to accessories enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, via the display generation component (e.g., 610), the camera view (e.g., 620a, 622a) using the second visual configuration includes: in accordance with a determination that a live feed (e.g., a live video feed, a live audio and view feed; a real-time feed) (e.g., a live feed is a feed that corresponds to a time within a threshold amount of time from a current time) is available from a camera (e.g., a doorbell camera, a camera system that includes a camera sensor (and an optional doorbell switch), a camera system mounted at an entrance to a physical location, such as an entrance to a home) corresponding to the camera view, concurrently displaying: the live feed (e.g., 620a, the live video feed of the field-of-view of the camera) received from the camera, and a visual indication (e.g., "LIVE", overlaid on the live feed, in the top left of the display) that the camera view is a live feed. In some embodiments, displaying, via the display generation component (e.g., 610), the camera view (e.g., 620a, 622a) using the second visual configuration includes: in accordance with a determination that a live feed is not available from the camera corresponding to the camera view, concurrently displaying: a static image (e.g., 622a, a non-moving image captured by the camera, rather than a live video feed) received from the camera, and a visual indication (e.g., 622b, overlaid on the live feed, at the bottom right of the display) based on an elapsed time corresponding to the static image (e.g., "4 secs old", "1 week old"; the elapsed time being how long ago the image was received from the camera; the elapsed time being how long ago the image was captured by the camera).

Providing indications about whether a camera view is live or static provides the user with feedback about whether the image being displayed (e.g., the image received at the computer system) is a representation of the current field-of-view of the camera. Providing improved feedback about the camera enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the visual indication (e.g., overlaid on the live feed) that the camera view is a live feed is displayed, via the display generation component, at a first location, and the visual indication (e.g., overlaid on the live feed) based on the elapsed time is displayed at a second location different from the first location.

In some embodiments, while concurrently displaying, via the display generation component (e.g., 610), the camera view (e.g., 620a, 622a) using the second visual configuration and the accessory control user interface object (e.g., 620d, 620e, 622d, 622d) corresponding to the accessory device and while the accessory control user interface object is targeted (e.g., 620d in FIG. 6O, a visual focus indicator is displayed indicating that the accessory control user interface object is in focus), computer system 600 receives a third input (e.g., 630j, 630k). In response to receiving the third input (e.g., 630j, 630k): in accordance with a determination that the third input (e.g., 630k) corresponds to activation of a first button (e.g., 602a, a select button) of a control device (e.g., 602, a remote control; a secure control device, such as a BT-linked or otherwise identifiable remote control; a non-secure control device, such as an infrared remote control or a non-BT-linked/non-identifiable remote control), the computer system (e.g., 600) initiates a process to transmit an instruction to change the state of the accessory device (e.g., transmitting an instruction to turn a light on or off, pausing/unpausing a speaker) (e.g., based on the accessory control user interface object being targeted when the third input is received); and in accordance with a determination that the third input (e.g., 630j) corresponds to activation of a third button (e.g., an audio button) of the control device (e.g., irrespective of any targeting; irrespective of the state of a visual focus indicator) (e.g., receiving input corresponding to activation of an audio button that is different from the select button and the menu button), the computer system (e.g., 600) transmits (e.g., while the third button continues to be activated) audio detected via a microphone (e.g., the audio detected at the computer system, detected at the control device) to a remote speaker device (e.g., to a speaker, to a speaker of the camera, to a speaker connected to the camera).

In some embodiments, non-secure affordances (e.g., notification, camera preview) are activated based on receiving input corresponding to activation of the first button (e.g., a select button) of the control device irrespective of whether the control device is (or is not) a secure control device.

In some embodiments, the first input (e.g., 630b) is received while displaying, via the display generation component (e.g., 610), a control user interface (e.g., 612) overlaid on the content (e.g., 604), the control user interface (e.g., 612) including a user interface object (e.g., 612b) for accessing one or more accessory devices (e.g., an icon for accessing a home automation user interface or application). In some embodiments, the first input (e.g., 630b) is a selection of the user interface object (e.g., 612b) for accessing one or more accessory devices (e.g., receiving navigation inputs, such as from a remote control, to target the user interface object for accessing one or more accessory devices and receiving a selection input, such as from the remote control, to activate the selected user interface object).

In some embodiments, the control user interface further includes one or more other user interface objects, such as a user interface object for searching (e.g., 612d) and a user interface object for transmitting media to a device (e.g., 612c).

Displaying a control user interface overlaid on the content enables the computer system to continue displaying, and the user to continue viewing, at least a portion of the content (e.g., a majority of the content) while still having access to additional functions. Providing access to additional functions while maintaining display of the content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component (e.g., 610), the content (e.g., 604) and prior to overlaying the control user interface (e.g., 612) on the content (e.g., 604), the computer system (e.g., 600) receives, from a control device (e.g., 602, a remote control), a fourth input (e.g., 630a, a long press on a button, such as a TV button 602c, of the control device). In response to receiving the fourth input, the computer system (e.g., 600) displays the control user interface (e.g., 612) overlaid on the content (e.g., 604), wherein the control user interface includes the user interface object (e.g., 612b) for accessing one or more accessory devices.

Displaying a control user interface overlaid on the content enables the computer system to continue displaying, and the user to continue viewing, at least a portion of the content (e.g., a majority of the content) while still having access to additional functions. Providing access to additional functions while maintaining display of the content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the first input, computer system 600 concurrently displays with the camera view (e.g., 616a), via the display generation component (e.g., 610): at least part of a second camera view (e.g., 616b, a portion of a second camera view; a camera view that includes visual elements from a second camera, such as a video feed, a live video feed, an image, a series of images, a second selectable user interface object) at least partially overlaid (e.g., fully overlaid) on the content (e.g., such that a first portion of the content is replaced with display of the camera view while continuing to display a second portion of the content), wherein the camera view and the second camera view are horizontally scrollable (e.g., move horizontally in unison) via user input (e.g., to scroll into view additional camera views of other cameras while scrolling out of view the camera view and the second camera view). In some embodiments, the second camera view is displayed using the first visual configuration (e.g., the first display size (the preview display size)).

In some embodiments, in response to receiving the first input, computer system 600 concurrently displays with the camera view (e.g., 616a), via the display generation component (e.g., 610): a plurality of scene control user interface objects (e.g., 618, at least partially overlaid on the content, fully overlaid on the content) that are vertically scrollable (e.g., move vertically in unison), wherein selection of a respective scene control user interface object (e.g., 618l, 618b) of the plurality of scene control user interface objects initiates a process to transmit an instruction (e.g., selection causes transmission of the instruction) to change a state of one or more (e.g., a plurality of) respective accessory devices.

Providing two sets of objects that are scrollable along different axes allows the system to receive different inputs (e.g., a vertical scroll input, a horizontal scroll input) to display additional inputs of the respects set of objects. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the second input includes: receiving, from a control device (e.g., 602 a remote control), input targeting the camera view (e.g., causing a visual focus indicator to indicate that the camera view is in focus), and while targeting the camera view, receiving, from the control device (e.g., 602), input (e.g., 630c) corresponding to activation of a first button (e.g., 602*a*, a select button) of the control device (e.g., 602) (e.g., receiving input corresponding to activation of a select button of a remote control); In some embodiments, the camera view in the second configuration includes an indication of the name (e.g., "Porch Camera", "Front Door Camera") of the respective camera, wherein the camera view includes at least a portion of a field-of-view of the respective camera.

In some embodiments, in response to receiving the second input, ceasing display, via the display generation component (e.g., 610), of the content (e.g., 604, the video content). In some embodiments, the camera view in the second visual configuration replaces display of the content. In some embodiments, the second visual configuration is a full-screen configuration. While displaying the camera view (e.g., 620*a*, 622*a*) using the second visual configuration (and while not displaying the content), the computer system (e.g., 600) receives, from the control device (e.g., 602, a remote control), input corresponding to activation of a second button (e.g., a 602*b*, menu button) of the control device (e.g., receiving input corresponding to activation of a menu button that is different from the select button). In response to receiving the input corresponding to activation of the second button of the control device, the computer system (e.g., 600) redisplays the content (e.g., 604, irrespective of any targeting; irrespective of the state of a visual focus indicator) (and, optionally, redisplaying the camera view, the second camera view, and/or the plurality of scene control user interface objects overlaid on the content). In some embodiments, in accordance with a determination that the camera view, the second camera view, and the plurality of scene control user interface objects were displayed when the first input was received, redisplaying, in response to receiving the receiving the input corresponding to activation of the second button of the control device, the camera view using the first visual configuration overlaid on the content.

Providing different types of inputs to perform different actions (e.g., ceasing display of the content, redisplaying the content) allows the system to disambiguate the user's intent for the input provided, reducing the need for the user to provide multiple inputs to access the desired function of the system.

Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the first input comprises receiving an indication that doorbell activity (e.g., a visitor (known or unknown) bring in the field-of-view of the camera, motion detected in the field-of-view of the camera, doorbell press has been detected at a doorbell) has been detected.

In some embodiments, a doorbell camera system receives images from the camera, processes the images, and determines when an individual (a person) is in a field-of-view of the camera. In some embodiments, the first input is an input received by the computer system from the doorbell camera system indicating that a determination has been made that an individual (a person) is in a field-of-view of the camera. In some embodiments, a doorbell camera system includes a button that can be activated (e.g., an electronic doorbell). In some embodiments, the first input is an input received by the computer system from the doorbell camera system indicating that a determination has been made that the button (e.g., electronic doorbell) has been activated.

Displaying the camera view when the doorbell activity is detected provides the user the user with feedback that the computer system has received data indicating that someone is in the field-of-view of the camera while the user is viewing the content. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component (e.g., 610), the camera view (e.g., 616*a*, 626*a*) using the first visual configuration (e.g., a first display size (a preview display size), a first display location (in a corner of the displayable area)), receiving fifth input.

In response to receiving fifth input: in accordance with a determination that the fifth input corresponds to activation of a second button (e.g., 602*b*, a menu button) of the control device (e.g., receiving input corresponding to activation of a menu button that is different from the select button), the computer system (e.g., 600) ceases to display the camera view (e.g., 626*a*) overlaid on the content (e.g., ceasing to display the camera view and continuing to display the content). In response to receiving fifth input: in accordance with a determination that the fifth input (e.g., 630*h*) corresponds to activation of a third button (e.g., 602*d*, an audio button) of the control device (e.g., irrespective of any targeting; irrespective of the state of a visual focus indicator) (e.g., receiving input corresponding to activation of an audio button that is different from the select button and the menu button), the computer system (e.g., 600) transmits (e.g., while the third button continues to be activated) audio detected via a microphone (e.g., the audio detected at the computer system, detected at the control device) to a remote speaker device (e.g., to a speaker, to a speaker of the camera, to a speaker connected to the camera). In response to receiving fifth input: in accordance with a determination (e.g., irrespective of any targeting; irrespective of the state of a visual focus indicator) that the fifth input (e.g., 630*i*) corresponds to activation of a fourth button (e.g., 602*c*, a television button) of the control device (e.g., receiving input corresponding to activation of a television button of a remote control), the computer system (e.g., 600) displays the camera view (e.g., 620*a*) using the second configuration and ceasing to display the content. In some embodiments, the camera view in the second configuration includes an indication of the name (e.g., "Porch Camera", "Front Door Camera") of the respective camera, wherein the camera view includes at least a portion of a field-of-view of the respective camera.

Disambiguating between various inputs received by the computer system and causing an appropriate action to be taken allows the system to provide the user with access to the multiple actions without the need to display a visual element for each action. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the second input includes receiving input that corresponds to activation of the fourth button (e.g., a television button) of the control device (e.g., receiving input corresponding to activation of a television button of a remote control), and, in response ceasing to display the content.

In some embodiments, while displaying the content (e.g., 604) without displaying the camera view, the computer system (e.g., 600) receives input corresponding to an audio instruction. In response to receiving the input corresponding to the audio instruction: in accordance with a determination (e.g., using natural language processing) that the audio instruction corresponds to an instruction to display the camera view, the computer system displays the camera view (e.g., 620a, 622a, corresponding to the camera) (using, for example, the second visual configuration); and in accordance with a determination (e.g., using natural language processing) that the audio instruction corresponds to an instruction to display a second camera view, displaying the second camera view (e.g., corresponding to a second camera different from the camera) (using, for example, the second visual configuration).

In some embodiments, while displaying the content without displaying the camera view, the computer system receives input corresponding to an audio instruction. In response to receiving the input corresponding to the audio instruction, the computer system displays the camera view (e.g., corresponding to the camera) (using, for example, the first visual configuration, the second visual configuration).

In some embodiments, the first input is an audio instruction (e.g., a voice command for processing by a digital assistant), and displaying the camera view having the first visual configuration includes: in accordance with the audio instruction including a designation of a first camera, displaying a view of the first camera having the first visual configuration; and in accordance with the audio instruction including a designation of a second camera, different from the first camera, displaying a view of the second camera having the first visual configuration.

Using voice control to cause display of a particular camera view allows a user to efficiently access camera views with limited inputs, thereby reducing the number of inputs needed. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, an external device can transmit audio (e.g., audio received via a microphone of the external device) to a speaker corresponding to the camera, independent of the computer system.

In some embodiments, the camera view (e.g., in the first visual configuration, in the second visual configuration) is a live video feed (e.g., of a field-of-view of the camera) being received from the camera. In some embodiments, the camera view (e.g., in the first visual configuration, in the second visual configuration) is a delayed image or delayed video feed (e.g., of a field-of-view of the camera) being received from the camera.

In some embodiments, the camera view in the first visual configuration includes a message overlaid on the camera view (e.g., at the bottom) that says "Press third button of the control device to speak." After a timeout (e.g., 5 seconds), the "Press third button of the control device to speak." Changes to "Press a television button to return to full screen."

In some embodiments, in response to receiving the first input, displaying, via the display generation component, a second camera view (of a second camera) (to the right of the full camera view) (without showing other camera views) concurrently with the camera view of the first camera.

In some embodiments, the camera view is not an image from the camera (e.g., no live view, no delayed still image, is a blurred image, indicates stream is not available) if "detect activity" mode is enabled for that camera.

In some embodiments, concurrently displaying a plurality of affordances, which, when activated, cause a corresponding application to be displaying, wherein the first input is activation of an affordance (e.g., corresponding to a home application) of the plurality of affordances.

In some embodiments, the control device is determined to be a secure control device based on a communication channel (e.g., Bluetooth (secure) vs IR (non-secure)).

In some embodiments, the control device is determined to be a secure control device based on having completed a pairing process with the computer system.

In some embodiments, user inputs received to change a focus between an accessory control user interface object of a non-secure accessory and an accessory control user interface object of a secure accessory causes the change in focus irrespective of whether the input was received from a secure or a non-secure control device.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, managing visitors as discussed below with respect to method 900 may be performed on electronic device 600 when displaying different camera views, as set forth in method 700. For brevity, these details are not repeated below.

FIGS. 8A-8W illustrate exemplary user interfaces for managing visitors, in accordance with some embodiments. The user interfaces in these figures are used to illustrate the processes described below, including the processes in FIG. 9.

FIG. 8A illustrates user interface 802 of an application of electronic device 800, the application for configuring settings of a home automation system, including camera and doorbell accessories. At FIG. 8A, user interface 802 includes a name 802a of the home, such as "123 MAIN ST," indications 804 of multiple users (Jane 804a, Joe 804b) who are members of the home (e.g., have rights to modify settings of accessories corresponding to the home), camera user interface object 802b for configuring settings of camera accessories that are part of the home automation system, lighting user interface object 802c for configuring settings of light accessories that are part of the home automation system, and multimedia user interface object 802d for configuring settings of multimedia accessories (e.g., speakers and televisions) that are part of the home automation system.

Indications 804 of multiple users (Jane 804a, Joe 804b) displays information related to individual users that are associated with the home automation system. The home automation system is associated with the home and enables accessories of the home automation system to be controlled and/or adjusted by each individual user who is a member of the home (e.g., associated with the home automation system). A user account corresponding to a particular user and configured on (e.g., logged into, using) an electronic device (e.g., electronic device 800) is given access to the home automation system to classify the particular user as a member of the home.

The description of FIGS. 8A-8W provide examples of electronic devices (e.g., electronic device 800) where a user account of Jane (e.g., corresponding to indication 804a) is logged into electronic device 800 and where the user account of Jane is enabled to configure accessories that are part of the home automation system. Therefore, electronic device 800 may control and/or adjust the accessories of the home automation system. In some embodiments, Joe (e.g., corresponding to indication 804b) or another user who is a member of the home automation system may use another electronic device (e.g., an external device) to also configure accessories that are part of the home automation system.

At FIG. 8A, electronic device 800 detects tap gesture 850a on camera user interface object 802b. In response to detecting tap gesture 850a, electronic device 800 displays user interface 810 as illustrated in FIG. 8B.

FIG. 8B illustrates user interface 810 for configuring settings of camera and doorbell accessories. At FIG. 8B, user interface 810 includes notification settings area 812, facial recognition area 814, today's visitor area 816 (e.g., visitors detected during the current day), and prior visitor area 818 (e.g., visitors detected during the current week not including the current day).

Notification settings area 812 includes first camera notification user interface object 812a, second camera notification user interface object 812b, and first doorbell notification user interface object 812c. First camera notification user interface object 812a is configured to adjust notification settings (e.g., turn on or off notifications displayed by electronic device 800) of first camera accessory (e.g., a kitchen camera), second camera notification user interface object 812b is configured to adjust notification settings (e.g., turn on or off notifications displayed by electronic device 800) of second camera accessory (e.g., a living room camera), and first doorbell notification user interface object 812c is configured to adjust notification settings (e.g., turn on or off notifications displayed by electronic device 800) of first doorbell accessory (e.g., a doorbell at a front door of the home). In some embodiments, notification settings area 812 includes a corresponding user interface object for adjusting notification settings for each camera and doorbell accessory that is part of the home automation system.

At FIG. 8B, facial recognition area 814 includes facial recognition user interface object 814a (e.g., "FACE RECOGNITION") that is configured to, when activated, enable or disable a facial recognition feature of the cameras and/or doorbell accessories. The facial recognition feature performs (and/or accesses) facial recognition analysis on images captured by the cameras and/or doorbell (e.g., a camera of the doorbell) accessories and image information (e.g., photos) accessible by the home automation system for facial recognition analysis (e.g., image information of a recognition database associated with the home automation system, image information that has been shared with the home automation system by electronic device 800 or an external device (e.g., from a data library of electronic device 800 or the external device)). When the facial recognition feature is enabled, as shown in FIG. 8B, facial recognition analysis is performed and notifications displayed on electronic device 800 identify, when available, an individual in the captured images of the cameras, categorizing one or more visitors as a known visitor, an unknown visitor, or an unrecognized visitor. When the facial recognition feature is disabled (e.g., via a tap gesture on facial recognition user interface object 814a), notifications displayed on electronic device 800 do not identify individuals in images captured by the camera and/or doorbell accessories.

In some embodiments, the home automation system compiles a recognition database, to which users who are members of the home may contribute and access. The recognition database includes (or is based on) image information (e.g., a video, an image, facial recognition information) and identification information (e.g., a name) that is shared and/or added by the users who are members of the home. The recognition database accesses image information from a data library (e.g., image information having identification information (e.g., a name) of individuals associated with videos, images, and/or facial recognition information) shared by electronic device 800 and/or external devices that have access to the home automation system. The recognition database also receives image information from electronic device 800 when a user who is a member of the home adds identification information (e.g., a name) for an individual in an image captured by the cameras and/or doorbell accessories (e.g., electronic device 800 receives inputs that provide identification information of an individual that appears in an image captured by the cameras and/or doorbell accessories). In some embodiments, the users may opt out of having the home automation system compile a recognition database. In all embodiments, the home automation system complies with the privacy policies as outlined further below.

In some embodiments, a known visitor is an individual that is identified via facial recognition analysis in an image captured by the cameras and/or doorbell accessories using image information (e.g., a video, an image, facial recognition information) included in the recognition database associated with the home automation system. In some embodiments, a known visitor is an individual that is identified via facial recognition analysis in an image captured by the cameras and/or doorbell accessories using image information of an identified individual (e.g., a video, an image, or facial recognition information of an individual that is associated with identification information (e.g., a name) of the individual) shared by electronic device 800 (e.g., home automation system has been given access to a photos library of electronic device 800) or an external device (e.g., home automation system has been given access to a photos library of external device). Thus, in some embodiments, a known visitor is a visitor that (a) matches (using facial recognition) an individual in (one or more) photos, videos, and/or facial recognition information accessible by the user logged into the electronic device in the home automation system and (b) the individual has a corresponding name accessible by the user logged into the electronic device in the home automation system.

In some embodiments, an unknown visitor is an individual that is identified via facial recognition analysis in an image captured by the cameras and/or doorbell accessory using image information of an unidentified individual (e.g., a video, an image, or facial recognition information that is not associated with identification information (e.g., a name) of the individual) shared by electronic device 800 (e.g., home automation system has been given access to a photos library of electronic device 800) or an external device (e.g., home automation system has been given access to a photos library of external device). Thus, in some embodiments, an unknown visitor is a visitor that (a) matches (using facial recognition) an individual in (one or more) photos, videos, and/or facial recognition information accessible by the user logged into the electronic device in the home automation system and that (b) the individual does not have a corresponding name accessible by the user logged into the electronic device in the home automation system.

In some embodiments, an unrecognized visitor is an individual that is not identified via facial recognition analysis in an image captured by the camera and/or doorbell accessories using image information included in the recognition database, image information of an identified individual shared by electronic device 800 or an external device, and image information of an unidentified individual shared by electronic device 800 or an external device. Thus, in some embodiments, an unrecognized visitor is a visitor that does not match (using facial recognition) any individual in photos, videos, and/or facial recognition information accessible by the user logged into the electronic device in the home automation system (and therefore would not have a corresponding name accessible by the home automation system).

Facial recognition area 814 also includes known individuals user interface object 814b. Known individuals user interface object 814b includes indicator 814c of a number of individuals that are known visitors to the home (e.g., individuals that are contributed to the recognition database of the home automation system).

Today's visitor area 816 includes first visitor user interface object 816a that corresponds to an unknown visitor whose image was captured by the cameras and/or doorbell accessories within a first time period (e.g., the current day). While, in this example, today's visitor area 816 of FIG. 8B shows only first visitor user interface object 816a, electronic device 800 is configured such that today's visitor area 816 includes separate user interface objects for each known visitor and each unknown visitor whose image was captured within the first time period. Today's visitor area 816 does not include user interface objects for unrecognized visitors (even if the unrecognized visitor were captured by the cameras and/or doorbell accessories during the first time period). For example, unrecognized visitors include individuals that are not likely to be associated with a member of the home (e.g., delivery persons), and thus, user interface objects for unrecognized visitors are not displayed.

Prior visitor area 818 includes second visitor user interface object 818a and third visitor user interface object 818b that each correspond to known visitors (e.g., John Appleseed and Kate Smith, respectively) whose images were captured by the cameras and/or doorbell accessories within a second time period (e.g., the current week excluding the current day). In some embodiments, the second time period is a time period occurring before the first time period and not including the first time period. As shown in FIG. 8B, today's visitor area 816 and prior visitor area 818 are separate areas on user interface 810. Separating today's visitor area 816 and prior visitor area 818 enables a user to distinguish between the visitors that were most recently captured by the cameras and/or doorbell accessories and the visitors that were captured at an earlier time. While, in this example, prior visitor area 818 of FIG. 8B shows second visitor user interface object 818a and third visitor user interface object 818b, electronic device 800 is configured such that prior visitor area 818 includes separate user interface objects for each known visitor and each unknown visitor whose image was captured within the second time period. Prior visitor area 818 does not include user interface objects for unrecognized visitors (even if the unrecognized visitor were captured by the cameras and/or doorbell accessories during the second time period). For example, unrecognized visitors include individuals that are not likely to be associated with a member of the home (e.g., delivery persons), and thus, user interface objects for the unrecognized visitors are not displayed.

At FIG. 8B, electronic device 800 detects tap gesture 850b on known individual user interface object 814b. In response to detecting tap gesture 850b, electronic device 800 displays user interface 820, as shown in FIG. 8C. At FIG. 8C, user interface 820 includes data library user interface object 820a and known faces area 822. Known faces area 822 includes visual indications (e.g., names and/or images (e.g., images from image data of electronic device 800)) corresponding to individuals (e.g., John Appleseed 822a, Kate Smith 822b, Frank Rivera 822c, and Anne Smith 822d) that are included in (e.g., added or contributed to) the recognition database of the home automation system. As discussed in detail below, the individuals included in known faces area 822 have been added to the recognition database of the home automation system. At FIG. 8C, a tap gesture on a visual indication corresponding to an individual within known faces area 822 may display an additional user interface including additional identification information (e.g., a name, an address, an email address, a phone number, etc.) corresponding to the individual selected.

As shown at FIG. 8C, electronic device 800 detects tap gesture 850c on data library user interface object 820a. In response to detecting tap gesture 850c, electronic device 800 displays user interface 824 shown in FIG. 8D. User interface 824 includes data authorization user interface object 824a, share authorization user interface object 824b, and add names user interface object 826c. Data authorization user interface object 824a, when activated, enables or disables the home automation system to access a data library (e.g., a photos library) of electronic device 800 for matching to captured images of the cameras and/or doorbell accessories. When data authorization user interface object 824a is activated, home automation system is provided access to a data library of electronic device 800 to match (e.g., via facial recognition analysis) image information of electronic device 800 (e.g., image information in data library of electronic device 800) to captured images of the cameras and/or doorbell accessories (e.g., to notify the user of device 800 (and not other users of the home automation system)). When data authorization user interface object 824a is deactivated, home automation system cannot access the data library of electronic device 800, and thus, matching (e.g., via facial recognition analysis) of the image information of electronic device 800 (e.g., image information in data library of electronic device 800) to captured images of the cameras and/or doorbell accessories is disabled (e.g., blocked or prevented).

Similarly, share authorization user interface object 824b, when activated, enables or disables the home automation system to share image data (e.g., a photos library) of electronic device 800 with other (e.g., all) users who are members of the home. As such, when share authorization user interface object 824b is activated, the data library of electronic device 800 may be used by the home automation system to provide notifications to all users who are members of the home. When share authorization user interface object 824b is not activated, the data library of electronic device 800 may be used by the home automation system to provide notifications to the user associated with electronic device 800 (e.g., Jane receives notifications when data authorization user interface object 824a is activated and share authorization user interface object 824b is deactivated), but external devices associated with all other users who are members of the home automation system do not receive notifications based on image information in the data library of electronic device 800 (e.g., Joe would not receive notifications when a facial recognition analysis determined that an image captured by the cameras and/or doorbell accessories matches image information of electronic device 800).

Figure 8D:
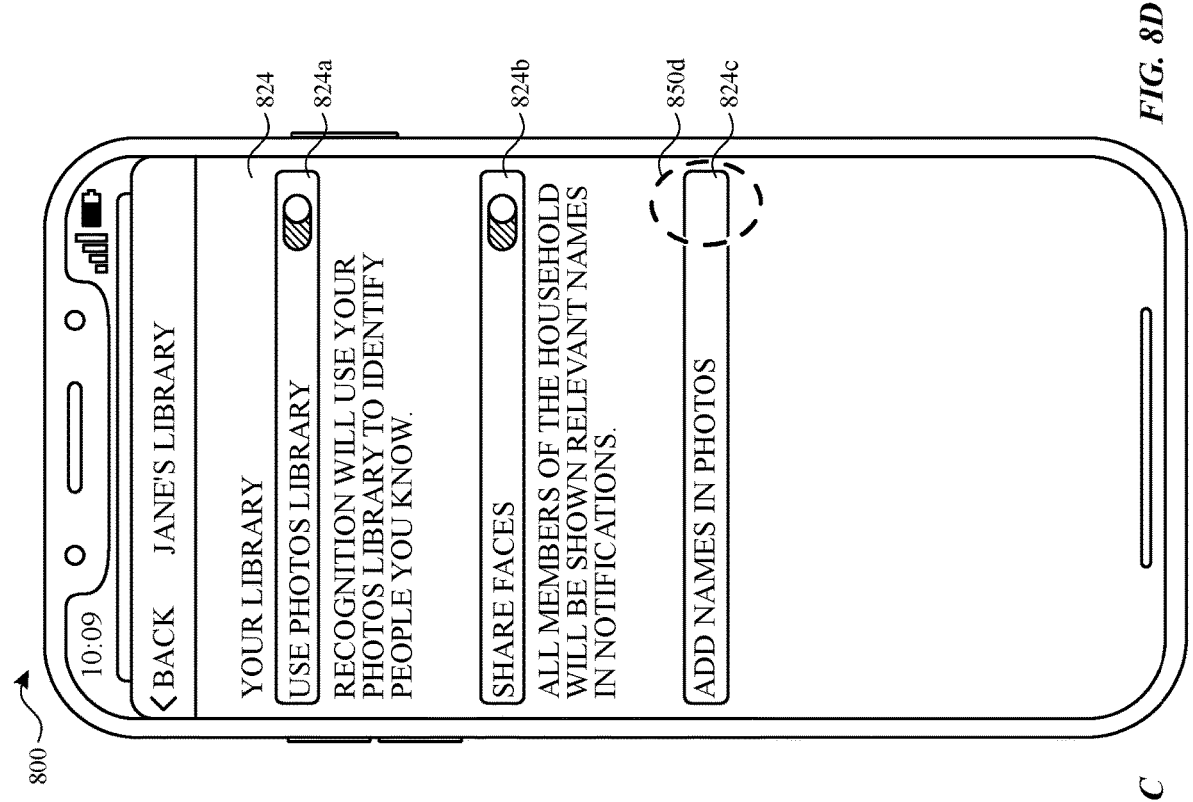
Figure 8C:
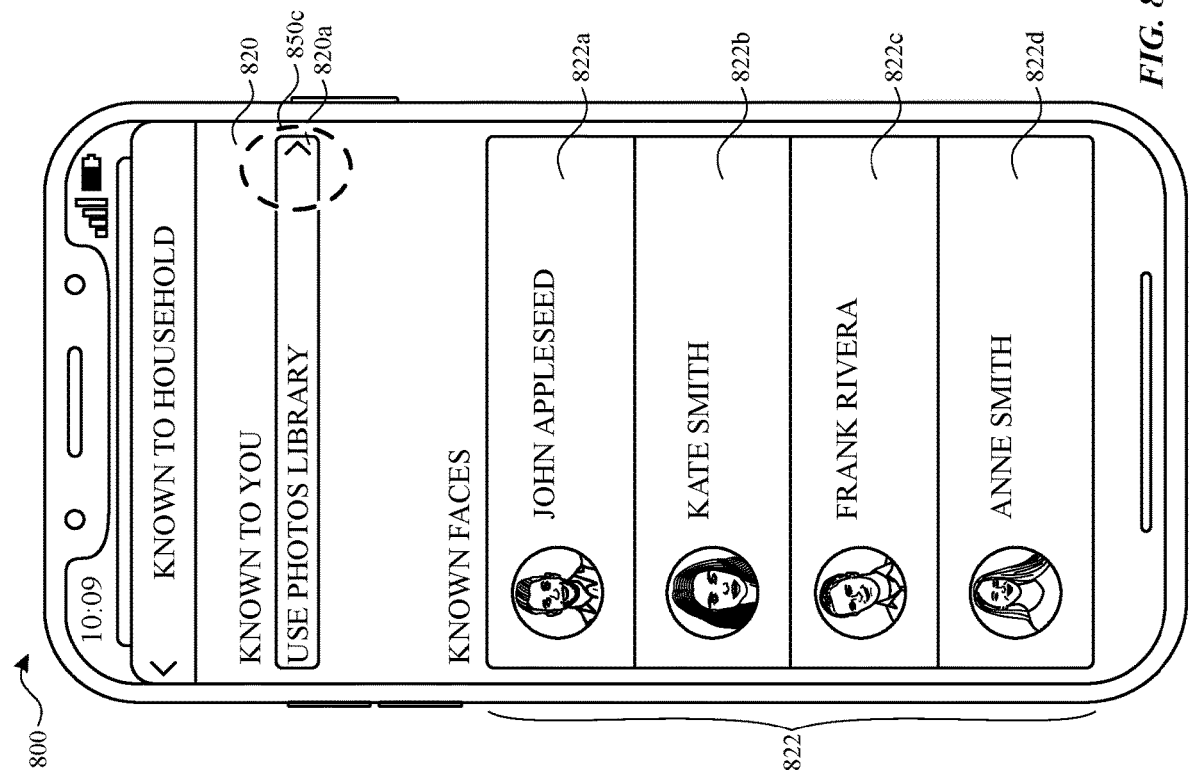
Figure 8F:
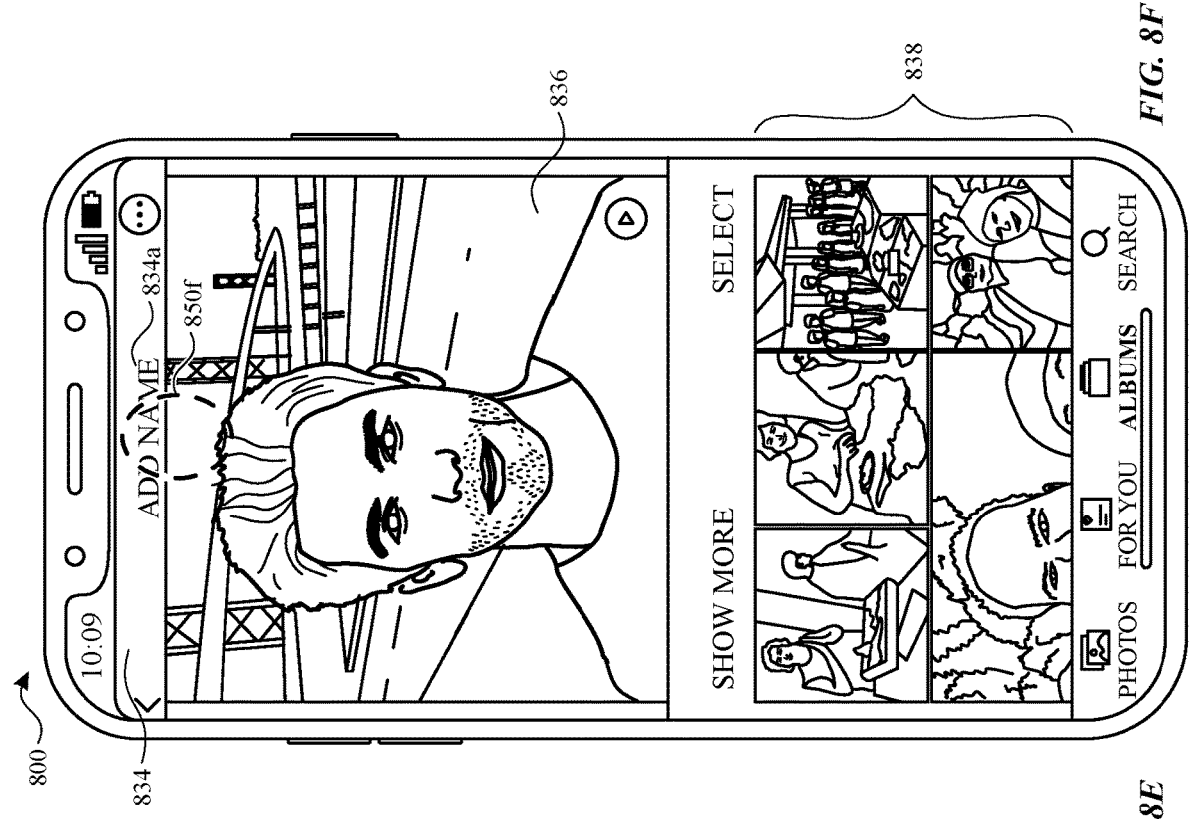
Figure 8E:
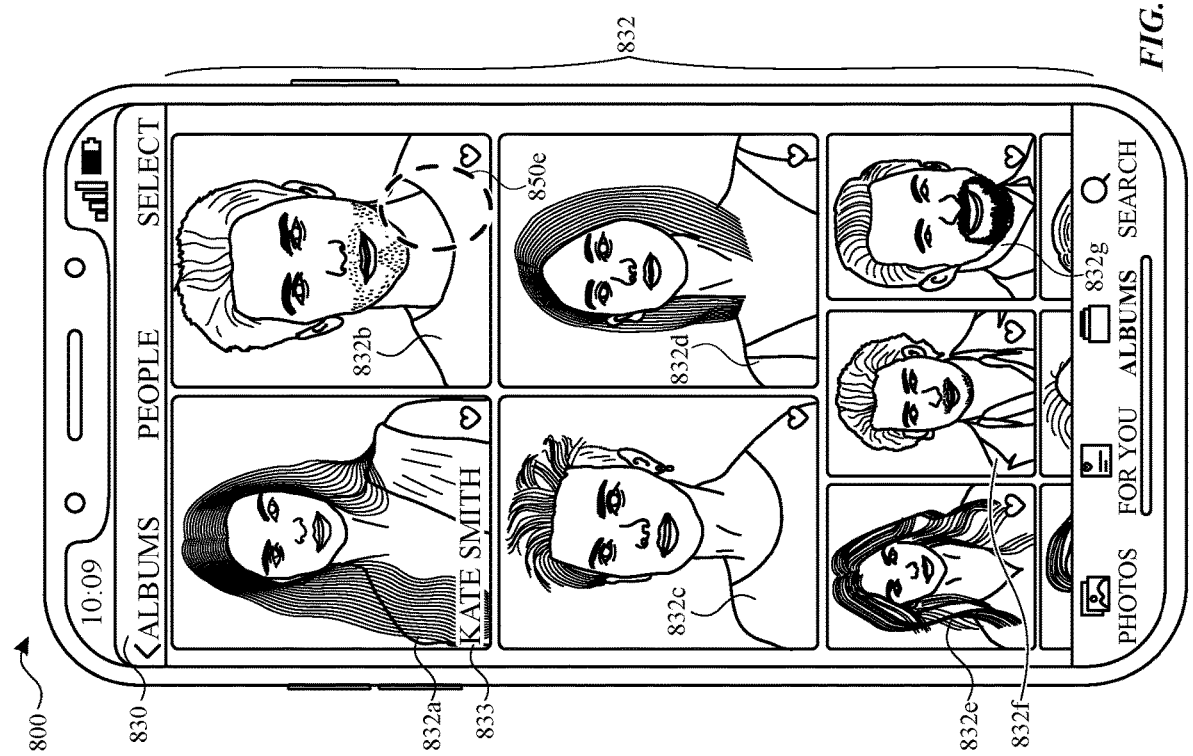
Figure 8L:
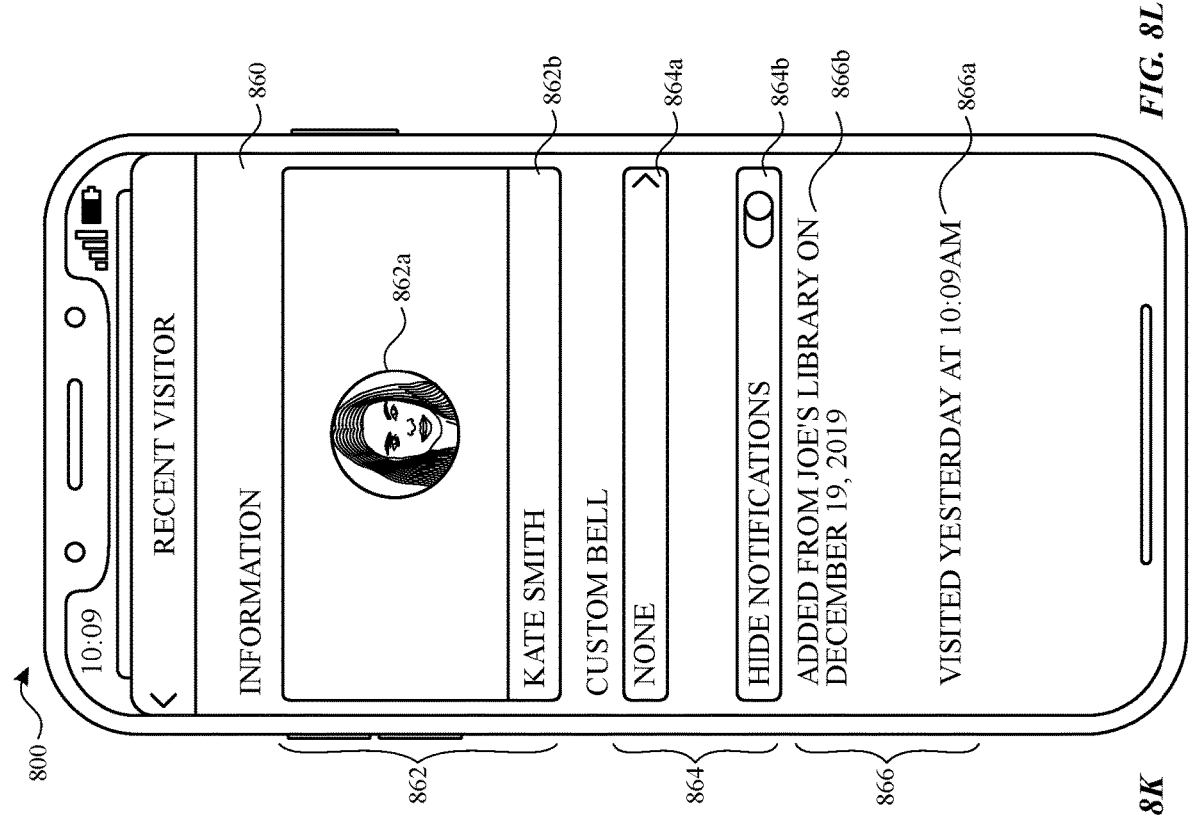

At FIG. 8D, electronic device 800 detects tap gesture 850*d* on add names user interface object 826*c*. In response to detecting tap gesture 850*d*, electronic device 800 displays user interface 830, as shown in FIG. 8E. User interface 830 includes image information (e.g., videos, images, facial recognition information) associated with a data library (e.g., photos library) of electronic device 800. At FIG. 8E, user interface 830 includes visual indicators 832 associated with individuals in the data library of electronic device 800 (e.g., facial recognition analysis detects individuals in images and/or information of the data library). Visual indicators 832 include first visual indicator 832*a* corresponding to a first individual (e.g., Kate Smith), second visual indicator 832*b* corresponding to a second individual (e.g., a first unidentified individual), third visual indicator 832*c* corresponding to a third individual (e.g., a second unidentified individual), fourth visual indicator 832*d* corresponding to a fourth individual (e.g., a third unidentified individual), fifth visual indicator 832*e* corresponding to a fifth individual (e.g., a fourth unidentified individual), sixth visual indicator 832*f* corresponding to a sixth individual (e.g., a fifth unidentified individual), and seventh visual indicator 832*g* corresponding to a seventh individual (e.g., a sixth unidentified individual). In some embodiments, visual indicators 832 correspond to individuals identified in one or more images of the data library of electronic device 800 (e.g., via facial recognition analysis).

Visual indicators 832 include identification information 833 (e.g., name of the individual) when electronic device 800 receives user input corresponding to a visual indicator 832 and receives data indicative of the identification information 833 (e.g., via additional user input). To add identification information 833 to the second individual associated with second visual indicator, at FIG. 8E, electronic device 800 detects tap gesture 850*e* on second visual indicator 832*b*. In response to detecting tap gesture 850*e* on second visual indicator 832*b*, electronic device 800 displays user interface 834, as shown in FIG. 8F. At FIG. 8F, user interface 834 includes preview image 836 corresponding to the second individual and, when available, additional images 838 corresponding to the second individual. In some embodiments, preview image 836 transitions between images corresponding to the second individual that are included in the data library of electronic device 800. In some embodiments, preview image 836 is a static image that does not transition between other images corresponding to the second individual. User interface 834 further includes an identification user interface object 834*a* (e.g., "Add Name", when electronic device 800 has not received identification information corresponding to the second individual).

At FIG. 8F, electronic device 800 detects tap gesture 850*f* corresponding to selection of identification user interface object 834*a*. In response to detecting tap gesture 850*f*, electronic device 800 displays user interface 852, as shown in FIG. 8I discussed in detail below.

Turning now to FIG. 8G (same UI as in FIG. 8B), electronic device 800 displays user interface 810 (e.g., in response to receiving one or more user inputs on user interface objects (e.g., "Back" button) of user interfaces 834, 830, 824, and/or 820). At FIG. 8G, electronic device 800 detects tap gesture 850*g* corresponding to selection of first visitor user interface object 816*a*. In response to detecting tap gesture 850*g*, electronic device 800 displays user interface 840, as shown in FIG. 8H. At FIG. 8H, user interface 840 includes information and settings related to an unknown visitor included in an image captured by the cameras and/or doorbell accessories. In some embodiments, first visitor user interface object 816*a* includes (e.g., on the left) a portion of the image captured by the cameras and/or doorbell accessories that includes the face of the unknown visitor. As set forth above, the unknown visitor includes an individual that is identified via facial recognition analysis to match image information captured by the cameras and/or doorbell accessories to image information without identification information of electronic device 800 (e.g., when image data authorization user interface object 824*a* is activated on electronic device 800) and/or image information without identification information of an external device (e.g., when image data authorization user interface object 824*a* and share authorization user interface object 824*b* are activated on the external device). At FIG. 8H, user interface 840 includes identification information area 842, unknown visitor settings area 844, and event details area 846.

Identification information area 842 includes a visual indication 842*a* of an individual associated with the unknown visitor. In some embodiments, the visual indication 842*a* includes an image of the face of the individual captured by the cameras and/or doorbell accessories at a time the unknown visitor is detected, an avatar associated with an individual identified as the unknown visitor (e.g., facial recognition analysis matches image information captured by the cameras and/or doorbell accessories to image information of electronic device 800 or an external device), and/or an image of electronic device 800 or an external device (e.g., facial recognition analysis matches image information captured by the cameras and/or doorbell accessories to image information of electronic device 800 or the external device). Additionally, identification information area 842 includes add identification information user interface object 842*b* that, when selected, is configured to initiate a process for the user of electronic device 800 to input identification information associated with the unknown visitor (e.g., name of the individual), as discussed with reference to FIG. 8G below.

Unknown visitor settings area 844 includes custom doorbell user interface object 844*a*, hide notifications user interface object 844*b*, and remove person user interface object 844*c*. Custom doorbell user interface object 844*a* is configured to, when selected, adjust audio output by a doorbell accessory of the home automation system when the home automation system identifies an individual, via facial recognition between image information captured by cameras and/or doorbell accessories and image information of the recognition database or electronic device 800, as the individual associated with the unknown visitor. Hide notifications user interface object 844*b* is configured to enable or disable, when selected, display of notifications by electronic device 800 in response to identification of an individual (e.g., when the individual is detected, when the individual rings the doorbell), via facial recognition between image information captured by cameras and/or doorbell accessories and image information of the recognition database or electronic device 800, as the individual associated with the unknown visitor. Remove person user interface object 844*c* removes first visitor user interface object 816*a* from user interface 810 and does not add the individual associated with the first visitor user interface object 816*a* to the recognition database. Event details area 846 includes first textual information 846*a* related to a time at which the unknown visitor was detected by an accessory (e.g., the camera and/or doorbell accessory) of the home automation system.

At FIG. 8H, to add the unknown visitor to the recognition database (thereby converting the visitor to a known visitor), electronic device 800 detects tap gesture 850*h* on add identification user interface object 842*b*. In response to detecting tap gesture 850*h*, electronic device 800 displays user interface 852, as shown in FIG. 8I.

At FIG. 8I, user interface 852 includes text input user interface object 852*a*, add individual user interface object 852*b*, and keyboard user interface object 852*c*. Electronic device 800 detects a gesture (e.g., a tap gesture) on text input user interface object 852*a* to enable electronic device 800 to receive input via keyboard user interface object 852*c*. As such, electronic device 800 detects inputs (e.g., a series of tap gestures) on keyboard user interface object 852*c* corresponding to identification information (e.g., a name) of the individual corresponding the unknown visitor. Upon completion of the inputs on keyboard user interface object 852*c*, electronic device 800 detects a tap gesture 850*i* on add individual user interface object 852*b*. In response to detecting tap gesture 850*i*, electronic device 800 displays user interface 854, as shown in FIG. 8J.

At FIG. 8J, electronic device 800 updates user interface 840 to display user interface 854, reflecting that the same visitor is now a known visitor (e.g., has a corresponding name). User interface 854 includes the identification information received via user input from user interface 852. As shown in FIG. 8J, add identification information user interface object 842*b* is replaced with identification information user interface object 854*a* (e.g., textual indication identifying the unknown visitor as "GARDENER"). Further, visitor details area 846 is modified to include second textual information 846*b* indicating that Jane identified the (previously) unknown visitor (e.g., by inputting information identifying the unknown visitor as "GARDENER" (e.g., tagging the unknown visitor)) on a date (e.g., Jan. 4, 2020). In some embodiments second textual information 846*b* includes a user who is a member of the home that identified the unknown visitor (e.g., input identification information associated with the unknown visitor) and/or a data library of a user who is a member of the home that was used to identify the unknown visitor (e.g., a facial recognition analysis identified the unknown visitor between image information captured by the cameras and/or doorbell accessories and image information of the data library of the user who is a member of the home). In some embodiments, second textual information 846*b* does not include the date of identification of the unknown visitor and only includes textual information related to the user who is a member of the home and/or the data library of the user who is a member of the home that was utilized to identify the unknown visitor.

Figure 8K:
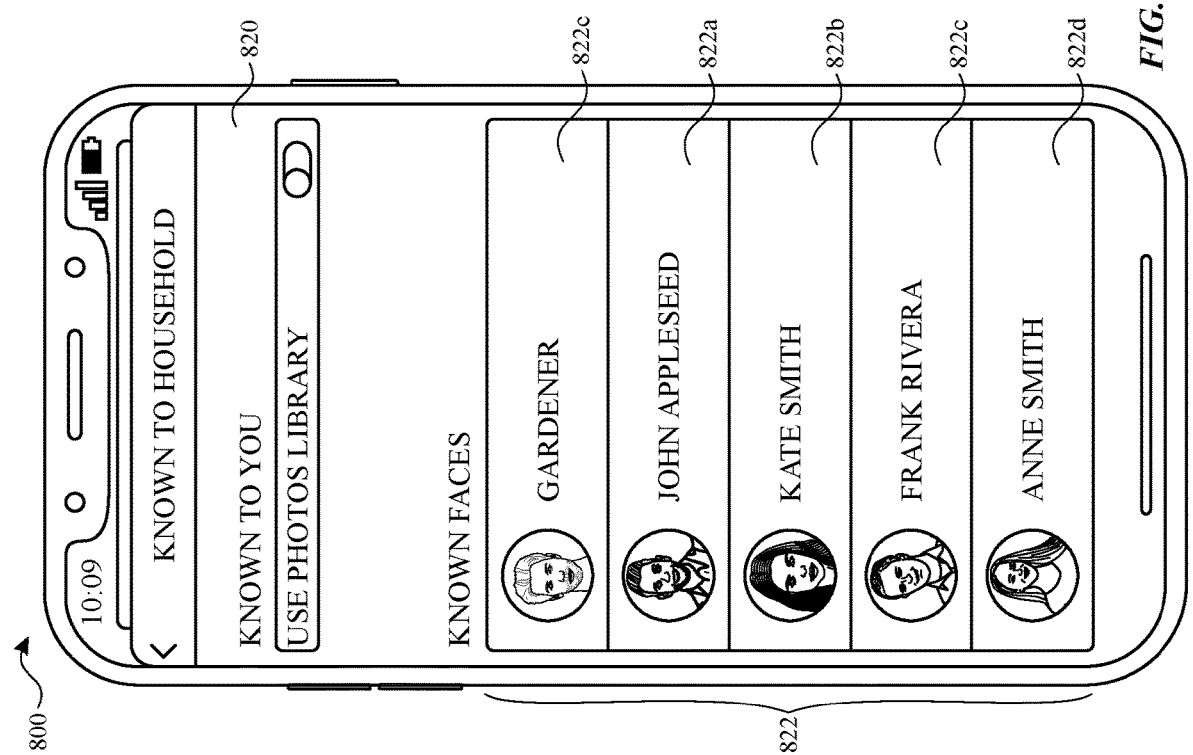

At FIG. 8K, electronic device 800 displays user interface 820 with updated known faces area 822 to include a user interface object associated with the previously unknown visitor (e.g., Gardener 822*e*). FIG. 8K shows that the previously unknown visitor (e.g., "GARDNER") is added to the recognition database of the home automation system when electronic device 800 receives identification information related to the visitor. As such, that individual is now known and future notifications received by electronic device 800 associated with an image of Gardener being captured by the cameras and/or doorbell accessories will include identification information (e.g., the name "GARDENER") to indicate to the user who is a member of the home that Gardener has been identified and is, for example, at the door as a known visitor. By entering the Gardener name, the user has added the Gardener name to the recognition database of the home automation system. Thus, the home automation system classifies that individual as a known visitor and users of the home automation system can receive respective notifications with the name Gardener when the home automation system recognizes that the individual has activated doorbell activity (e.g., rings the doorbell, is detected at a camera).

FIG. 8L shows user interface 860 displayed by electronic device 800 in response to tap gesture 850*j* on third visitor user interface object 818*b* of user interface 810, as shown in FIG. 8G. User interface 860 includes information and settings related to a known visitor included in an image captured by the cameras and/or doorbell accessories. As set forth above, the known visitor includes an individual that is matched via facial recognition analysis using image information captured by the cameras and/or doorbell accessories and image information having identification information of electronic device 800 (e.g., when image data authorization user interface object 824*a* is activated on electronic device 800 and the image information includes identification information for the individual), image information having identification information of an external device (e.g., when image data authorization user interface object 824*a* and share authorization user interface object 824*b* are activated on the external device and the image information includes identification information for the individual), and/or image information of the recognition database. At FIG. 8L, user interface 860 includes identification information area 862, known visitor settings area 864, and event details area 866.

Identification information area 862 includes a visual indication 862*a* of an individual associated with the known visitor. In some embodiments, the visual indication 862*a* includes an image captured by the cameras and/or doorbell accessories at a time the known visitor is detected, an avatar associated with an individual identified as the known visitor (e.g., facial recognition analysis matches image information captured by the cameras and/or doorbell accessories to image information of electronic device 800 or an external device), and/or an image of electronic device 800 or an external device associated with the known visitor (e.g., facial recognition analysis matches image information captured by the cameras and/or doorbell accessories to image information of electronic device 800 or the external device). Additionally, identification information area 862 includes identification information user interface object 862*b* that includes textual information associated with the known visitor (e.g., the name "KATE SMITH"). In some embodiments, electronic device 800 detects user input (e.g., a tap gesture) corresponding to selection of the identification information user interface object 864*b*. In response to detecting the user input, electronic device 800 displays a user interface object that enables the user of electronic device 600 to modify the textual information associated with the known visitor (e.g., update the recognition database to reflect a new name for the visitor). In some embodiments, in response to detecting the user input, electronic device forgoes displaying the user interface object, such that the user of electronic device 600 cannot modify the textual information associated with the known visitor.

At FIG. 8L, known visitor settings area 864 includes custom doorbell user interface object 864*a* and hide notifications user interface object 864*b*. Known visitor settings area 864 does not include remove person user interface object 844*c* because the known visitor associated with user interface 860 is included in the recognition database as a result of another user, who is a member of the home automation system, sharing image information (e.g., an photos library) of an electronic device (e.g., an external device) with the recognition database. In other words, known visitor associated with user interface 860 was added to the recognition database via a data library (e.g., photos library) of another user who is a member of the home. Known visitors that are added to the recognition database via a data library of a user who is a member of the home cannot be removed from the recognition database from user interface 860. In some embodiments, the user who is a member of the home that shared the image information associated with the known visitor via their data library can remove the known visitor by accessing user interface 830. All other members of the home cannot remove the known visitor from the recognition database (e.g., electronic device 800 does not display remove person user interface object 844c when the known visitor was added to the recognition database via a data library of a user who is a member of the home).

As set forth above, custom doorbell user interface object 864a of FIG. 8L is configured to, when selected, adjust audio output by a doorbell accessory of the home automation system when the home automation system identifies an individual, via facial recognition between image information captured by cameras and/or doorbell accessories and image information of the recognition database or electronic device 800, as the individual associated with the known visitor. Hide notifications user interface object 864b is configured to enable or disable, when selected, notifications displayed by electronic device 800 in response to identification of an individual, via facial recognition between image information captured by cameras and/or doorbell accessories and image information of the recognition database or electronic device 800, as the individual associated with the known visitor.

At FIG. 8L, visitor details area 866 includes first textual information 866a related to a time at which the known visitor was detected by an accessory (e.g., a camera and/or doorbell accessory) of the home automation system. Further, visitor details area 866 includes second textual information 866b indicating that the known visitor (e.g., "KATE SMITH") was added to the recognition database from a data library (e.g., "JOE'S LIBRARY") of a user who is a member of the home (e.g., Joe). Second textual information 866b may also include a date (e.g., Dec. 19, 2019) when the recognition database received identification information (e.g., a name) of the known visitor from the data library of the user who is a member of the home. As set forth above, a user who is a member of the home that adds known visitors to the recognition database by sharing image information from their data library of electronic device 800 receives notifications on electronic device 800 related to the known visitor (e.g., when a facial recognition analysis identifies an individual in image information captured by the cameras and/or doorbell accessory and image information in the data library as the individual associated with the known visitor). Further, other users who are members of the home may also receive such notifications (e.g., on external devices) when the user who is a member of the home enables their data library to be accessed by the other users who are members of the home.

Turning now to FIG. 8M, electronic device 800 displays notifications in response to receiving an indication from the home automation system that an individual is detected by the cameras and/or doorbell accessories (e.g., facial recognition analysis identifies an individual in image information captured by the cameras and/or doorbell accessories). At FIG. 8M, electronic device 800 displays user interface 870 including notification 872. In this example, notification 872 is displayed on electronic device 800 when electronic device 800 is in a locked mode (e.g., at least some functionality of electronic device 800 is disabled; electronic device 800 remains in the locked mode until detecting inputs (e.g., a passcode, a facial recognition analysis, a fingerprint analysis) that unlocks electronic device). In some embodiments, electronic device 800 also displays notification 872 when electronic device 800 is in an unlocked mode. Notification 872 may be positioned at a different location on a display (e.g., a display generation component) of electronic device 800 based on whether electronic device 800 is in the locked mode (e.g., toward a middle portion of screen below a time indicator) or the unlocked mode (e.g., toward a top portion of screen).

At FIG. 8M, user interface 870 includes time indicator 870a, date indicator 870b, and one or more optional user interface objects 870c associated with applications of electronic device 800 (e.g., flashlight application and camera application). Electronic device 800 displays notification 872 at a first time (e.g., an initial time) after receiving the indication from the home automation system (e.g., the cameras and/or doorbell accessories of the home automation system). Notification 872 includes application indicator 872a (e.g., an indication of an application, such as the home application, generating notification 872), accessory indicator 872b (e.g., "FRONT DOOR" camera and/or doorbell accessory), detection time indicator 872c (e.g., "NOW"), visual indicator 872d of an individual detected by an accessory of the home automation system (e.g., an image captured by the cameras and/or doorbell accessory), and identification indicator 872e related to a detected event (e.g., "SOMEONE IS RINGING THE DOORBELL").

Figure 8P:
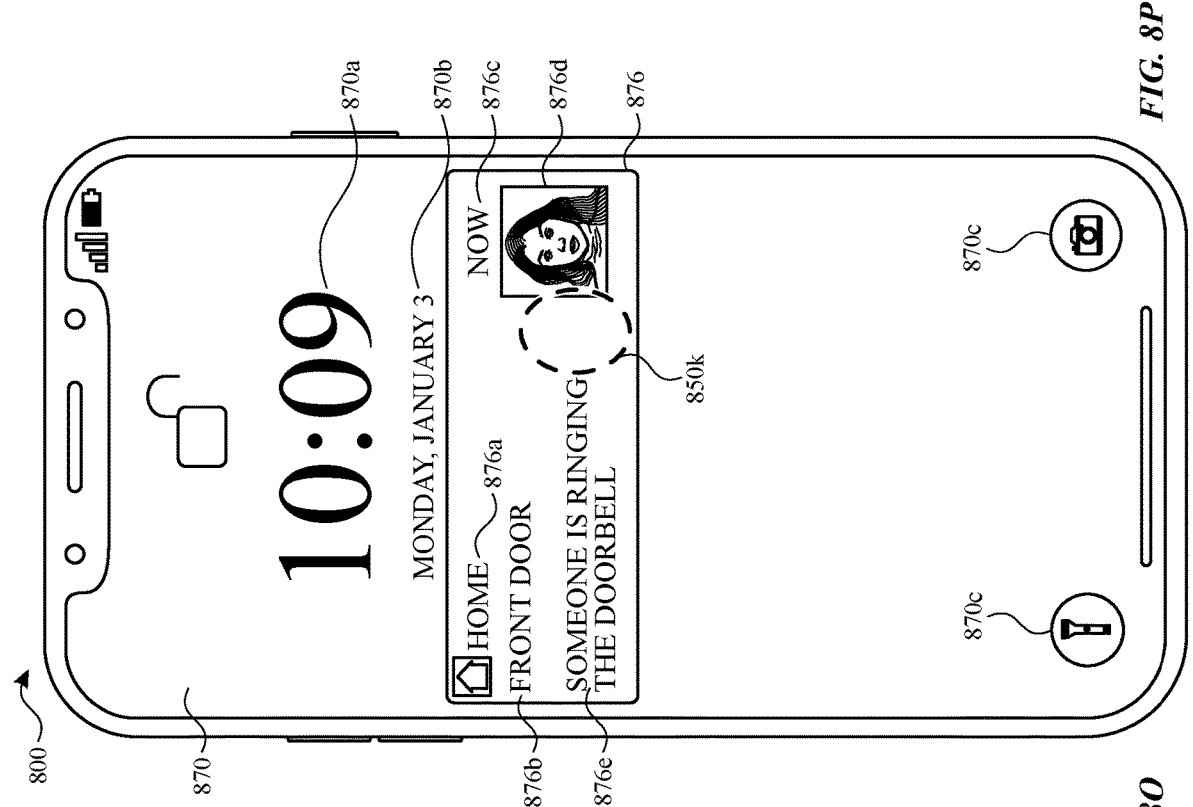
Figure 8O:
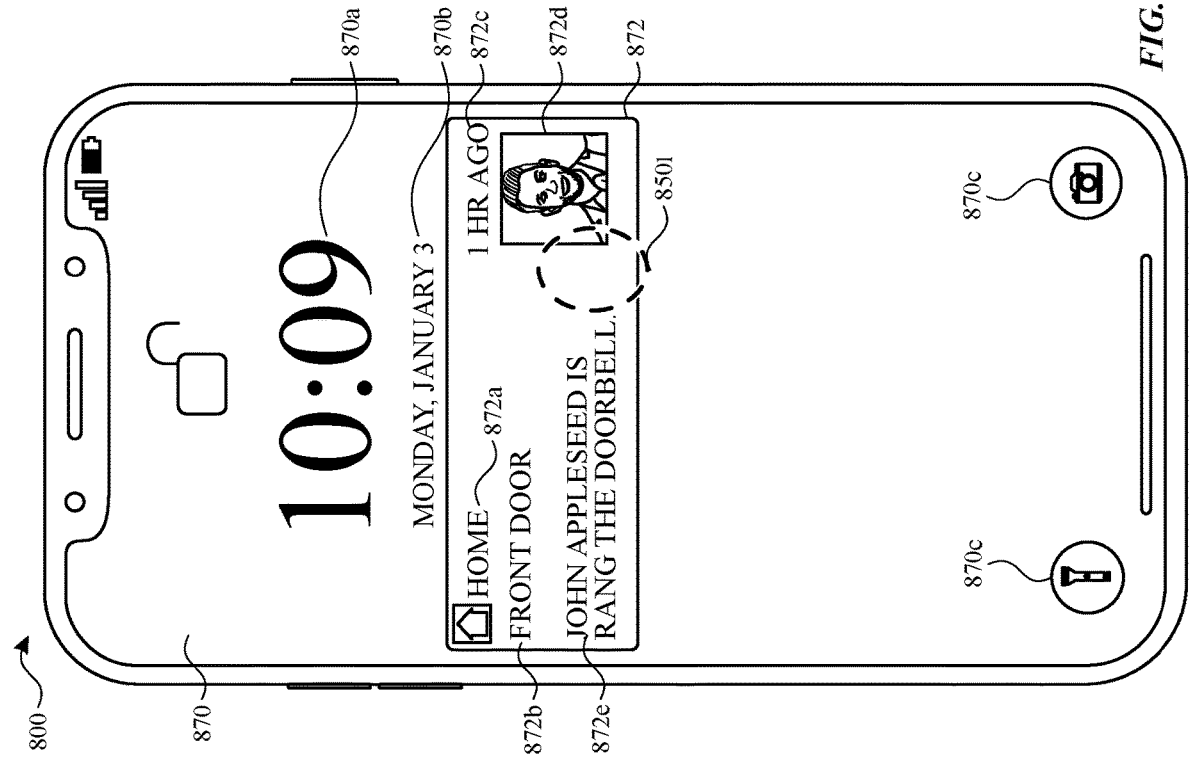

In some embodiments, an individual detected by the accessory (e.g., camera) of the home automation system is not identified immediately by the home automation system (e.g., an individual is partially within a field of view, or not within a full field of view, of the cameras and/or doorbell accessories as shown in visual indicator 872d). Accordingly, identification indicator 872e at the first time includes text that generally indicates that an individual has been detected by the accessory of the home automation system (without specifying a name of the individual). In some embodiments, the individual moves to a position within a field of view of the cameras and/or doorbell accessories (e.g., within a full field of view), such that a facial recognition analysis can be performed on image information captured by the cameras and/or doorbell accessories using image information of the recognition database and/or electronic device 800. When the facial recognition analysis matches the image information captured by the cameras and/or doorbell accessories with the image information of the recognition database and/or electronic device 800, electronic device 800 updates notification 872 as shown in FIG. 8N. In some embodiments, when the facial recognition analysis does not match the image information captured by the cameras and/or doorbell accessories and image information of the recognition database and/or electronic device 800, electronic device 800 maintains notification 872 (e.g., electronic device 800 does not update identification indicator 872e of notification 872), as shown in the example of FIGS. 8P and 8Q.

At FIG. 8N, identification indicator 872e is updated (e.g., displayed by electronic device at a second time after the first time) in response to the individual being within the field of view of the camera and facial recognition analysis matching image information captured by the cameras and/or doorbell accessories to image information of the recognition database and/or electronic device 800. Identification indicator 872e in FIG. 8N includes identification information (e.g., the name "JOHN APPLESEED" retrieved from the recognition database) related to an identity of the individual identified in an image captured by the cameras and/or doorbell accessories. Additionally, FIG. 8N shows visual indicator 872d with an updated image captured of an individual within the field of view of the cameras and/or doorbell accessories.

In some embodiments, electronic device 800 displays notification 872 without detecting further user input. As such, electronic device 800 continues to display notification 872, but updates detection time indicator 872c to reflect a passage of time from the first time when electronic device 800 received the indication that an accessory of the home automation system detected an individual. As shown in FIG. 8O, detection time indicator 872c is updated to show that detection of the individual by the accessory of the home automation system occurred at a time in the past (e.g., "1 HR AGO"). For example, when the individual is no longer detected in the field-of-view of the camera, the indication changes from "is ringing" to "rang" to indicate past tense. In some embodiments, electronic device 800 continues to update notification 872 (e.g., updates detection time indicator 872c based on a time difference between a current time and the first time) until electronic device 800 detects user input corresponding to notification 872 and/or detects user input that unlocks electronic device 800 (e.g., causes electronic device 800 to transition from the locked mode to the unlocked mode).

As set forth above, identification indicator 872e is not updated or modified when facial recognition analysis does not identify an individual based on a comparison between image information captured by the cameras and/or doorbell accessories and image information of the recognition database and/or electronic device 800. As shown in FIG. 8P, electronic device 800 displays notification 876 on user interface 870 for an unknown visitor or an unrecognized visitor. At FIG. 8P, user interface 870 includes time indicator 870a, date indicator 870b, and one or more optional user interface objects 870c associated with applications of electronic device 800 (e.g., flashlight application and camera application).

Notification 876 includes application indicator 876a (e.g., an indication of an application, such as the home application, generating notification 872), accessory indicator 876b (e.g., "FRONT DOOR" camera and/or doorbell accessory), detection time indicator 876c (e.g., "NOW"), visual indicator 876d of an individual detected by an accessory of the home automation system (e.g., an image captured by the cameras and/or doorbell accessory), and identification indicator 876e related to a detected event (e.g., "SOMEONE IS RINGING THE DOORBELL"). When facial recognition analysis does not identify an individual based on a comparison between the image information captured by the cameras and/or doorbell accessories and image information of recognition database and/or electronic device 800, identification indicator 876e includes text generally identifying that an individual was detected by the accessory (e.g., without identification information associated with the particular individual). In other words, identification indicator 876e does not include details (e.g., a name) related to a specific identity of the individual in an image captured by the cameras and/or doorbell accessories.

In some embodiments, facial recognition analysis is performed periodically (e.g., at predetermined intervals, such as every second, every 10 seconds, every 30 seconds) between image information captured by the cameras and/or doorbell accessories after an individual is detected by the home automation system. When a facial recognition analysis performed at any time identifies an individual within image information captured by the cameras and/or doorbell accessories, notification 876 may be updated, as set forth above with reference to FIGS. 8M and 8N. However, when facial recognition analysis continues to not be able to identify the individual within image information captured by the cameras and/or doorbell accessories, electronic device 800 maintains display of identification information 876e to indicate that the individual within image information captured by the cameras and/or doorbell accessories is an unknown visitor and/or an unrecognized visitor.

At FIG. 8P, electronic device 800 detects user input 850k (e.g., a long press gesture or long tap gesture) on notification 876. In response to detecting user input 850k, electronic device displays user interface 880, as shown in FIG. 8Q. At FIG. 8Q, user interface 880 includes application indicator 880a (e.g., an indication of an application, such as the home application that generated notification 876), accessory indicator 880b (e.g., "FRONT DOOR" camera and/or doorbell accessory), visual indicator 880c of an individual detected by an accessory of the home automation system, and identification indicator 880d related to a detected event (e.g., "SOMEONE IS RINGING THE DOORBELL"). Visual indicator 880c includes a live feed of a video stream captured by the cameras and/or doorbell accessories. Further, visual indicator 880c includes talk user interface object 882a, live feed indicator 882b (e.g., a visual indication that the video stream is "LIVE"), first accessory user interface object 882c, second accessory user interface object 882d, and third accessory user interface object 882e.

At FIG. 8Q, electronic device 800 detects a first user input (e.g., a tap gesture, a press and hold gesture) on talk user interface object 882a to enable a user who is a member of the home to communicate (e.g., speak) to the individual detected by the cameras and/or doorbell accessories. In some embodiments, the cameras and/or doorbell accessories include speakers and microphones for enabling audio to be transmitted between the cameras and/or doorbell accessories and electronic device 800. The user who is a member of the home may activate communication transmission by the first user input and deactivate communication transmission by a second user input (e.g., a tap gesture, a press and hold gesture). In some embodiments, the user who is a member of the home may receive audio transmissions in addition to the live feed of the video stream captured by the cameras and/or doorbell accessories regardless of whether talk user interface object 882a is activated. However, the individual detected by the cameras and/or doorbell accessories may only receive audio transmissions from electronic device (e.g., output by the cameras and/or doorbell accessories) upon activation of talk user interface object 882a.

First accessory user interface object 882c controls a lock accessory (e.g., a lock of a door). In response to detecting a tap gesture on first accessory user interface object 882c, electronic device 800 sends a signal to the lock accessory causing the lock accessory to change state (e.g., enter a locked state when the lock accessory is in an unlocked state, and vice versa). Second accessory user interface object 88d controls a first light accessory (e.g., an outdoor front porch light). In response to detecting a tap gesture on second accessory user interface object 882d, electronic device 800 sends a signal to the first light accessory causing the first light accessory to change state (e.g., turn on when the first light accessory is off, and vice versa). Third accessory user interface objects 882e controls a second light accessory (e.g., an indoor light proximate the front door). In response to detecting a tap gesture on third accessory user interface object 882e, electronic device 800 sends a signal to the second light accessory causing the second light accessory to change state (e.g., turn on when the second light accessory is off, and vice versa).

At FIG. 8Q, user interface 880 includes add identification information user interface object 884. As set forth above, notification 876 corresponds to an unknown visitor being detected in image information captured by the cameras and/or doorbell accessories (e.g., facial recognition analysis does not match the image information captured by the cameras and/or doorbell accessories to image information in the recognition database and/or facial recognition analysis does match the image information captured by the cameras and/or doorbell accessories to image information of a data library of electronic device 800 or a shared data library of an external device). In response to detecting a tap gesture on add identification information user interface object 884, electronic device 800 displays user interface 852, as shown in FIG. 8I. Thus, a user who is a member of the home may add unknown visitors to the recognition database by selecting add identification information user interface object 884 from a notification displayed by electronic device 800 (e.g., notification 876), thereby changing the individual to a known visitor.

Figure 8R:
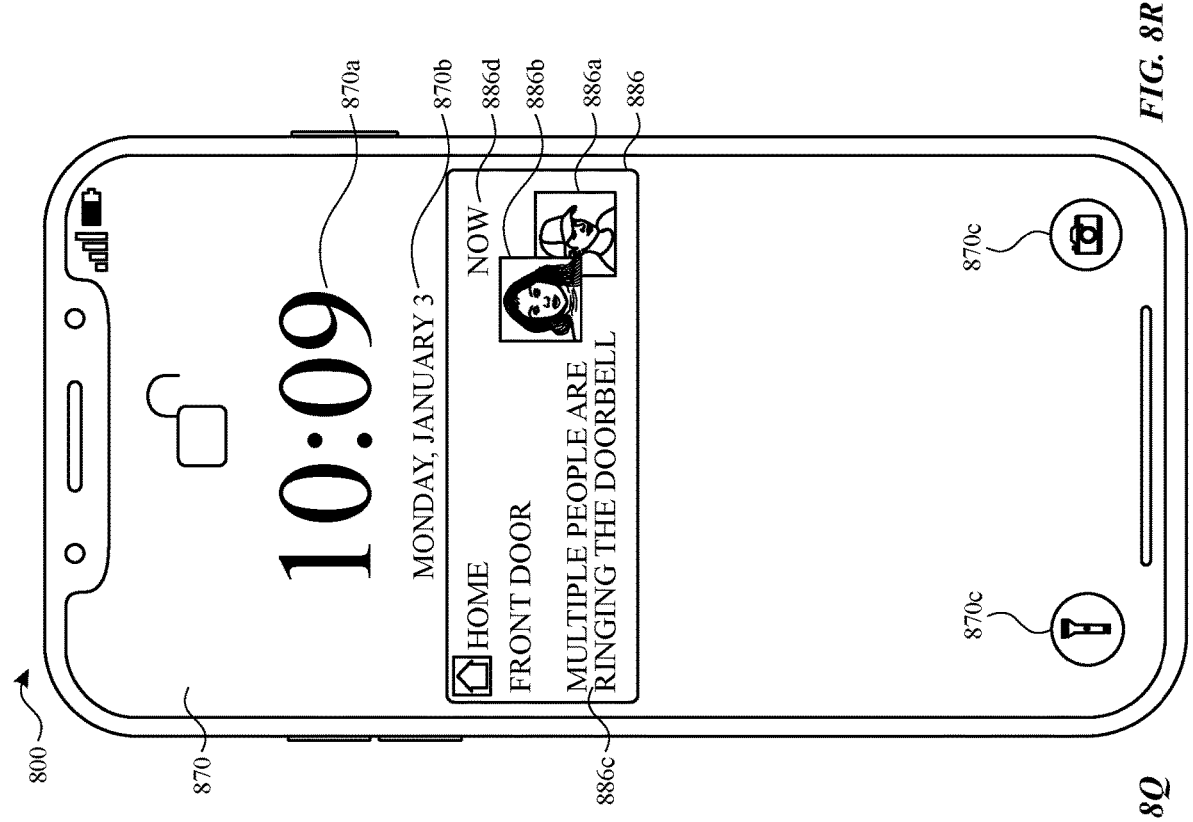
Figure 8Q:
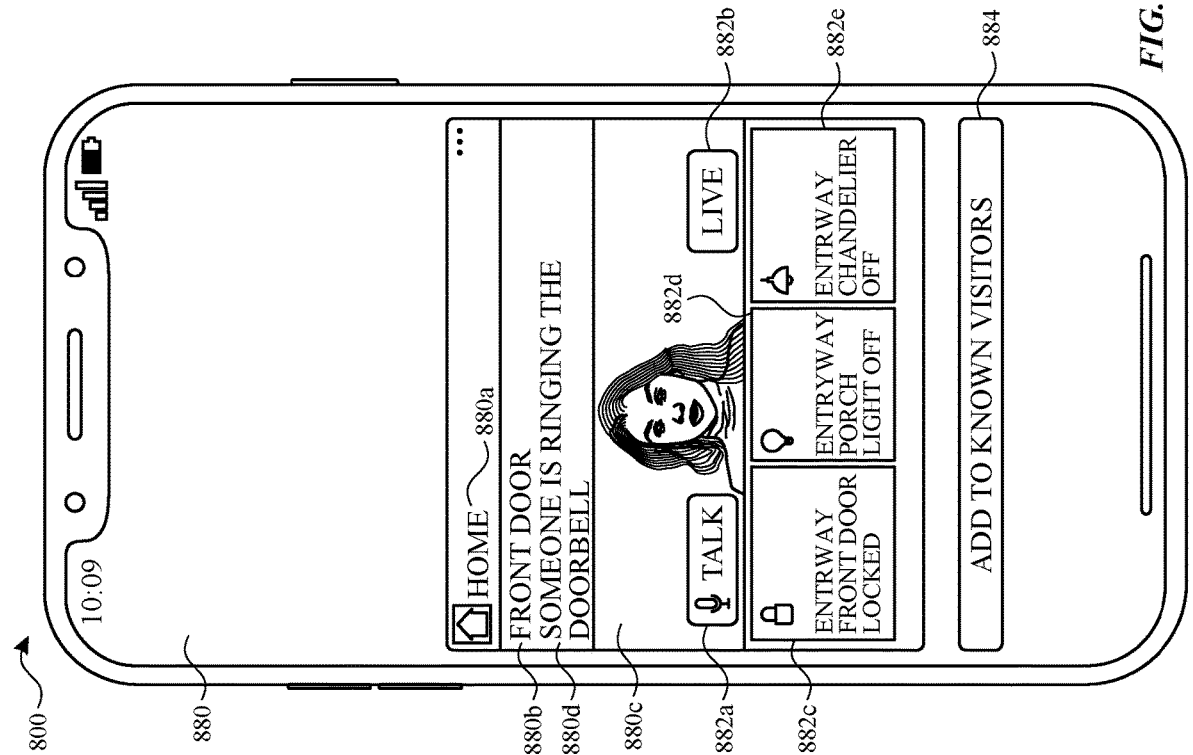

At FIG. 8R, facial recognition analysis detects multiple individuals within image information captured by the cameras and/or doorbell accessories. At FIG. 8R, electronic device 800 displays user interface 870 including notification 886. Notification 886 includes a plurality of visual indications (e.g., first visual indication 886a and second visual indication 886b) for each individual detected within image information captured by the cameras and/or doorbell accessories. Further, notification 886 includes identification information 886c including text indicating that multiple individuals were detected by the accessory of the home automation system (e.g., "MULTIPLE PEOPLE ARE RINGING THE DOORBELL"). Identification information 886c may be updated to include details related to the identities of each individual detected within the image information captured by the cameras and/or doorbell accessories, when available (e.g., when facial recognition analysis identifies one or more of the individuals within image information captured by the cameras and/or doorbell accessories). Further, notification 886 may be updated similar to notifications 872 and 876, as described above (e.g., detection time indicator 886d may be updated over time when electronic device 800 does not detect user input).

When multiple individuals are detected within image information captured by the cameras and/or doorbell accessories, user interface 810 includes separate user interface objects for each of the multiple individuals. At FIG. 8S, today's visitor area 816 of user interface 810 includes first visitor user interface object 816a (updated to reflect identification information received by electronic device 800 in FIGS. 8G-8K). Further, today's visitor area 816 is updated in FIG. 8S to include fourth visitor user interface object 816b, fifth visitor user interface object 816c, sixth visitor user interface object 816d, and seventh visitor user interface object 816e. As shown in FIG. 8S, each user interface object of today's visitor area 816 corresponds to a single individual (e.g., a known visitor or an unknown visitor) that was detected in image information captured by the cameras and/or doorbell accessory.

Fourth visitor user interface object 816b corresponds to an individual associated with the first visual indication 886a of notification 886 and fifth visitor user interface object 816c corresponds to an individual associated with the second visual indication 886b of notification 886. As shown in FIG. 8S, both individuals corresponding to fourth visitor user interface object 816b and fifth visitor user interface object 816c, respectively, are unknown visitors (e.g., individuals identified via facial recognition analysis between image information captured by the cameras and/or doorbell accessories and image information of a data library of electronic device 800 or an external device that does not include identification information associated with the individuals). As such, a user who is a member of the home can add the unknown visitors to the recognition database, as set forth above with respect to the description of FIGS. 8G-8K.

Sixth visitor user interface object 816d corresponds to an individual identified as a known visitor (e.g., "JOHN APPLESEED) as set forth above with respect to the description of FIGS. 8M-8O. Additionally, seventh visitor user interface object 816e corresponds to an individual identified as an unknown visitor as set forth above with respect to the description of FIGS. 8P-8Q.

In some embodiments, user interface objects of today's visitor area 816 are displayed in chronological order. For example, user interface objects corresponding to individuals detected most recently by the cameras and/or doorbell accessories are listed toward the top of today's visitor area 816. User interface objects corresponding to individuals detected at earlier times within the first time period are displayed toward the bottom of today's visitor area 816. In some embodiments, user interface 810 displays all user interface objects corresponding to individuals that were detected within the first time period in today's visitor area 816 before displaying prior visitor area 818. In response to electronic device 800 detecting user input (e.g., a scroll gesture) on user interface 810, user interface 810 may be translated (e.g., vertically translated) to show prior visitor area 818 and corresponding user interface objects within prior visitor area 818 (e.g., user interface objects corresponding to individuals that were detected within the second time period, such as second visitor user interface object 818a and third visitor user interface object 818b).

Turning now to FIG. 8T, electronic device 800 may display notification 888 in response to receiving an indication from the home automation system that an object (e.g., a package) is detected by an accessory of the home automation system (e.g., the cameras and/or doorbell accessories). Notification 888 includes application indicator 888a (e.g., an indication of an application, such as the home application, generating notification 888), accessory indicator 888b (e.g., "FRONT DOOR" camera and/or doorbell accessory), detection time indicator 888c (e.g., "NOW"), visual indicator 888d of an object detected by an accessory of the home automation system (e.g., an image captured by the cameras and/or doorbell accessory, a graphic generally depicting a package), and identification indicator 888e related to a detected event (e.g., "A PACKAGE WAS DELIVERED").

In some embodiments, notification 888 is displayed by electronic device 800 subsequent to a notification (e.g., notifications 872, 876, 886) indicating that an accessory of the home automation system (e.g., the cameras and/or doorbell accessories) detected an individual. In some embodiments, notification 888 is displayed simultaneously with a notification (e.g., notifications 872, 876, 886) indicating that an accessory of the home automation system (e.g., the cameras and/or doorbell accessories) detected an individual.

In some embodiments, electronic device 800 is configured to display images and/or videos of events detected by the accessories of the home automation system (e.g., the cameras and/or doorbell accessories). For example, electronic device 800 displays previously captured images and/or videos of the events detected by the accessories of the home automation system. To display the previously captured images and/or videos, in some embodiments, electronic device 800 detects a user input on notification 876 after notification has been displayed on electronic device 800 for a predetermined period of time (e.g., 10 minutes, 30 minutes, 1 hour). For instance, electronic device 800 detects tap gesture 850*l* on notification 876 illustrated in FIG. 8O. In response to detecting tap gesture 850*l*, electronic device displays user interface 890, as shown in FIG. 8U.

Figure 8U:
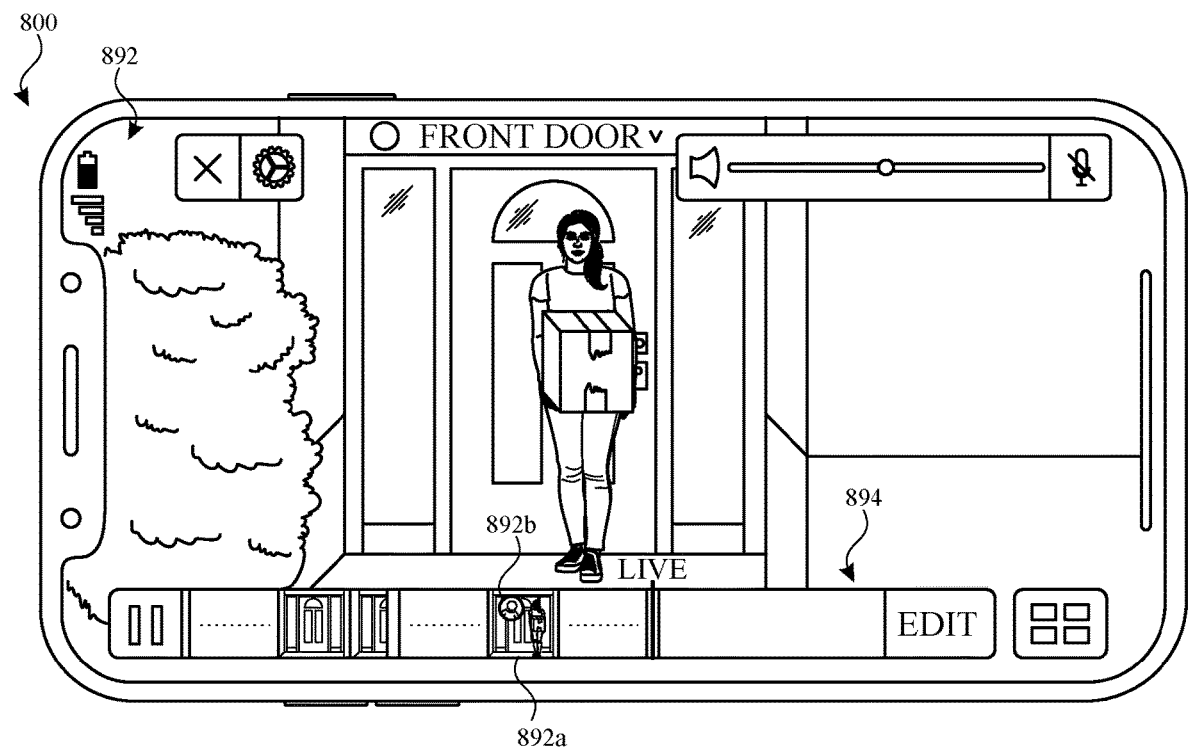

FIG. 8U illustrates a video feed 892 captured by the cameras and/or doorbell accessories at a time when an individual (e.g., "JEN APPLESEED") was detected by the cameras and/or doorbell accessories. In some embodiments, recording is triggered when motion of a person is detected in accordance with a motion detection condition setting (e.g., record when motion of a person is detected). In response to detecting the motion, video feed from the cameras and/or doorbell accessories is recorded (e.g., sent to a server remote to the cameras and/or doorbell accessories or device 800). In some embodiments, video data is recorded for a predetermined amount of time (e.g., 10 seconds from the time motion is detected or from the time motion is detected until 10 seconds after motion ceases to be detected).

Figure 8V:
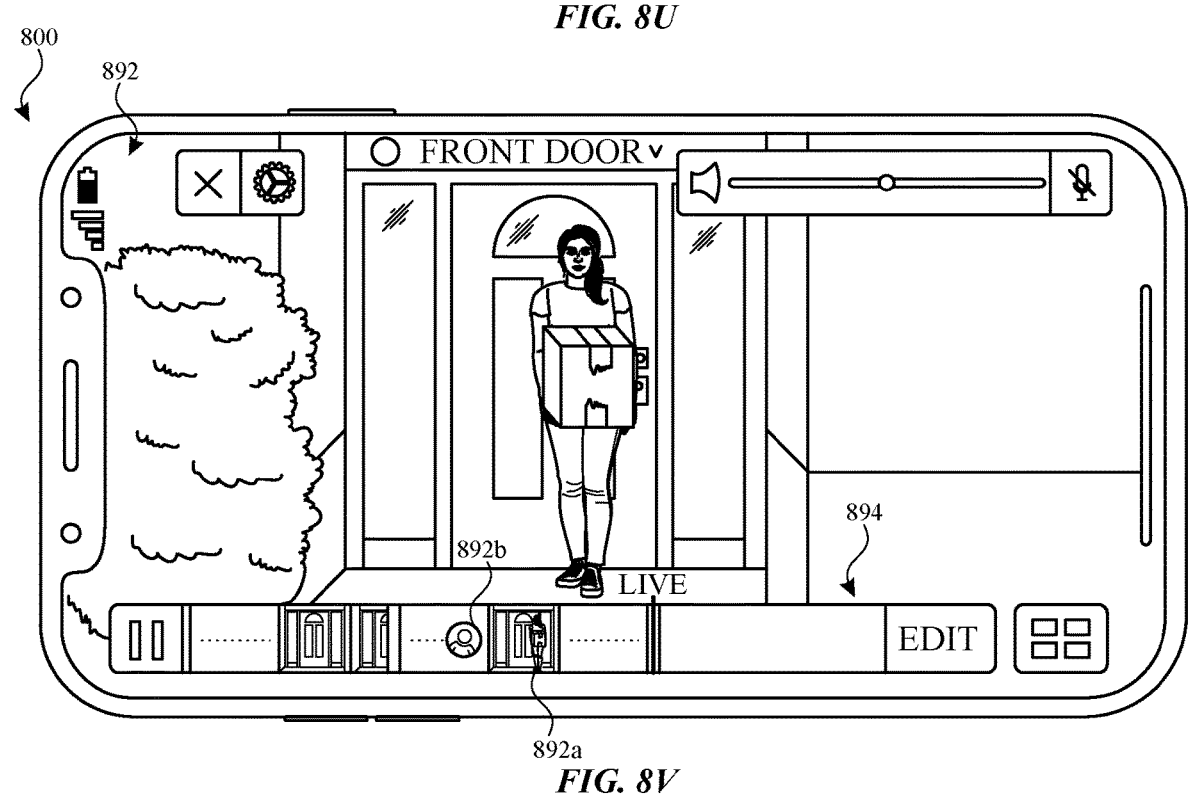

In FIG. 8U, device 800 displays a clip representation 892*a* of the video feed 892 in scrubber bar 894 at a position representative of the time the clip was recorded. Device 800 also displays corresponding indicator 892*b* with clip representation 892*a*. In some embodiments, corresponding indicator 892*b* is a frame (or part thereof) of the video feed 892 captured by the cameras and/or doorbell accessories. In some embodiments, corresponding indicator 892*b* can be a visual representation associated with an individual detected in image information captured by the cameras and/or doorbell accessories (e.g., an image captured by the cameras and/or doorbell accessories, an image from the recognition database, an image from electronic device 800 or an external device, an avatar representing the detected individual (e.g., an avatar of a known visitor), or an avatar representing an unknown or unrecognized visitor). In some embodiments, device 800 displays corresponding indicator 892*b* overlaid on top of clip representation 892*a* in scrubber bar 894. In some embodiments, corresponding indicator 892*b* is smaller than the size of clip representation 892*a* and overlaps with a portion of clip representation 892*a* (and not another portion of clip representation 892*a*) when displayed in scrubber bar 894. In some embodiments, corresponding indicator 892*b* is displayed adjacent to clip representation 892*a*, as illustrated in FIG. 8V.

Turning now to FIG. 8W, electronic device 896 (e.g., a wearable electronic device, a portable electronic device) is shown displaying user interface 898, similar to user interface 880 of FIG. 8Q. Accordingly, electronic device 896 is connected to the home automation system (e.g., via electronic device 800) and configured to display notifications generated by home automation system. While FIG. 8W illustrates an example of user interface 898 (e.g., corresponding to user interface 880), each of the embodiments described above with respect to electronic device 800 of FIGS. 8A-8V may be applicable to electronic device 896 of FIG. 8W.

FIG. 9 is a flow diagram illustrating a method for managing visitors using an electronic device in accordance with some embodiments. Method 900 is performed at a computer system (e.g., 100, 300, 500, 800) that is in communication with (e.g., wired communication, wireless communication) a display generation component. Some operations in method 900 are, optionally, combined, the orders of some operations are, optionally, changed, and some operations are, optionally, omitted.

As described below, method 900 provides an intuitive way for managing visitors. The method reduces the cognitive burden on a user for managing visitors, thereby creating a more efficient human-machine interface. For battery-operated computing devices, enabling a user to manage visitors faster and more efficiently conserves power and increases the time between battery charges.

Computer system (e.g., 800, an electronic device) is in communication with (e.g., wired communication, wireless communication) a display generation component. The computer system displays (902), via the display generation component, a plurality of affordances (e.g., 816*a*, 816*b*, 816*c*, 816*d*, 816*e*, 818*a*, 818*b*) corresponding to visitor images captured by a camera (e.g., a doorbell camera; a doorbell system having a camera, a monitoring system having a camera). The camera is associated with the computer system (e.g., communicatively coupled to the computer system or an account of the computer system). In some embodiments, the computer system is also in communication with a camera (e.g., a doorbell camera, a camera system that includes a camera sensor (and an optional doorbell switch), a camera system mounted at an entrance to a physical location, such as an entrance to a home).

The plurality of affordances (e.g., 816*a*, 816*b*, 816*c*, 816*d*, 816*e*, 818*a*, 818*b*) includes (e.g., displays concurrently) a first affordance (904) (e.g., 816*d*, 816*e*, 818*a*, 818*b*) (e.g., an icon or button having text related to a visitor's name, image, other identifying information, and/or information related to how the visitor is known (e.g., the visitor was tagged by a household member, a name of the household member that tagged the visitor, a photo library used to tag the visitor, and/or a name of a household member whose photo library was used to tag the visitor)) corresponding to a first visitor that is a known visitor (e.g., a visitor that has been previously stored in a recognition database is a known visitor; a visitor identified as corresponding to a particular entity that has stored contact information, such as a name, address, or phone number in the recognition database is a known visitor). In some examples, the first visitor is determined to be a known visitor via a facial recognition analysis (e.g., comparison) between an image captured by the camera and image information (e.g., a video, an image, facial recognition information) stored in the recognition database. In some examples, a visitor (e.g., the first visitor) is determined to be a known visitor via a facial recognition analysis between the image captured by the camera at the time of detection and image information (e.g., a video, an image, facial recognition information) stored in a photo library of the computer system (or in the cloud)).

The plurality of affordances (e.g., 816*a*, 816*b*, 816*c*, 816*d*, 816*e*, 818*a*, 818*b*) includes (e.g., displays concurrently) a second affordance (906) (e.g., 816*a*, 816*b*, 816*c*) (e.g., an icon or button having text such as "unknown visitor" and/or "add name"), different from the first affordance, corresponding to a second visitor that is an unknown visitor (e.g., a visitor that is determined via a facial recognition analysis between the image captured by the camera and image information (e.g., a video, an image, facial recognition information) stored in a photo library of the computer system (or in the cloud) but is not stored in the recognition database is an unknown visitor).

While displaying the plurality of affordances (e.g., 816a, 816b, 816c, 816d, 816e, 818a, 818b) corresponding to visitor images captured by the doorbell camera, the computer system (e.g., 800) receives (908) a first user input (e.g., 850g, 850j, a tap gesture).

In response to receiving the first user input (910), in accordance with a determination that the first user input corresponds to selection of the first affordance (e.g., 816d, 816e, 818a, 818b), the computer system (e.g., 800) displays (912) a first user interface (e.g., 860, a known visitor user interface, without displaying the second user interface) including information (e.g., 862) corresponding to the first visitor (e.g., an image (e.g., 862a) of the first visitor from a photo library or previously captured from the doorbell camera, a name of the first visitor (e.g., 862b), a phone number, email address, or other contact information associated with the first visitor, an affordance (e.g., 864b, a toggle) for hiding notifications related to the first visitor, and/or an affordance (e.g., 844c) that enables the first visitor to be removed as a known visitor (e.g., removed from the recognition database)).

In response to receiving the first user input (910), in accordance with a determination that the first user input corresponds to selection of the second affordance (e.g., 816a, 816b, 816c), the computer system (e.g., 800) initiates (914) a process to classify the second visitor as a known visitor, including displaying a second user interface (e.g., 840, an unknown visitor user interface, without displaying the first user interface). In some examples, the second user interface (e.g., 840) includes a third affordance (e.g., 842b, a text input affordance that enables a name or other information to be associated with the second visitor in the recognition database, an affordance that enables a user to associate image information stored in a photo library with the second visitor in the recognition database, and/or an affordance (e.g., button) that adds and/or stores the second visitor in the recognition database) that, when selected, classifies the second visitor as a known visitor (e.g., adds (or starts a process to add) the second visitor's image captured by the doorbell camera and/or image information stored in a photo library to the recognition database).

Subsequent to displaying the second user interface (e.g., 840), the computer system (e.g., 800) receives (916) one or more inputs (e.g., 852b) corresponding to a name (e.g., 854a).

In response to receiving the one or more inputs (e.g., 852b) corresponding to the name (e.g., 854a), the computer system (e.g., 800) classifies (918) the second visitor as a known visitor.

Displaying affordances for multiple visitors provides the user with feedback about which visitors the computer system has received information about as having been in a field-of-view of the camera. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the plurality of affordances (e.g., 816a, 816b, 816c, 816d, 816e, 818a, 818b) corresponding to visitor images (e.g., 872d, 876d, 886a, 886b) captured by the camera includes: in accordance with a determination that a visitor image of the visitor images captured by the camera is associated with a third visitor that is an unrecognized visitor (e.g., a visitor that has not been previously stored in the recognition database or recognized via a facial recognition analysis between the visitor image and image information (e.g., a video, an image, facial recognition information) stored in a photo library of the computer system (or in the cloud) is an unrecognized visitor), forgoing display of an affordance corresponding to the third visitor. In some embodiments, the computer system does not display an affordance associated with unrecognized visitors (e.g., visitors not stored in the recognition database and/or recognized from a photo library) because unrecognized visitors are not likely to be repeat visitors at the home and/or not likely to be requesting entry to the home (e.g., delivery persons, sales persons, etc.). In some embodiments, in accordance with a determination that the visitor image of the visitor images captured by the camera is associated with a visitor that is a recognized visitor (e.g., a known visitor or an unknown visitor), displaying an affordance corresponding to the visitor.

Forgoing displaying a visual object corresponding to an unrecognized visitor (e.g., a visitor that is not likely to be relevant to the user of the computer system) saves processing power by avoiding the processing required to display the visual object.

In some embodiments, displaying, via the display generation component, the plurality of affordances (e.g., 816a, 816b, 816c, 816d, 816e, 818a, 818b) includes ordering the affordances of the plurality of affordances based on recency of the respective visitors.

In some embodiments, the computer system displays a first set of affordances (e.g., the first affordance and the second affordance) corresponding to visitors identified in visitor images captured by the camera during a first time period (e.g., a time period that occurred most recently from the current time). The computer system forgoes display of a second set of affordances (e.g., affordances that correspond to visitors detected by the camera before the first time period) corresponding to visitors identified in visitor images captured by the camera during a second time period, wherein the second time period is before the first time period (e.g., the first time period and the second time period do not overlap) (e.g., the displayed affordances correspond to the visitors that most recently came to the door (e.g., rang the doorbell or were captured by the doorbell camera)). In some embodiments, the plurality of affordances include a predefined number of affordances based on a size of the screen (e.g., only a certain number of affordances may be displayed at one time). Thus, the computer system displays only the affordances that correspond to the most recent visitors. In some embodiments, the user of the computer system may perform a gesture (e.g., a swipe gesture) to display the second set of affordances.

Displaying affordance for the most recently recognized visitors provides the user with feedback about which visitors have recently been recognized by the system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, via the display generation component, the plurality of affordances (e.g., 816a, 816b, 816c, 816d, 816e, 818a, 818b) corresponding to visitor images (e.g., 872d, 876d, 886a, 886b) captured by the camera includes displaying (e.g., concurrently): a first set of affordances (e.g., 816a, 816b, 816c, 816d, 816e) (e.g., the first set of affordances corresponds to visitor images captured by the camera during the first period of time; the first set of affordances may include known visitors and/or unknown visitors) of the plurality of affordances (e.g., 816a, 816b, 816c, 816d, 816e, 818a, 818b) in a first area (e.g., 816) associated with a first period of time (e.g., the current day); and a second set of affordances (e.g., 818a, 818b) (e.g., the second set of affordances corresponds to visitor images captured by the camera during the second period of time; the second set of affordances may include known visitors and/or unknown visitors) of the plurality of affordances (e.g., 816a, 816b, 816c, 816d, 816e, 818a, 818b) in a second area (e.g., 818) associated with a second period of time (e.g., the current week excluding the current day), the second area being different from the first area (e.g., not overlapping the first area) (e.g., the second area is visually distinguished from the first area in a way other than location), and the second period of time being different from the first period of time (e.g., not overlapping the first period of time).

Displaying different sets of visual elements in different areas that correspond to different time periods provides the user feedback about the timing at which the visitors corresponding to the affordances visited. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the plurality of affordances (e.g., 816a, 816b, 816c, 816d, 816e, 818a, 818b), receiving a second user input (e.g., 850b) (e.g., a tap gesture on a known to household affordance). In response to receiving the second user input (e.g., 850b), the computer system (e.g., 800) displays a first user interface (e.g., 820) (e.g., a known to household user interface), wherein the first user interface (e.g., 820) includes a plurality of visual indications (e.g., 822a, 822b, 822c, 822d) (e.g., affordances, images, names, etc.) corresponding to visitors (e.g., all visitors, regardless of whether they have been in the field of view of the camera) that are known visitors (e.g., people that have been stored in the recognition database (e.g., Known to Household database)). In some embodiments, the plurality of visitors that are known visitors includes all visitors that are known visitors, independent of whether they have been detected at the camera (or any camera) of the system. In some embodiments, the first user interface also includes (e.g., all) unknown visitors.

Displaying a user interface that includes visual indications of all known visitors provides the user with feedback about what individuals are recognizable by the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 800) receives a third user input (e.g., 850c) (e.g., one or more tap gestures that navigate to a photo library of the computer system). In response to receiving the third user input (e.g., 850c), the computer system (e.g., 800) displays a second user interface (e.g., 824) associated with a data library (e.g., a photo library) of the computer system, wherein the second user interface (e.g., 824) includes an option (e.g., 824b) to enable use (or sharing) of image information (e.g., a video, an image, facial recognition information) of the data library of the computer system by a recognition database.

In some embodiments, the computer system receives users input to access an additional user interface (e.g., a user interface of the photo library) including a plurality of visual indications (e.g., images, photos) corresponding to individuals identified in a data library (e.g., photo library) of the computer system (e.g., tiles of images associated with individuals identified in the photo library (e.g., facial recognition analysis determines that the photo library includes one or more photos associated with a particular individual)). While displaying the additional user interface, the computer system receives user input selecting a visual indication of the plurality of visual indications (e.g., a tap gesture on an image of a specific individual). In response to receiving the fourth user input, the computer system displays a user interface including a classification affordance (e.g., an "Add Name" affordance) configured to, in response to detecting user input corresponding to the classification affordance, initiate a process to classify an individual associated with the visual indication as a known visitor (e.g., adding a name to the person in the photo library may automatically add the person to the recognition database; selecting the classification affordance may bring up another user interface for typing in the person's name which may include an option (e.g., affordance) for adding the user to the recognition database (e.g., Known to Household database)).

In some embodiments, the computer system (e.g., 800) displays, via the display generation component, a fourth user interface (e.g., 824) (e.g., a menu or settings user interface) including an authorization affordance (e.g., 824a) (e.g., a toggle) configured to, in response to detecting user input corresponding to the authorization affordance (e.g., 824a), disable (or enable) use (or sharing) of image information (e.g., a video, an image, facial recognition information) of the data library of the computer system by the recognition database (e.g., the authorization affordance enables the home application or the camera to access the photo library of the computer system when activated or selected and prevents the home app or the camera from accessing the photo library of the computer system when deactivated or not selected).

Providing the user with an option to disable use of image information by a recognition database enables the user limit how information is accessed, thereby providing additional data security at the computer system.

In some embodiments, a visitor is a known visitor based on a corresponding visitor image of the visitor images (e.g., 872d, 876d, 886a, 886b) captured by the camera matching to identification data (e.g., 833, 854a, 862b) (e.g., image information (e.g., a video, an image, facial recognition information), name information (e.g., a name)) of a recognition database (e.g., image information (e.g., a video, an image, facial recognition information) that relates to visitors classified as known visitors by a user of the computer system and/or a user of an external device that is associated with the camera/doorbell), wherein the identification data (e.g., 833, 854a, 862b) of the recognition database was provided by a data library (e.g., a photo library) of an external device (e.g., a second computer system (different from the computer system) configured for a user account other than the user account configured for the computer system). In some embodiments, matching the visitor image to the identification data includes performing facial recognition to match a face of the visitor image to a face of the identification data.

In some embodiments, a visitor image of the visitor images captured by the camera is compared to identification data (e.g., image information (e.g., a video, an image, facial recognition information) of a recognition database (e.g., image information (e.g., a video, an image, facial recognition information) that relates to visitors classified as known visitors by a user of the computer system and/or a user of an external device that is associated with the camera/doorbell) to determine whether the visitor image corresponds to a known visitor (e.g., facial recognition analysis is performed between the visitor image and the identification data of the recognition database to determine whether the visitor image corresponds to a known visitor).

In some embodiments, the computer system is configured to provide identification data (e.g., 833, 854a, 862b) from the computer system to the recognition database (e.g., the recognition database may be accessible via a network and store image information that is received from the computer system and/or an external device). In some embodiments, the external device provides the image information to the recognition database via (or retrieved from) a photo library of the external device. In some embodiments, the computer system provides image information (e.g., photos with corresponding names) to the recognition database via (or retrieved from) a photo library of the computer system. The computer system and the external device are both associated with, or connected to, an account of the camera/doorbell (e.g., via the home application).

In some embodiments, the information (e.g., 862) corresponding to the first visitor includes information (e.g., 846b, 866b) corresponding to a user (e.g., a user of the computer system, a user of an external device) that identified the first visitor as a known visitor (e.g., the information corresponding to the first visitor includes information related to a person of the household (e.g., text of a name/initials of the person, an image of the person, etc.) that added the first visitor to the recognition database and/or a technique that the person of the household used to add the first visitor to the recognition database (e.g., tagged the first visitor in their photo library, added a visitor image captured by the camera to the doorbell and added information related to the first visitor). In some embodiments, identifying a visitor as a known visitor includes providing a name of the visitor.

Displaying information specifying which user identified a visitor as a known visitor provides the user with feedback about the reliability of the identification and feedback about how the visitor became a known visitor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the method further comprises: receiving a fifth user input (e.g., one or more tap gestures that navigate to a menu associated with the camera (e.g., doorbell camera)); in response to receiving the fifth user input, displaying a fifth user interface (e.g., a menu user interface of the camera (e.g., doorbell camera)) including a fourth affordance (e.g., a toggle) configured to, in response to detecting user input corresponding to the fourth affordance, disable a facial recognition function of the camera (e.g., selection of the toggle turns off facial recognition for the camera, such that visitor images captured by the doorbell are not analyzed to characterize a visitor as a known visitor or an unknown visitor).

In some embodiments, the computer system (e.g., 800) receives an indication that a visitor is detected in a field-of-view of the camera (e.g., the computer system receives a signal from the camera (or a doorbell associated with the camera) that a visitor is at a door where the camera is located). In response to receiving the indication and in accordance with a determination that the visitor is a known visitor, the computer system (e.g., 800) displays, via the display generation component, a notification (e.g., 872) (e.g., a notification while the computer system is in a locked state or a notification while the computer system is in an unlocked state) including a visitor image (e.g., 872d) of the visitor captured by the camera and a visual indication (e.g., 872e) identifying the visitor as a known visitor (e.g., specifying the name of the individual detected based on facial recognition). In response to receiving the indication and in accordance with a determination that the visitor is a unknown visitor, the computer system (e.g., 800) displays, via the display generation component, a notification (e.g., 876, 886) (e.g., a notification while the computer system is in a locked state or a notification while the computer system is in an unlocked state) including the visitor image (e.g., 876d, 886a, 886b) of the visitor captured by the camera and a visual indication (e.g., 876e, 886c) identifying the visitor as an unknown visitor (e.g., specifying that a "person" is detected without providing a name for the individual).

In some embodiments, the visual indication includes text related to a known visitor's name, text indicating that the visitor is a known visitor, text indicating the visitor is an unknown visitor, text related to a prediction of a name of an unknown visitor (e.g., based on facial recognition analysis between the visitor image and a photo library of the computer system or an external device).

In some embodiments, the computer system (e.g., 800) receives an indication that a visitor is detected in a field-of-view of the camera (e.g., the computer system receives a signal from the camera (or a doorbell associated with the camera) that a visitor is at a door where the camera is located). In response to receiving the indication: the computer system (e.g., 800) displays, via the display generation component, a notification (e.g., 872) (e.g., a first notification while the computer system is in a locked state or a first notification while the computer system is in an unlocked state). Subsequent to displaying the notification (e.g., 872), the computer system (e.g., 800) receives (e.g., from the camera) additional information about the visitor (e.g., name information, second visitor information). In response to receiving the additional information: the computer system (e.g., 800) updates display, via the display generation component, of the notification (e.g., 872) (e.g., revising the first notification) based on the additional information (e.g., 872e) (e.g., at a second time (e.g., a time after the first time (e.g., one minute, ten minutes, one hour)) including a second visitor image (e.g., the same image as the first visitor image or a second visitor image, different from the first visitor image, captured after the visitor has approached the door or rang the doorbell) of the visitor captured by the camera and a visual indication based on an elapsed time corresponding to the first time (e.g., text indicating an amount of time that has elapsed since the first notification was received, text indicating an amount of time that has elapsed since the visitor approached the door or rang the doorbell)). In some embodiments, the first notification is displayed at a first time (e.g., a time at which an initial notification is displayed indicating that the visitor is at a door at which the camera is located) and includes a first visitor image (e.g., an initial image of the visitor captured by the camera at the time the visitor approaches the door or rings the doorbell) of the visitor captured by the camera.

In some embodiments, the notification (e.g., 872 of FIG. 8M) (e.g., at the first time) includes a first visual indication (e.g., 872d of FIG. 8M) of the visitor (e.g., a generic visual indication (e.g., text) that a visitor or person is at a door at which the camera is located without specifying a name of the visitor) (e.g., based on detecting, but not recognizing, a face of the visitor) and the updated notification (e.g., 872 of FIG. 8N) (e.g., at the second time) includes a second visual indication (e.g., 872d of FIG. 8N) of the visitor (e.g., a name or other identifying information corresponding to the visitor) (e.g., based on recognizing the visitor as a known visitor using facial recognition) that is different from the first visual indication (e.g., 872d of FIG. 8M) of the visitor.

In some embodiments, the notification (e.g., 872, 876, 886) includes: in accordance with a determination that the field-of-view of the camera includes a single visitor (e.g., a single person is approaching a door and/or ringing a doorbell at which the camera is positioned), a third visual indication (e.g., 872e, 876e) (e.g., the first visual indication if the visitor is unknown, the second visual indication if the visitor is known, that a single individual is in front of the camera (e.g., text that someone is at and/or is knocking on the door, text including a name of the visitor that is at the door, is knocking on the door, has rang the doorbell)); and in accordance with a determination that the field-of-view of the camera includes a plurality of visitors (e.g., a group of people is approaching the door and/or ringing the doorbell at which the camera is positioned), a fourth visual indication (e.g., 886e) that indicates a plurality of individuals are in the field-of-view of the camera (e.g., text that multiple people are at the door, are knocking on the door, have rang the doorbell).

Displaying an indication of the number of people in a field-of-view of the camera provides the user with feedback about how many people the system has detected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 800) receives an indication that a package (e.g., a box, an object that is not a human or animal, an inanimate object) is detected in the field-of-view of the camera (e.g., based on object detection, based on identification of the type of object (box, inanimate); a visitor placed a package, parcel, or other item at the door where the camera is located). In response to receiving the indication that a package is detected, the computer system (e.g., 800) displays, via the display generation component, a notification (e.g., 888) (e.g., a notification while the computer system is in a locked state or a notification while the computer system is in an unlocked state) indicating that the package is detected in the field-of-view of the camera (e.g., the notification includes text related to detection of the object, an image of the object, and/or a generic image of a package (e.g., a stored or stock image of a package)).

In some embodiments, the computer system (e.g., 800) receives an indication that a visitor is detected in a field-of-view of the camera (e.g., the computer system receives a signal from the camera (or a doorbell associated with the camera) that a visitor is at a door where the camera is located). In response to receiving the indication, the computer system (e.g., 800) displays a notification (e.g., 876, 880c), wherein displaying the notification (e.g., 876, 880c) includes: in accordance with a determination that the visitor is an unknown visitor, displaying, via the display generation component, the notification (e.g., 880c), including a fifth affordance (e.g., 884) configured to, in response to detecting user input corresponding to the fifth affordance (e.g., 884), initiate a process for classifying the visitor as a known visitor (e.g., the notification includes an affordance that directly adds the visitor to the recognition database when an image of the visitor matches image information within a photo library of the electronic device that includes a name, the notification includes an affordance that opens a user interface that enables input of a name and/or other identification information associated with the visitor).

In some embodiments, displaying the notification includes: in accordance with a determination that the visitor is a known visitor, displaying the notification without including the fifth affordance. In some embodiments, the computer system displays, via the display generation component, a different notification that includes identification information related to the known visitor. The different notification may include a sixth affordance that, when selected, launches an application (e.g., home app) associated with the camera.

In some embodiments, the computer system detects activation (e.g., long press on) of the notification. In response to detecting activation of the notification: in accordance with a determination that the visitor is an unknown visitor, the computer system displays, via the display generation component, a notification user interface that includes an affordance configured to, in response to detecting user input corresponding to the affordance, initiate a process for classifying the visitor as a known visitor; and in accordance with a determination that the visitor is a known visitor, the computer system displays the notification user interface without including the affordance for initiating the process of classifying the visitor as a known visitor.

In some embodiments, prior to displaying the plurality of affordances (e.g., 872, 876, 886), the computer system (e.g., 800) receives information corresponding to the first visitor and the second visitor concurrently being in a field-of-view of the camera (e.g., receiving a notification that the two visitors are concurrently at the door). The first affordance (e.g., 816d, 818a, 818b) and the second affordance (e.g., 816a, 816b, 816c, 816e) are based on the information corresponding to the first visitor and the second visitor concurrently being in the field-of-view of the camera. In some embodiments, an image captured by the camera is determined to include multiple people at the door where the camera is located. In some embodiments, the plurality of affordances includes separate affordances for each of a plurality of individuals in the field-of-view of the camera at a single time. In some embodiments, the computer system displays, via the display generation component, a separate affordance corresponding to each respective visitor of the plurality of visitors included in a visitor image (e.g., separate affordances are displayed for each visitor that is identified within the image having multiple people). In some embodiments, multiple affordances are displaying corresponding to the respective multiple visitors in the field of view of the camera regardless of whether the visitors are known visitors or unknown visitors.

In some embodiments, the first user interface (e.g., 820, 840) includes a seventh affordance (e.g., (e.g., 844c) (e.g., a toggle affordance) configured to, in response to user input corresponding to selection of the seventh affordance (e.g.,

844*c*), forgo display of notifications corresponding to the first visitor (e.g., when a facial recognition analysis between a visitor image and image information from the recognition database and/or a photo library identifies the first visitor in the visitor image, the computer system forgoes display of notifications corresponding to the first visitor (e.g., notifications that the first visitor is at the door, notifications that the first visitor is ringing or rang the doorbell, the affordance of the first visitor, and/or indications on a timeline associated with the visitor images related to the first visitor)). In some embodiments, the seventh affordance (e.g., the toggle affordance) can be re-activated such that notifications corresponding to the first visitor are again displayed when the first visitor is detected with respect to doorbell activity (e.g., activation of a doorbell of the camera is detected, the first visitor is detected in a field-of-view of the camera).

In some embodiments, the computer system (e.g., 800) displays, via the display generation component, a timeline of activity (e.g., 894) (e.g., a scrollable timeline that includes times and the visitor images positioned at times associated with the respective time at which the respective visitor image was captured by the camera) including a plurality of scene control user interface objects (e.g., 892*a*, 892*b*) associated with the visitor images (e.g., 872*d*, 876*d*, 818*a*, 818*b*) (e.g., selectable images of the visitor images). A scene control user interface object (e.g., 892*a*) of the plurality of scene control user interface objects (e.g., 892*a*, 892*b*) is positioned at a position on the timeline of activity (e.g., 894) corresponding to a time at which the camera captured a respective visitor image associated with the scene control user interface object (e.g., 892*b*). The computer system (e.g., 800) receives a sixth user input corresponding to selection of the scene control user interface object (e.g., 892*b*). In response to receiving the sixth user input, the computer system (e.g., 800) displays, via the display generation component, a camera view (e.g., 892) (e.g., a recorded video) received from the camera corresponding to the time at which the camera captured the respective visitor image associated with the scene control user interface object (e.g., 892*b*) (e.g., selecting a scene control user interface object plays back a recording captured by the camera at the time associated with the respective visitor image).

In some embodiments, the notification user interface includes a toggle button that activates a microphone of the computer system and/or transmits audio received at a microphone of the computer system. In some embodiments, the audio is transmitted for output at a speaker corresponding to camera. In some embodiments, reactivating the toggle button (while audio is being transmitted) causes the computer system to cease transmitting audio received at the electronic device. In some embodiments, a tap on the toggle button starts transmitting audio and a second tap on the toggle button stops transmitting audio. In some embodiments, the computer system outputs audio received from a microphone corresponding to the camera (e.g., audio of the visitor speaking).

In some embodiments, the notification includes a user interface object which, when activated, causes display of a video (e.g., live video feed, previously recorded video feed) of the camera.

In some embodiments, a long press on a notification causes display of the notification user interface, which includes a live video feed (e.g., from the corresponding camera) that includes images of the visitor in the field-of-view of the camera, a previously recorded video feed that includes images of the visitor in the field-of-view of the camera, and/or an image of the visitor in the field-of-view of the camera.

In some embodiments, the notification user interface includes an accessory control user interface object corresponding to an accessory device, wherein selection of the accessory control user interface object initiates a process to transmit an instruction (e.g., selection causes transmission of the instruction) to change a state of the accessory device. In some embodiments, the accessory device is a light or a door lock (e.g., at a location of the camera).

In some embodiments, the indication that a visitor is detected in a field-of-view of the camera is provided to multiple devices (e.g., a set top box, a media device, a watch, a smart speaker system) such that the user can optionally interact with the visitor from a variety of devices.

In some embodiments, recognition database is stored in a server accessible via a network (e.g., in the cloud). In some embodiments, the recognition database is not stored at the computer system.

Note that details of the processes described above with respect to method 900 (e.g., FIG. 9) are also applicable in an analogous manner to the methods described below. For example, method 700 optionally includes one or more of the characteristics of the various methods described above with reference to method 900. For example, managing visitors as discussed above with respect to method 900 may be performed on electronic device 600 when displaying different camera views, as set forth in method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data, such as facial recognition data, to improve the delivery to users of notifications and other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, date of birth, facial recognition information, or any other identifying or personal information.

The present disclosure recognizes that the use of such personal information data, in the present technology, can be used to the benefit of users. For example, the personal information data can be used to deliver notifications and other content that is of greater interest to the user.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data, such as facial recognition information. That is, the present disclosure contemplates that hardware and/or software elements can be provided to prevent or block access to such personal information data. For example, in the case of facial recognition information, the present technology can be configured to allow users to select to "opt in" or "opt out" of participation in the collection of facial recognition information during registration for services or anytime thereafter. In addition to providing "opt in" and "opt out" options, the present disclosure contemplates providing notifications relating to the access or use of facial recognition information. For instance, a user may be notified upon downloading an app that their facial recognition information will be accessed and then reminded again just before facial recognition information is accessed by the app.

Moreover, it is the intent of the present disclosure that personal information data, such as facial recognition information, should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, facial recognition information may be based on non-personal information data or a bare minimum amount of personal information, such as the content being requested by the device associated with a user, other non-personal information available to the device performing facial recognition, or publicly available information.

What is claimed is:

1. A computer system, comprising:
    a display generation component;
    one or more processors; and
    memory storing one or more programs configured to be executed by the one or more processors, the one or more programs including instructions for:
        concurrently displaying, via the display generation component, a plurality of affordances corresponding to visitor images captured by a camera, wherein the camera is associated with the computer system, and wherein concurrently displaying the plurality of affordances includes concurrently displaying:
            a first affordance corresponding to a first visitor that is a known visitor;
            identification information related to the first visitor; and
            a second affordance, different from the first affordance, corresponding to a second visitor that is an unknown visitor;
        while concurrently displaying the plurality of affordances corresponding to visitor images captured by the camera, including concurrently displaying the first affordance and the second affordance, receiving a first user input;
        in response to receiving the first user input:
            in accordance with a determination that the first user input corresponds to selection of the first affordance, displaying a first user interface including information corresponding to the first visitor, wherein the information corresponding to the first visitor includes information corresponding to a first photo library of a first user that was used to identify the first visitor as a known visitor; and
            in accordance with a determination that the first user input corresponds to selection of the second affordance, initiating a process to classify the second visitor as a known visitor, including displaying a second user interface;
        subsequent to displaying the second user interface, receiving one or more inputs corresponding to a name; and
        in response to receiving the one or more inputs corresponding to the name, classifying the second visitor as a known visitor.

2. The computer system of claim 1, wherein displaying the plurality of affordances corresponding to visitor images captured by the camera includes:
    in accordance with a determination that a visitor image of the visitor images captured by the camera is associated with a third visitor that is an unrecognized visitor, forgoing display of an affordance corresponding to the third visitor.

3. The computer system of claim 1, wherein displaying, via the display generation component, the plurality of affordances includes ordering the affordances of the plurality of affordances based on recency of the respective visitors.

4. The computer system of claim 1, wherein displaying, via the display generation component, the plurality of affordances corresponding to visitor images captured by the camera includes displaying:
a first set of affordances of the plurality of affordances in a first area associated with a first period of time; and
a second set of affordances of the plurality of affordances in a second area associated with a second period of time, the second area being different from the first area, and the second period of time being different from the first period of time.

5. The computer system of claim 1, wherein the one or more programs further include instructions for:
while displaying the plurality of affordances, receiving a second user input; and
in response to receiving the second user input, displaying a first user interface, wherein the first user interface includes a plurality of visual indications corresponding to visitors that are known visitors.

6. The computer system of claim 1, wherein the one or more programs further include instructions for:
receiving a third user input; and
in response to receiving the third user input, displaying a second user interface associated with a data library of the computer system, wherein the second user interface includes an option to enable use of image information of the data library of the computer system by a recognition database.

7. The computer system of claim 6, wherein the one or more programs further include instructions for:
displaying, via the display generation component, a fourth user interface including an authorization affordance configured to, in response to detecting user input corresponding to the authorization affordance, disable use of image information of the data library of the computer system by the recognition database.

8. The computer system of claim 1, wherein a visitor is a known visitor based on a corresponding visitor image of the visitor images captured by the camera matching to identification data of a recognition database, wherein the identification data of the recognition database was provided by a data library of an external device.

9. The computer system of claim 8, wherein the computer system is configured to provide identification data from the computer system to the recognition database.

10. The computer system of claim 1, wherein the one or more programs further include instructions for:
receiving an indication that a visitor is detected in a field-of-view of the camera;
in response to receiving the indication and in accordance with a determination that the visitor is a known visitor, displaying, via the display generation component, a notification including a visitor image of the visitor captured by the camera and a visual indication identifying the visitor as a known visitor; and
in response to receiving the indication and in accordance with a determination that the visitor is a unknown visitor, displaying, via the display generation component, a notification including the visitor image of the visitor captured by the camera and a visual indication identifying the visitor as an unknown visitor.

11. The computer system of claim 1, wherein the one or more programs further include instructions for:
receiving an indication that a visitor is detected in a field-of-view of the camera;
in response to receiving the indication:
displaying, via the display generation component, a notification;
subsequent to displaying the notification, receiving additional information about the visitor; and
in response to receiving the additional information:
updating display, via the display generation component, of the notification based on the additional information.

12. The computer system of claim 11, wherein the notification includes a first visual indication of the visitor and the updated notification includes a second visual indication of the visitor that is different from the first visual indication of the visitor.

13. The computer system of claim 11, wherein the notification includes:
in accordance with a determination that the field-of-view of the camera includes a single visitor, a third visual indication; and
in accordance with a determination that the field-of-view of the camera includes a plurality of visitors, a fourth visual indication that indicates a plurality of individuals are in the field-of-view of the camera.

14. The computer system of claim 1, wherein the one or more programs further include instructions for:
receiving an indication that a package is detected in the field-of-view of the camera; and
in response to receiving the indication that a package is detected, displaying, via the display generation component, a notification indicating that the package is detected in the field-of-view of the camera.

15. The computer system of claim 1, wherein the one or more programs further include instructions for:
receiving an indication that a visitor is detected in a field-of-view of the camera; and
in response to receiving the indication, displaying a notification, wherein displaying the notification includes:
in accordance with a determination that the visitor is an unknown visitor, displaying, via the display generation component, the notification, including a fifth affordance configured to, in response to detecting user input corresponding to the fifth affordance, initiate a process for classifying the visitor as a known visitor.

16. The computer system of claim 1, wherein the one or more programs further include instructions for:
prior to displaying the plurality of affordances, receiving information corresponding to the first visitor and the second visitor concurrently being in a field-of-view of the camera; and
wherein the first affordance and the second affordance are based on the information corresponding to the first visitor and the second visitor concurrently being in the field-of-view of the camera.

17. The computer system of claim 1, wherein the first user interface includes a seventh affordance configured to, in response to user input corresponding to selection of the seventh affordance, forgo display of notifications corresponding to the first visitor.

18. The computer system of claim 1, wherein the one or more programs further include instructions for:
displaying, via the display generation component, a timeline of activity including a plurality of scene control user interface objects associated with the visitor images, wherein a scene control user interface object of the plurality of scene control user interface objects is positioned at a position on the timeline of activity corresponding to a time at which the camera captured a respective visitor image associated with the scene control user interface object;

receiving a sixth user input corresponding to selection of the scene control user interface object; and in response to receiving the sixth user input, displaying, via the display generation component, a camera view received from the camera corresponding to the time at which the camera captured the respective visitor image associated with the scene control user interface object.

19. The computer system of claim 1, wherein the second affordance includes a prompt to initiate the process to classify the second visitor as a known visitor.

20. A non-transitory computer readable storage medium storing one or more programs configured to be executed by one or more processors of a computer system in communication with a display generation component, the one or more programs including instructions for:

concurrently displaying, via the display generation component, a plurality of affordances corresponding to visitor images captured by a camera, wherein the camera is associated with the computer system, and wherein concurrently displaying the plurality of affordances includes concurrently displaying:
a first affordance corresponding to a first visitor that is a known visitor;
identification information related to the first visitor; and
a second affordance, different from the first affordance, corresponding to a second visitor that is an unknown visitor;

while displaying the plurality of affordances corresponding to visitor images captured by the camera, including concurrently displaying the first affordance and the second affordance, receiving a first user input;

in response to receiving the first user input:
in accordance with a determination that the first user input corresponds to selection of the first affordance, displaying a first user interface including information corresponding to the first visitor, wherein the information corresponding to the first visitor includes information corresponding to a first photo library of a first user that was used to identify the first visitor as a known visitor; and
in accordance with a determination that the first user input corresponds to selection of the second affordance, initiating a process to classify the second visitor as a known visitor, including displaying a second user interface;

subsequent to displaying the second user interface, receiving one or more inputs corresponding to a name; and in response to receiving the one or more inputs corresponding to the name, classifying the second visitor as a known visitor.

21. The non-transitory computer readable storage medium of claim 20, wherein displaying the plurality of affordances corresponding to visitor images captured by the camera includes:

in accordance with a determination that a visitor image of the visitor images captured by the camera is associated with a third visitor that is an unrecognized visitor, forgoing display of an affordance corresponding to the third visitor.

22. The non-transitory computer readable storage medium of claim 20, wherein displaying, via the display generation component, the plurality of affordances includes ordering the affordances of the plurality of affordances based on recency of the respective visitors.

23. The non-transitory computer readable storage medium of claim 20, wherein displaying, via the display generation component, the plurality of affordances corresponding to visitor images captured by the camera includes displaying:
a first set of affordances of the plurality of affordances in a first area associated with a first period of time; and
a second set of affordances of the plurality of affordances in a second area associated with a second period of time, the second area being different from the first area, and the second period of time being different from the first period of time.

24. The non-transitory computer readable storage medium of claim 20, wherein the one or more programs further include instructions for:
while displaying the plurality of affordances, receiving a second user input; and
in response to receiving the second user input, displaying a first user interface, wherein the first user interface includes a plurality of visual indications corresponding to visitors that are known visitors.

25. The non-transitory computer readable storage medium of claim 20, wherein the one or more programs further include instructions for:
receiving a third user input; and
in response to receiving the third user input, displaying a second user interface associated with a data library of the computer system, wherein the second user interface includes an option to enable use of image information of the data library of the computer system by a recognition database.

26. The non-transitory computer readable storage medium of claim 25, wherein the one or more programs further include instructions for:
displaying, via the display generation component, a fourth user interface including an authorization affordance configured to, in response to detecting user input corresponding to the authorization affordance, disable use of image information of the data library of the computer system by the recognition database.

27. The non-transitory computer readable storage medium of claim 20, wherein a visitor is a known visitor based on a corresponding visitor image of the visitor images captured by the camera matching to identification data of a recognition database, wherein the identification data of the recognition database was provided by a data library of an external device.

28. The non-transitory computer readable storage medium of claim 27, wherein the computer system is configured to provide identification data from the computer system to the recognition database.

29. The non-transitory computer readable storage medium of claim 20, wherein the one or more programs further include instructions for:
receiving an indication that a visitor is detected in a field-of-view of the camera;
in response to receiving the indication and in accordance with a determination that the visitor is a known visitor, displaying, via the display generation component, a notification including a visitor image of the visitor captured by the camera and a visual indication identifying the visitor as a known visitor; and
in response to receiving the indication and in accordance with a determination that the visitor is a unknown visitor, displaying, via the display generation component, a notification including the visitor image of the visitor captured by the camera and a visual indication identifying the visitor as an unknown visitor.

30. The non-transitory computer readable storage medium of claim 20, wherein the one or more programs further include instructions for:
receiving an indication that a visitor is detected in a field-of-view of the camera;
in response to receiving the indication:
displaying, via the display generation component, a notification;
subsequent to displaying the notification, receiving additional information about the visitor; and
in response to receiving the additional information:
updating display, via the display generation component, of the notification based on the additional information.

31. The non-transitory computer readable storage medium of claim 30, wherein the notification includes a first visual indication of the visitor and the updated notification includes a second visual indication of the visitor that is different from the first visual indication of the visitor.

32. The non-transitory computer readable storage medium of claim 30, wherein the notification includes:
in accordance with a determination that the field-of-view of the camera includes a single visitor, a third visual indication; and
in accordance with a determination that the field-of-view of the camera includes a plurality of visitors, a fourth visual indication that indicates a plurality of individuals are in the field-of-view of the camera.

33. The non-transitory computer readable storage medium of claim 20, wherein the one or more programs further include instructions for:
receiving an indication that a package is detected in the field-of-view of the camera; and
in response to receiving the indication that a package is detected, displaying, via the display generation component, a notification indicating that the package is detected in the field-of-view of the camera.

34. The non-transitory computer readable storage medium of claim 20, wherein the one or more programs further include instructions for:
receiving an indication that a visitor is detected in a field-of-view of the camera; and
in response to receiving the indication, displaying a notification, wherein displaying the notification includes:
in accordance with a determination that the visitor is an unknown visitor, displaying, via the display generation component, the notification, including a fifth affordance configured to, in response to detecting user input corresponding to the fifth affordance, initiate a process for classifying the visitor as a known visitor.

35. The non-transitory computer readable storage medium of claim 20, wherein the one or more programs further include instructions for:
prior to displaying the plurality of affordances, receiving information corresponding to the first visitor and the second visitor concurrently being in a field-of-view of the camera; and
wherein the first affordance and the second affordance are based on the information corresponding to the first visitor and the second visitor concurrently being in the field-of-view of the camera.

36. The non-transitory computer readable storage medium of claim 20, wherein the first user interface includes a seventh affordance configured to, in response to user input corresponding to selection of the seventh affordance, forgo display of notifications corresponding to the first visitor.

37. The non-transitory computer readable storage medium of claim 20, wherein the one or more programs further include instructions for:
displaying, via the display generation component, a timeline of activity including a plurality of scene control user interface objects associated with the visitor images, wherein a scene control user interface object of the plurality of scene control user interface objects is positioned at a position on the timeline of activity corresponding to a time at which the camera captured a respective visitor image associated with the scene control user interface object;
receiving a sixth user input corresponding to selection of the scene control user interface object; and
in response to receiving the sixth user input, displaying, via the display generation component, a camera view received from the camera corresponding to the time at which the camera captured the respective visitor image associated with the scene control user interface object.

38. The non-transitory computer readable storage medium of claim 20, wherein the second affordance includes a prompt to initiate the process to classify the second visitor as a known visitor.

39. A method, comprising:
at a computer system that is in communication with a display generation component:
concurrently displaying, via the display generation component, a plurality of affordances corresponding to visitor images captured by a camera, wherein the camera is associated with the computer system, and wherein concurrently displaying the plurality of affordances includes concurrently displaying:
a first affordance corresponding to a first visitor that is a known visitor;
identification information related to the first visitor; and
a second affordance, different from the first affordance, corresponding to a second visitor that is an unknown visitor;
while displaying the plurality of affordances corresponding to visitor images captured by the camera, including concurrently displaying the first affordance and the second affordance, receiving a first user input;
in response to receiving the first user input:
in accordance with a determination that the first user input corresponds to selection of the first affordance, displaying a first user interface including information corresponding to the first visitor, wherein the information corresponding to the first visitor includes information corresponding to a first photo library of a first user that was used to identify the first visitor as a known visitor; and
in accordance with a determination that the first user input corresponds to selection of the second affordance, initiating a process to classify the second visitor as a known visitor, including displaying a second user interface;
subsequent to displaying the second user interface, receiving one or more inputs corresponding to a name; and
in response to receiving the one or more inputs corresponding to the name, classifying the second visitor as a known visitor.

40. The method of claim 39, wherein displaying the plurality of affordances corresponding to visitor images captured by the camera includes:
in accordance with a determination that a visitor image of the visitor images captured by the camera is associated with a third visitor that is an unrecognized visitor, forgoing display of an affordance corresponding to the third visitor.

41. The method of claim 39, wherein displaying, via the display generation component, the plurality of affordances includes ordering the affordances of the plurality of affordances based on recency of the respective visitors.

42. The method of claim 39, wherein displaying, via the display generation component, the plurality of affordances corresponding to visitor images captured by the camera includes displaying:
a first set of affordances of the plurality of affordances in a first area associated with a first period of time; and
a second set of affordances of the plurality of affordances in a second area associated with a second period of time, the second area being different from the first area, and the second period of time being different from the first period of time.

43. The method of claim 39, the method further comprising:
while displaying the plurality of affordances, receiving a second user input; and
in response to receiving the second user input, displaying a first user interface, wherein the first user interface includes a plurality of visual indications corresponding to visitors that are known visitors.

44. The method of claim 39, the method further comprising:
receiving a third user input; and
in response to receiving the third user input, displaying a second user interface associated with a data library of the computer system, wherein the second user interface includes an option to enable use of image information of the data library of the computer system by a recognition database.

45. The method of claim 44, the method further comprising:
displaying, via the display generation component, a fourth user interface including an authorization affordance configured to, in response to detecting user input corresponding to the authorization affordance, disable use of image information of the data library of the computer system by the recognition database.

46. The method of claim 39, wherein a visitor is a known visitor based on a corresponding visitor image of the visitor images captured by the camera matching to identification data of a recognition database, wherein the identification data of the recognition database was provided by a data library of an external device.

47. The method of claim 46, wherein the computer system is configured to provide identification data from the computer system to the recognition database.

48. The method of claim 39, the method further comprising:
receiving an indication that a visitor is detected in a field-of-view of the camera;
in response to receiving the indication and in accordance with a determination that the visitor is a known visitor, displaying, via the display generation component, a notification including a visitor image of the visitor captured by the camera and a visual indication identifying the visitor as a known visitor; and
in response to receiving the indication and in accordance with a determination that the visitor is a unknown visitor, displaying, via the display generation component, a notification including the visitor image of the visitor captured by the camera and a visual indication identifying the visitor as an unknown visitor.

49. The method of claim 39, the method further comprising:
receiving an indication that a visitor is detected in a field-of-view of the camera;
in response to receiving the indication:
displaying, via the display generation component, a notification;
subsequent to displaying the notification, receiving additional information about the visitor; and
in response to receiving the additional information:
updating display, via the display generation component, of the notification based on the additional information.

50. The method of claim 49, wherein the notification includes a first visual indication of the visitor and the updated notification includes a second visual indication of the visitor that is different from the first visual indication of the visitor.

51. The method of claim 49, wherein the notification includes:
in accordance with a determination that the field-of-view of the camera includes a single visitor, a third visual indication; and
in accordance with a determination that the field-of-view of the camera includes a plurality of visitors, a fourth visual indication that indicates a plurality of individuals are in the field-of-view of the camera.

52. The method of claim 39, the method further comprising:
receiving an indication that a package is detected in the field-of-view of the camera; and
in response to receiving the indication that a package is detected, displaying, via the display generation component, a notification indicating that the package is detected in the field-of-view of the camera.

53. The method of claim 39, the method further comprising:
receiving an indication that a visitor is detected in a field-of-view of the camera; and
in response to receiving the indication, displaying a notification, wherein displaying the notification includes:
in accordance with a determination that the visitor is an unknown visitor, displaying, via the display generation component, the notification, including a fifth affordance configured to, in response to detecting user input corresponding to the fifth affordance, initiate a process for classifying the visitor as a known visitor.

54. The method of claim 39, the method further comprising for:
prior to displaying the plurality of affordances, receiving information corresponding to the first visitor and the second visitor concurrently being in a field-of-view of the camera; and
wherein the first affordance and the second affordance are based on the information corresponding to the first visitor and the second visitor concurrently being in the field-of-view of the camera.

55. The method of claim 39, the method further comprising, wherein the first user interface includes a seventh affordance configured to, in response to user input corresponding to selection of the seventh affordance, forgo display of notifications corresponding to the first visitor.

56. The method of claim 39, the method further comprising:
- displaying, via the display generation component, a timeline of activity including a plurality of scene control user interface objects associated with the visitor images, wherein a scene control user interface object of the plurality of scene control user interface objects is positioned at a position on the timeline of activity corresponding to a time at which the camera captured a respective visitor image associated with the scene control user interface object;
- receiving a sixth user input corresponding to selection of the scene control user interface object; and
- in response to receiving the sixth user input, displaying, via the display generation component, a camera view received from the camera corresponding to the time at which the camera captured the respective visitor image associated with the scene control user interface object.

57. The method of claim 39, wherein the second affordance includes a prompt to initiate the process to classify the second visitor as a known visitor.

\* \* \* \* \*

UNITED STATES PATENT AND TRADEMARK OFFICE
CERTIFICATE OF CORRECTION

| | |
|---|---|
| PATENT NO. | : 11,657,614 B2 |
| APPLICATION NO. | : 17/028176 |
| DATED | : May 23, 2023 |
| INVENTOR(S) | : Charles D. Deets et al. |

It is certified that error appears in the above-identified patent and that said Letters Patent is hereby corrected as shown below:

On the Title Page

Column 1 (Item (72) Inventors), after "Patrick L. Coffman, San Francisco, CA (US)" insert -- ; Neil P. Cormican, Menlo Park, CA (US) --.

Signed and Sealed this
Eighteenth Day of March, 2025

Coke Morgan Stewart
*Acting Director of the United States Patent and Trademark Office*